United States Patent [19]

Hiller et al.

[11] Patent Number: 5,428,607
[45] Date of Patent: Jun. 27, 1995

[54] INTRA-SWITCH COMMUNICATIONS IN NARROW BAND ATM NETWORKS

[75] Inventors: Thomas L. Hiller, Glen Ellyn; Ronald A. Spanke; John J. Stanaway, Jr., both of Wheaton; Alex L. Wierzbicki, Bolingbrook; Meyer J. Zola, Oak Park, all of Ill.

[73] Assignee: AT&T Corp., Murray Hill, N.J.

[21] Appl. No.: 169,915

[22] Filed: Dec. 20, 1993

[51] Int. Cl.[6] .................. H04L 12/56; H04L 12/66
[52] U.S. Cl. .................. 370/60.1; 370/94.2
[58] Field of Search .................. 370/58.1, 58.2, 58.3, 370/60, 60.1, 79, 82, 94.1, 94.2, 95.1, 95.3, 110.1

[56] References Cited

U.S. PATENT DOCUMENTS

| | | | |
|---|---|---|---|
| 5,093,827 | 3/1992 | Franklin et al. | 370/60.1 |
| 5,189,410 | 2/1993 | Kosugi et al. | 340/825.14 |
| 5,204,882 | 4/1993 | Chao et al. | 375/106 |
| 5,214,639 | 5/1993 | Herion | 370/60 |
| 5,233,606 | 8/1993 | Pashan et al. | 370/85.6 |
| 5,247,516 | 9/1993 | Bernstein et al. | 370/94.1 |
| 5,287,348 | 2/1994 | Schmidt et al. | 370/60.1 |
| 5,345,446 | 9/1994 | Hiller et al. | 370/60.1 |

OTHER PUBLICATIONS

K. Y. Eng et al., "A Framework For A National Broadband (ATM/B–ISDN) Network", *International Conference on Communications* ICC '90, vol. 2, Apr. 1990, Atlanta, pp. 515–520.

R. Hazell, editor, "Broadband Technology", *Electrical Communication*, vol. 65, No. 1, (Telecom 91), Oct. 1991, pp. 12–18—Broadband Technology, pp. 19–21—Evolution of Alcatel Exchanges.

*Primary Examiner*—Wellington Chin
*Attorney, Agent, or Firm*—Werner Ulrich

[57] ABSTRACT

Pulse Code Modulation (PCM) signal streams are converted into Asynchronous Transfer Mode (ATM) cells for switching and transmission across a telecommunications network. Each cell carries one PCM sample of up to 48 different voice connections, the voice connections being selected from the PCM data streams because they have a common destination. The cells are transmitted over ATM virtual paths, each path transmitting one cell every 125 $\mu$s. The ATM signals are switched by units for switching cells (cell switching), while keeping their payload contents intact, and by units for switching the signals for individual voice connections between cells of an ATM signal (cell remapping). Advantageously, ATM transmission systems interface with PCM systems without adding appreciable delay and without requiring additional buffering. Advantageously, new voice paths can be established most of the time by using available slots in the cells of existing virtual paths. Advantageously, large telecommunication networks can be implemented using a small number of switching units. For use with PCM switches, it is desirable to provide supervisory signals accompanying the PCM data. Advantageously, this arrangement permits supervisory signals to be passed within an access switch thus simplifying compatibility with existing switching systems.

5 Claims, 39 Drawing Sheets

FIG. 3
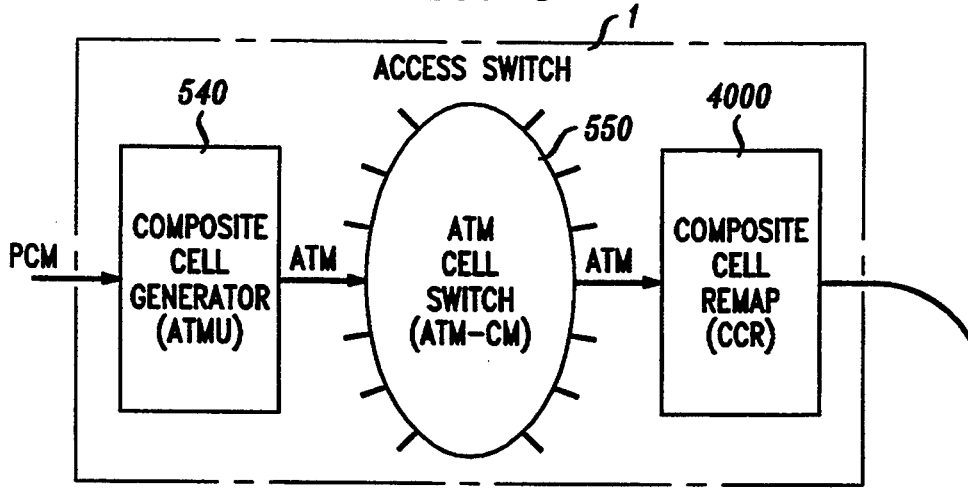
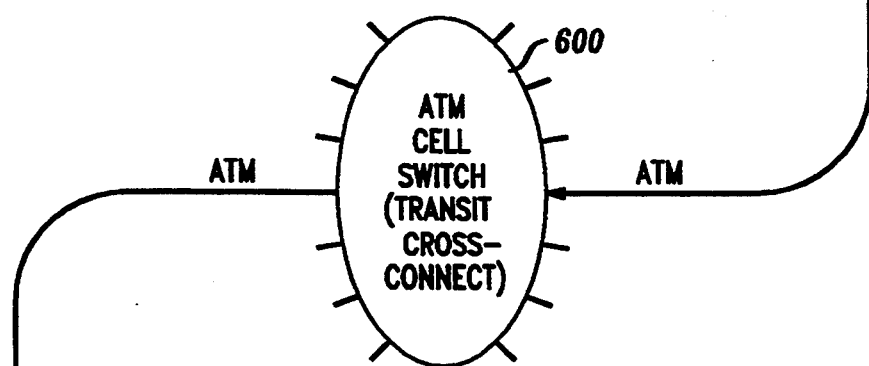
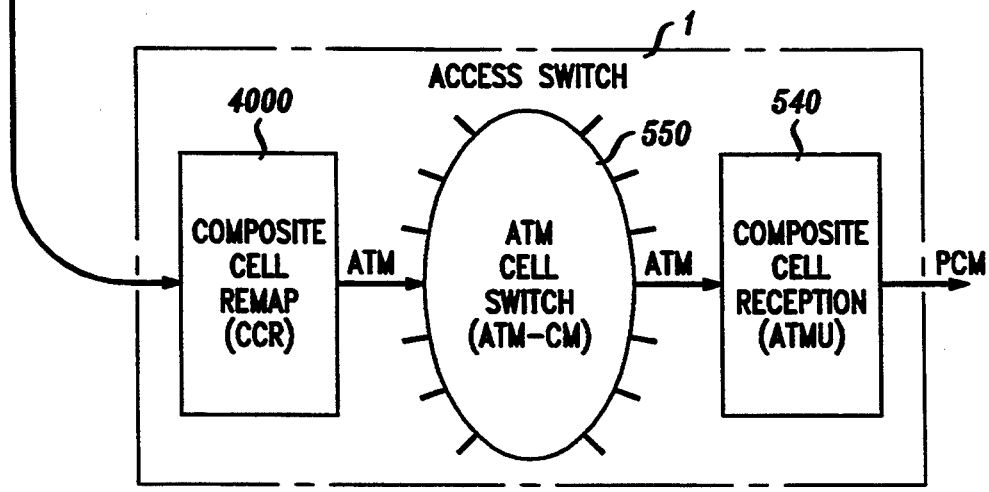

FIG. 14

42 TIME SLOTS — SDCC — DESTINATION

| TS n | TS 4 | ....... | TS 136 | TS 18 | TS 73 | | TO ATMU x |

FIG. 15

42 TIME SLOTS — MDCC — DESTINATION

| TO SW k | ....... | TO SW 3 | | TO SW 7 | TO SW 1 | | TO SOURCE CCR x |

FIG. 16

48 DSOs – 1 SAMPLE — TDC — DESTINATION

| DSO 48 | | DSO k | ..... | | DSO 4 | DSO 3 | | DSO 1 | TO DESTINATION CCR k |

FIG. 17

1 DSO – 48 SAMPLES — TDC — DESTINATION

| 48 | 47 | 46 | ..... | 5 | 4 | 3 | 2 | 1 | TO DESTINATION CCR k |

AM/ATM-CM CONTROL ARCHITECTURE

NISUP-BISUP CALL

BISUP-NISUP CALL

INTRA-SWITCH COMMUNICATIONS IN NARROW BAND ATM NETWORKS

CROSS-REFERENCE TO RELATED APPLICATION

This application is related to the applications of:

Thomas L. Hiller, James J. Phelan, and Meyer J. Zola entitled "Establishing Telecommunications Call Paths In Broadband Communication Networks", Ser. No. 07/972,789, filed Nov. 6, 1992;

Thomas L. Hiller, James J. Phelan, and Meyer J. Zola entitled "Establishing Telecommunications Call Paths Between Clustered Switching Entities", Ser. No. 07/972,787, filed Nov. 6, 1992;

Thomas L. Hiller, James J. Phelan, and Meyer J. Zola entitled "Apparatus For Interfacing Between Telecommunications Call Signals And Broadband Signals", Ser. No. 07/972,786, filed Nov. 6, 1992;

Thomas L. Hiller, James J. Phelan, and Meyer J. Zola entitled "Establishing Telecommunications Calls In A Broadband Network", Ser. No. 07/972,788, filed Nov. 6, 1992; and Thomas L. Hiller, Ronald A. Spanke, John J. Stanaway, Jr., Alex L. Wierzbicki, and Meyer J. Zola entitled "ATM Networks For Narrow Band Communications", Ser. No. 08/170,549, filed Dec. 20, 1993, Thomas L. Hiller, Ronald A. Spanke, John J. Stanaway, Jr., Alex L. Wierzbicki, and Meyer J. Zola entitled "ATM Distribution Networks For Narrow Band Communications", filed on an even date herewith, Ser. No. 08/169,913, filed Dec. 20, 1993, Thomas L. Hiller, Ronald A. Spanke, John J. Stanaway, Jr., Alex L. Wierzbicki, and Meyer J. Zola entitled "Access Switches For Large ATM Networks", filed on an even date herewith, Ser. No. 08/169,909, filed Dec. 20, 1993, Thomas L. Hiller, Ronald A. Spanke, John J. Stanaway, Jr., Alex L. Wierzbicki, and Meyer J. Zola entitled "Inter-Cell Switching Unit For Narrow Band ATM Networks", filed on an even date herewith and, Ser. No. 08/170,550, filed Dec. 20, 1993, which applications are assigned to the assignee of the present application.

TECHNICAL FIELD

This invention relates to arrangements for establishing digital telecommunications connections, and more specifically, for establishing such connections using broadband networks and switching systems.

Problem

The provision of large quantities of toll telephone service continues to be expensive. While there have been major breakthroughs in the cost of provisioning of high capacity transmission systems using fiber optics, the access to such fiber optic systems and the switching of signals on such fiber optic systems continues to be costly. Further, the cost of switching the signals from one channel to another in a tandem-toll switch remains high.

Further, there has been an increasing need for a very large telecommunications switching system or its equivalent. In the past, this need has been partially met by the use of smaller switching systems interconnected by moderate capacity tandem switching systems. In the case of a switching system such as AT&T's 5ESS® switch, a fairly large system has been devised using switching modules of substantial capacity interconnected by a time multiplexed switch. None of the available solutions, however, have resulted in an economically satisfactory solution to the need for a very large switching system or cluster of systems for simultaneously handling substantial quantities of telephone traffic, low speed telecommunications data traffic, and high speed telecommunications data traffic.

A new standard has been implemented for transmitting combinations of broadband and narrower band, packet and circuit signals over broadband facilities. This standard, the Asynchronous Transfer Mode (ATM) standard, packs data into frames each frame comprising a plurality of cells, each cell being 53 bytes long, the 53 bytes consisting of a 5 byte header and a 48 byte payload. When a 125 microsecond ATM frame is transmitted, each of the cells may be headed for a separate destination, the destination being identified in the cell header. ATM standards under consideration specify how to pack 48 voice samples from one speech channel into a cell and to transmit this cell across an ATM network. However, this incurs an undesirable 48 sample (6 millisecond) delay for filling the cell with the samples, and requires a large amount of storage for the samples prior to their transmission and after their reception. No sound proposal has been made public for the economic use of ATM for transmitting voice signals from an ingress node to a network to a multiplicity of egress nodes of the network without incurring this delay. While the ATM standard is finding increasing use in broadband networks, especially those using fiber optic transmission facilities, no economic solution has been made public to the problem of designing a communications network for transmitting a large multiplicity of narrowband voice signals from any of a multiplicity of ingress nodes of the network to any of a multiplicity of egress nodes of the network using the ATM standard without incurring this delay. Further, no sound economic proposal has been made public for the economic use of ATM for achieving a very high capacity low delay large switching system or a large highly interconnected cluster of smaller switching systems.

The above problems are partly solved in accordance with the teachings of a prior patent application, Ser. No. 07/972,789, and its related applications, Ser. Nos. 07/972,787, 07/972,786, and 07/972,788. According to the teachings of those applications, signals from a plurality of pulse code modulated (PCM) channels on a plurality of PCM lines, each channel for one telecommunications call, are switched by ATM interface units (ATMUs) onto ATM signal outputs such that each of the calls destined for a common switching module or independent switching system are packed into a single composite ATM or ATM-like cell; the ATM signals containing such composite cells are transmitted to and from an ATM Communication module (ATM-CM) (called a common broadband platform in the cited application) which is used for switching ATM cells; such composite cells are transmitted at a repetition rate that is the same or a sub-multiple of the repetition rate of the PCM signals that represent the voice signals; the cells are transmitted over constant bit rate (CBR) permanent virtual circuits (PVC) from an ingress switching module or system to the ATM-CM of that node or access switch, thence, to an egress switching module or switching system or to the ATM-CM of another access switch. This solution avoids the 6 millisecond delay because only one sample from a given call is placed into a composite cell. Permanent virtual paths are provisioned as the traffic between a particular ingress and egress module changes, but such paths need to be activated or deactivated only when an additional group (the group size being determined by the number of voice channels that are transmitted in each cell) is needed or can be released.

A problem with this partial solution is that there is insufficient traffic to justify permanent virtual paths among the large plurality of ATMUs in a network having many switching modules. Further, the partial solution has the disadvantage that the addition of a single switching module to any access switch of a network requires that all access switches be informed, thus presenting a significant operational and administrative problem.

Solution

In a departure from the prior art, described in this application, a composite cell remap (CCR) unit is introduced between ATM cell switching stages. The access switch is enhanced to include a plurality of CCR units, each of which converts between cells on an ATM signal received from an ATM-CM, each cell being from one of a plurality of source switches or switch modules and destined for that CCR unit, to cells each containing communications destined for a common destination CCR; this is accomplished by switching the individual channels within each cell of the input ATM signal to cells headed for the appropriate destination CCR in the output ATM signal of the CCR. A transit crossconnect is interposed between CCRs of different access switches, to switch cells of incoming ATM streams to different outgoing ATM streams. This transit crossconnect is equivalent to the network of crossconnects used today in long distance synchronous voice networks. Advantageously, using this kind of an arrangement, a transit crossconnect, in conjunction with a plurality of CCRs in an access switch, can be used efficiently to interconnect the links of a permanent virtual path between two access switches, and can link modules of different access switches even when the traffic between the modules is well below the capacity of a single cell.

In accordance with one specific embodiment, each composite ATM cell between CCRs carries one byte of each of up to 48 voice communications, and the composite cells of the CBR PVCs are transmitted at a rate of one cell per 125 microseconds ($\mu$s). Advantageously, such an arrangement simplifies the interface to existing PCM systems.

Virtual paths in the ATMU are assigned to gather traffic that is input to the ATMU into cells such that each cell goes only to one CCR or ATMU destination. For intra-access switch traffic the cells go to the ATMU connected to the destination switch module. For inter-access switch traffic, the cells go to a CCR and are then transmitted over an ATM link to a transit crossconnect or directly to another access switch. The access switch that contains the destination CCR, or for intra-access switch traffic, the destination ATMU, determines the choice of which inputs are assigned to which cells. In the case of cells destined for a CCR, if the CCR is directly connected to another access switch, a situation which may occur when either there is a great deal of traffic between two access switches or when networks are initially small (i.e., few access switches), then the traffic that can be placed in a cell is any traffic destined for the terminating access switch. For the more general case, in which the CCR that is the destination of the cell is connected to a transit crossconnect, the cell from the ATMU may contain traffic for any of the access switches connected to the transit crossconnect; the CCR will serve to segregate traffic for each of the possible destination access switches of the connected transit crossconnect into different cells. The transit crossconnect routes each cell to the appropriate destination access switch. There, another CCR unit will segregate traffic for each ATMU of that access switch into different cells. Each cell is then routed through the destination access switch ATM-CM to the correct ATMU for that cell, and thence to the destination switching module.

The assignment of traffic to cells, i.e., the assignment of traffic to the virtual paths of the ATMU, is further modified by considerations of reliability so that, whenever possible, traffic between access switches may be switched by a network of crossconnects, e.g., via two different transit crossconnects. If the amount of traffic between two access switches is small, then it may normally be carried over one of the two transit crossconnects and in case of system failure may then be switched to a CCR connected to the second transit crossconnect interconnecting the two access switches.

The assignment of traffic to output cells within the CCR is relatively straightforward. If the CCR is connected to a transit crossconnect, each output cell contains traffic destined for a single destination CCR of a destination access switch. Because the destination access switch also contains a CCR unit and because of the full interconnectivity of the ATM-CM in the destination access switch, there is no need to segregate traffic destined for switching by different ATMUs in the destination access switch.

All of the units described herein carry traffic in both directions. In general, only the outgoing direction is described in detail. Those skilled in the prior art will readily understand the adaptations necessary for the reverse direction of transmission and switching.

While the preferred embodiment uses ATM, the principles of applicants' invention apply to any packet network. Implementation is simplified by the constant length packet size of the ATM cells and the use of ATM standard parts will make implementation of applicants' invention economical. The equivalent of an ATMU and a CCR in a more general packet network are units which can pack and unpack the contents of the packets over the period of a frame of a multiplexed periodic communication signal such as PCM or PCM-like (e.g., adaptive PCM) signals. The equivalent of a CCR in a more general packet network is a composite packet remap (CPR) unit. The equivalent of an ATM crossconnect or network of crossconnects is a packet switching fabric unit, or network of packet switching fabric units.

While the above principles are used in all five related applications being submitted concurrently, the particular subject matter claimed in this application relates to the transportation within the access switch of supplementary control data along with the PCM samples when a connection is within the access switch. In the specific embodiment, the supplementary control data is a supervisory signal referred to as an E-bit, the name used for this signal in the 5ESS switch of the preferred embodiment. Instead of simply switching individual PCM samples, an extended segment is switched for all samples pertaining to a particular call, the extended segment containing an 8 bit PCM sample and the E-bit. The same basic principles can be used for transporting any other control information which it is important to retain with the call signal data in any other switching system. In accordance with the principles of this invention a segment (in contrast to a byte or other entity containing only a communication signal such as a PCM sample) is switched through the access switch for all communications that use the composite cells described herein. If the segment is transmitted to a CCR, the CCR discards the control information portion and derives its output cells only from the communication signal, e.g., the PCM sample. If the composite cell is internally switched within the access switch by the ATM-CM back to the source or another ATMU, the segment is retained. The ATMU operates on the segments in performing its composite cell creation function. The ATM-CM simply switches the cells received from an ATMU to an output, i.e., an ATMU or a CCR. Advantageously, this ,arrangement permits control information required within an access switch for intra-access switch calls to be transported along with the communication signal in composite cells.

BRIEF DESCRIPTION OF THE DRAWING

FIGS. 1–4 are high-level network configuration diagrams whose configuration is in conformance with the principles of this invention;

FIG. 14 illustrates a single destination composite cell format of the type which would be used for communications between switching modules of one ATM-CM switch;

FIG. 15 illustrates a multiple destination composite cell (MDCC) format of a type used for communicating between a switching module and a composite cell remap unit;

FIG. 16 illustrates the format of a cell used for communicating between CCR blocks;

FIG. 17 illustrates a tandem destination cell arranged to communicate with a packetized voice destination;

Overview

The telecommunications network described herein uses, packets, and in the preferred embodiment ATM cells, to switch PCM sources supplied from local switches. According to the principles of this invention, which can be followed in FIG. 12 for the purposes of this overview, the network not only uses ATM signals as a broadband means of transporting PCM signals and of switching different PCM streams to different destinations through the use of an ATM switch fabric capable of switching different cells to different ATM destinations, but also includes facilities for switching different PCM samples within a cell to other cells. The result is that PCM streams, each containing communications destined for a large number of different destinations, can have their contents rearranged and switched among a plurality of ATM streams each containing cells destined for different destinations. ATM cell switches are described in *Journal of High Speed Networks*, Vol. 1, No. 3, pp. 193–279, 1992.

Figure 23:
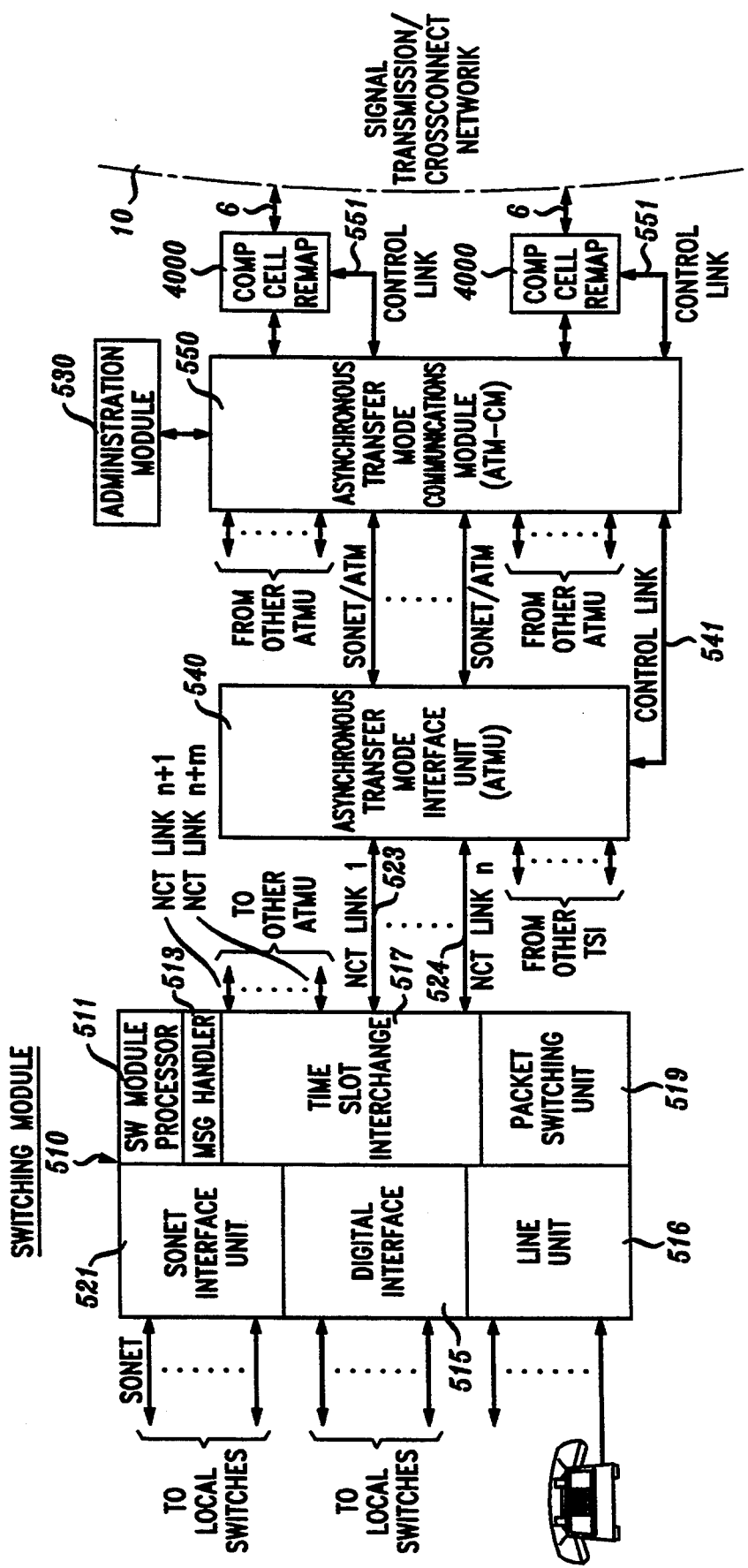
FIG. 23 is a block diagram of an access switch of FIG. 6.

In accordance with the principles of this invention, input PCM streams from one or more switching modules 510 are transmitted to an ATM interface unit (ATMU) 540 of FIG. 23. In the specific embodiment these PCM streams are sent on Network Control and Timing (NCT) links and are generated by a switching module of a 5ESS switch which has inputs (not shown in FIG. 12) from local switches and from telephone stations connected to the switching module. The 5ESS® switch and switching module are extensively described in the *AT&T Technical Journal*, Volume 64, No. 6, July/August 1985, pp. 1303–1564. The ATMU takes PCM streams from a plurality of such switching modules arid generates ATM streams each containing cells, where for each cell all of the PCM samples are destined for a common composite cell remap (CCR) unit 4000 (FIG. 42) of the source access switch 1. ATM streams from a plurality of ATMUs are transmitted to an ATM Communications Module (ATM-CM) 550, comprising an ATM switch fabric which switches cells from that plurality of ATM streams into a plurality of CCR units. (Remember that each cell of an ATMU output is destined for a particular CCR and contains only PCM samples for that CCR.)

The output of the CCR is a single ATM stream which is transmitted to a transit ATM crossconnect 600 (FIG. 11) which, like the ATM-CM, switches cells among different ATM streams, but keeps the payload content Of each cell intact. The CCR performs the function of re-packaging the cells of its input stream so that each cell in its output stream contains PCM samples destined for a single CCR unit at a destination access switch. The transit crossconnect can then take the inputs from a plurality of CCRs and gather those cells destined for a CCR in a particular destination access switch into a single ATM stream for transmission to that destination access switch CCR. The transit crossconnect switches the cells in its input ATM streams but does not switch parts of the payload data of one cell to two or more different cells.

At the destination access switch, the process is simply reversed. The CCR gathers samples destined for a common ATMU into cells and transmits its output stream to an ATM-CM. The ATM-CM sends the cells received from a plurality of CCRs of the destination access switch and destined for a particular ATMU to that ATMU. That ATMU then forms PCM streams to its connected switching modules from the contents of the ATM streams that it has received. The ATMU can take individual PCM samples from within the cells of its input ATM streams and direct these samples to different PCM output streams. In this preferred embodiment, the ATMU generates and receives a plurality of ATM streams, while the CCR operates on only one ATM stream; clearly this is a matter of design choice and the ATMU can be arranged to interface with a single ATM stream and/or the CCR can be arranged to interface with a plurality of ATM streams.

For the case in which the access switch acts as a tandem switch between local offices connected thereto or an intraoffice call between lines directly connected to switching modules of the access switch, the ATM-CM acts to connect output streams of an ATMU to input streams of the same or another ATMU. For compatibility reasons it is desirable in this case that additional information associated with each PCM sample, in this case a supervisory indicator or E-bit, be switched through the ATMU in both directions. The ATMU in order to provide for this capability in the preferred embodiment deals with 9 bit segments, each segment including an 8 bit PCM byte and an E-bit associated therewith and 42 of these 9 bit segments make up the payload of each ATM cell in the ATMU. For convenience, this is done whether or not the cell is connected to a CCR for further switching and subsequent transportation to another access switch. Advantageously, using this arrangement the E-bit which is transported over NCT links connecting a switching module to an ATMU is thereby retained in all connections which do not leave the access switch. Clearly, this is a matter of design choice and the ATMU and CCR could be designed to work with different size segments and the number of segments adjusted accordingly to fit into a 48 byte ATM payload. While in the preferred embodiment, only the E-bit is switched through in an intra-access switch connection, it is obvious that additional bits can be switched through using the same principles. In some applications, other bits may be transmitted on a sampling basis or can be transmitted via signaling messages.

FIGS. 1–5 present a high-level overview of telecommunications networks designed in conformance with applicants' invention. In all cases, in the illustrative embodiment, the inputs are PCM streams and the outputs are PCM streams.

Figure 1:
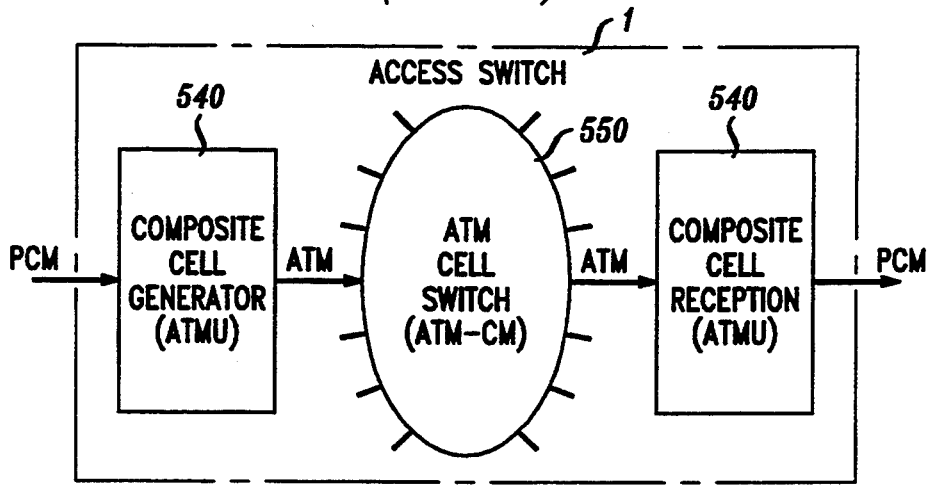

FIG. 1 is based on the teachings of the prior patent application Ser. No. 07/972,789. It shows the treatment of an intra-access switch call. A PCM stream from, for example a 5ESS switch enters an ATMU where composite cells are generated, each composite cell containing PCM samples for destinations served by one ATMU. The cells are switched in an ATM cell switch, the ATM-CM 550, where inputs from a plurality of ATMUs 540 are switched to a plurality of outputs to ATMUs 540. The ATM-CM does not change the payload within each cell, but simply switches individual cells on one ATM input stream to one of a plurality of ATM output streams. These output streams are received in ATMU units 540 acting, in this case, as ATM composite cell receivers and the individual PCM samples of each received cell are distributed to appropriate positions within the correct PCM output stream.

Figure 2:
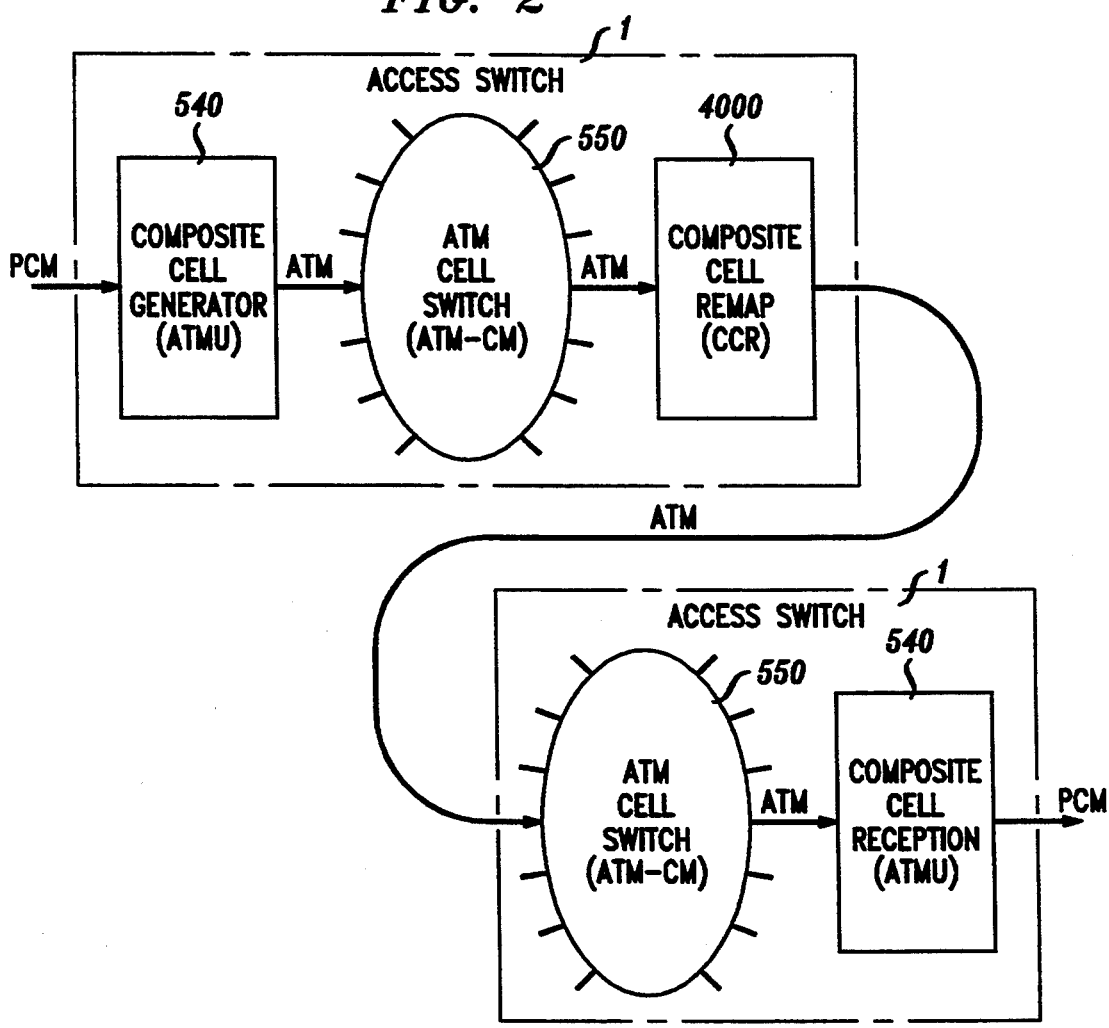

FIG. 2 illustrates the case of a two-stage network using composite cells. This is a network for switching PCM samples on a plurality of PCM input streams on one access switch to PCM samples on a plurality of PCM output streams on a different access switch, wherein the two access switches are directly interconnected via a link carrying one or more ATM streams. The PCM input streams enter a composite cell generation ATMU 540 which assembles cells all of which are destined for the same CCR, a CCR which, in this case, is directly connected to a single destination access switch. The ATMU 540 of the first (top) access switch effectively generates composite cells destined for the second access switch. These composite cells are transmitted over one or more ATM streams to ATM-CM 550 where cells from a plurality of ATMUs entering the ATM-CM are combined into a single ATM stream for CCR 4000, which is connected to the second access switch. The CCR remaps the PCM samples within the cells such that all PCM samples within the same output cell are destined for the same ATMU in the destination access switch. In the second (bottom) access switch, the output of the CCR 4000 from the first access switch can be directly connected to an ATM-CM 550, which separates the cells destined for each of the ATMUs 540 of the second access switch. Each of these latter ATMUs then converts its input ATM streams into PCM streams in essentially the way previously described for the composite cell reception in FIG. 1. A problem arises in that the switch containing the CCR needs to know about the ATMUs of the other access switch. One solution to this problem is to exchange data messages between the access switches. Another is to equip only incoming CCR portions in each access switch. It is also possible to equip CCRs in both access switches.

FIG. 3 illustrates the network configuration most likely to be encountered and the one that is described most fully in this specification. It illustrates the case of two access switches communicating via a transit crossconnect. In the first (top) access switch, the ATMU 540 acts as a composite cell generation unit which generates individual cells, each of which contain samples headed for a common CCR unit 4000 of the first access switch. The ATM-CM of the first access switch assembles all cells destined for that CCR into a single ATM stream which it transmits to CCR 4000. CCR 4000 maps the PCM samples from different incoming cells, destined for a single access switch, to outgoing cells each containing only PCM samples destined for one access switch. The output of CCR 4000 is transmitted to a transit crossconnect 600 which collects all cells destined for a common destination access switch into an ATM stream and transmits that ATM stream to the CCR 4000 of the second (bottom) (destination) access switch. The switching function executed by ATM crossconnect 600 is the same as the switching function executed by ATM-CM 550. In the destination access switch, the CCR remaps cells so that each cell contains PCM samples destined for a single composite cell reception ATMU 540. The output stream of CCR 4000 is sent to ATM-CM 550 of the destination access switch, where cells destined for a common ATMU are gathered into ATM streams for transmission to that ATMU. The ATMU then receives its input ATM streams and distributes the individual PCM samples contained in the stream to its PCM outputs. While FIG. 3 shows only a single ATM cell switch (transit crossconnect), in practice a network of such crossconnects is likely to be used.

Figure 4:
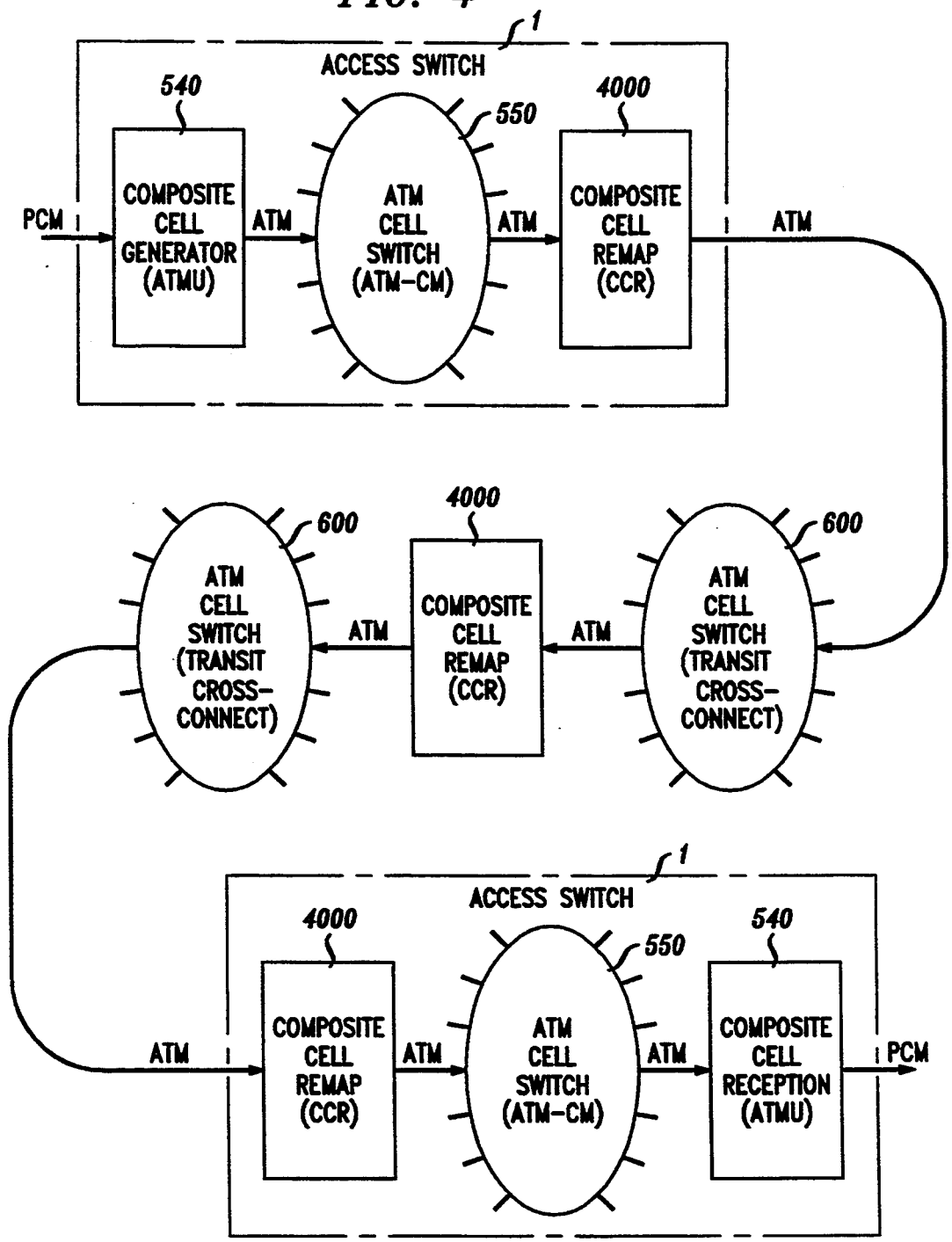

Finally, FIG. 4 illustrates a connection wherein the path through the transit network interconnecting the source and destination access switches includes two transit crossconnects connecting through a CCR. The actions in the source (top) access switch are essentially the same as described with respect to FIG. 3, except that in this case, the output of CCR 4000 of the source access switch may include cells which contain samples destined for a plurality of destination access switches. Presumably, this would be a case in which there is low traffic to each of the destination access switches served by this type of connection. First, the fight ATM transit crossconnect 600 receives inputs from a plurality of access switches and transmits those cells destined for reswitching to transit CCR 4000 interconnecting the two ATM transit crossconnects. In transit CCR 4000, samples destined for a common destination access switch are assembled into cells to be switched by the second (left) transit crossconnect of the transit network to that destination access switch. A second (left) ATM transit crossconnect then receives inputs from CCR 4000, as well as direct inputs from other access switches, and generates output ATM streams, each stream containing only cells with PCM samples destined for a common destination (bottom) access switch (as well as output streams destined for the ATM intertransit crossconnect CCR 4000 of the same type discussed as being received by the second ATM transit crossconnect). In the destination access switch, the same types of operations are performed as in the destination access switch of FIG. 3. The middle CCR receives special control signals from the overall network control or, following exchanges of messages between the two access switches, receives control signals from one of the two, to establish virtual paths and circuits using that CCR. The configuration of FIG. 4 can also have connections between the two transit crossconnects 600 in order to allow some of the CCR output cells to return to a crossconnect that may also be connected to a destination access switch. (Such a connection is shown as connection 7 in FIG. 11.) As previously stated for FIG. 3, the transit crossconnects may each represent an interconnected network of such crossconnect units.

While FIGS. 1–4 and many other diagrams of this specification show only a single direction of flow of information, it is understood that a comparable opposite flow of information is simultaneously taking place in essentially the same way. Each ATMU, for example, acts both as a composite cell generator and as a composite cell receiver. Similarly, each CCR performs its remap function in both directions.

Figure 5:
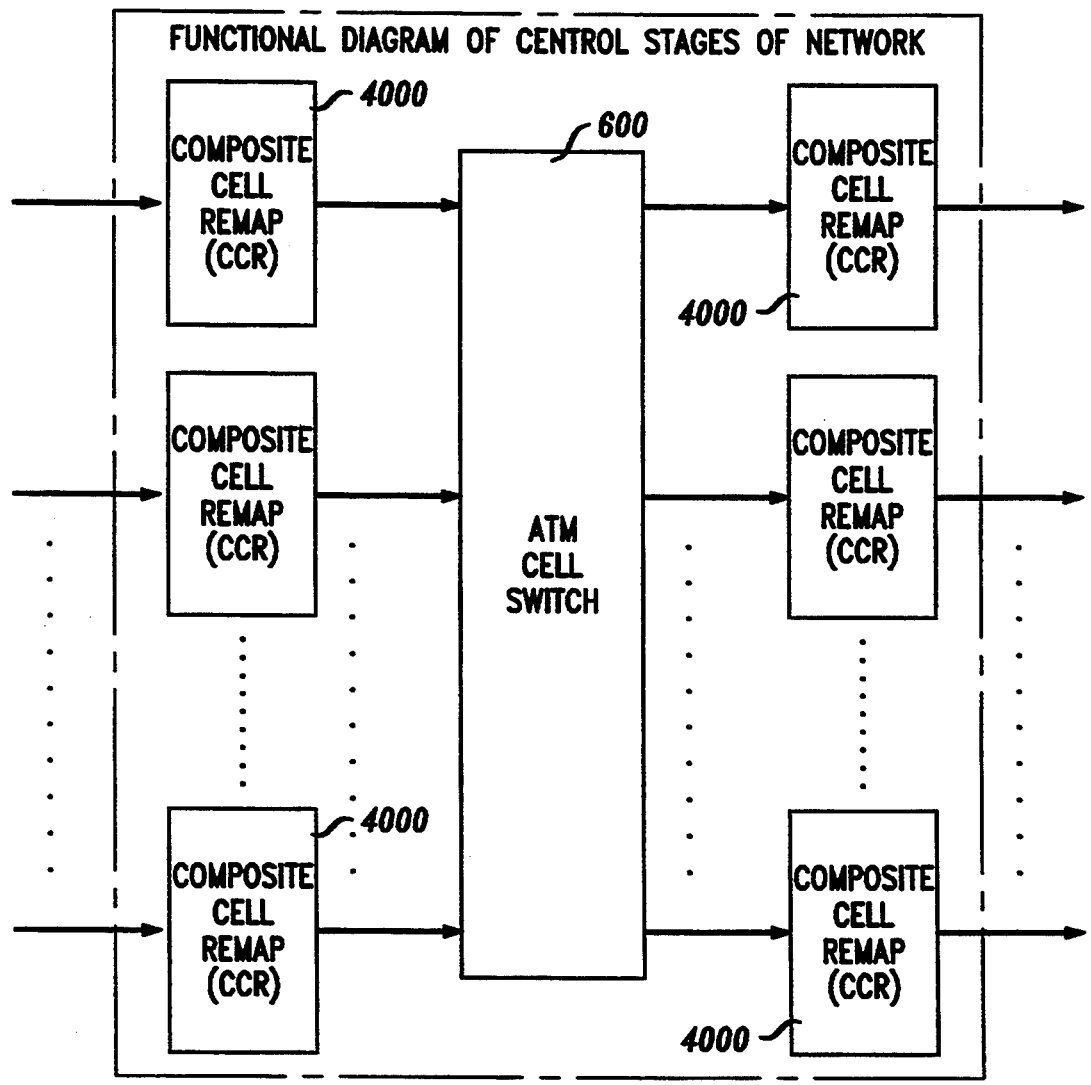
FIG. 5 is a functional diagram of central stages of a network, an ATM distribution network, designed in conformance with the principles of applicants' invention.
Figure 22:
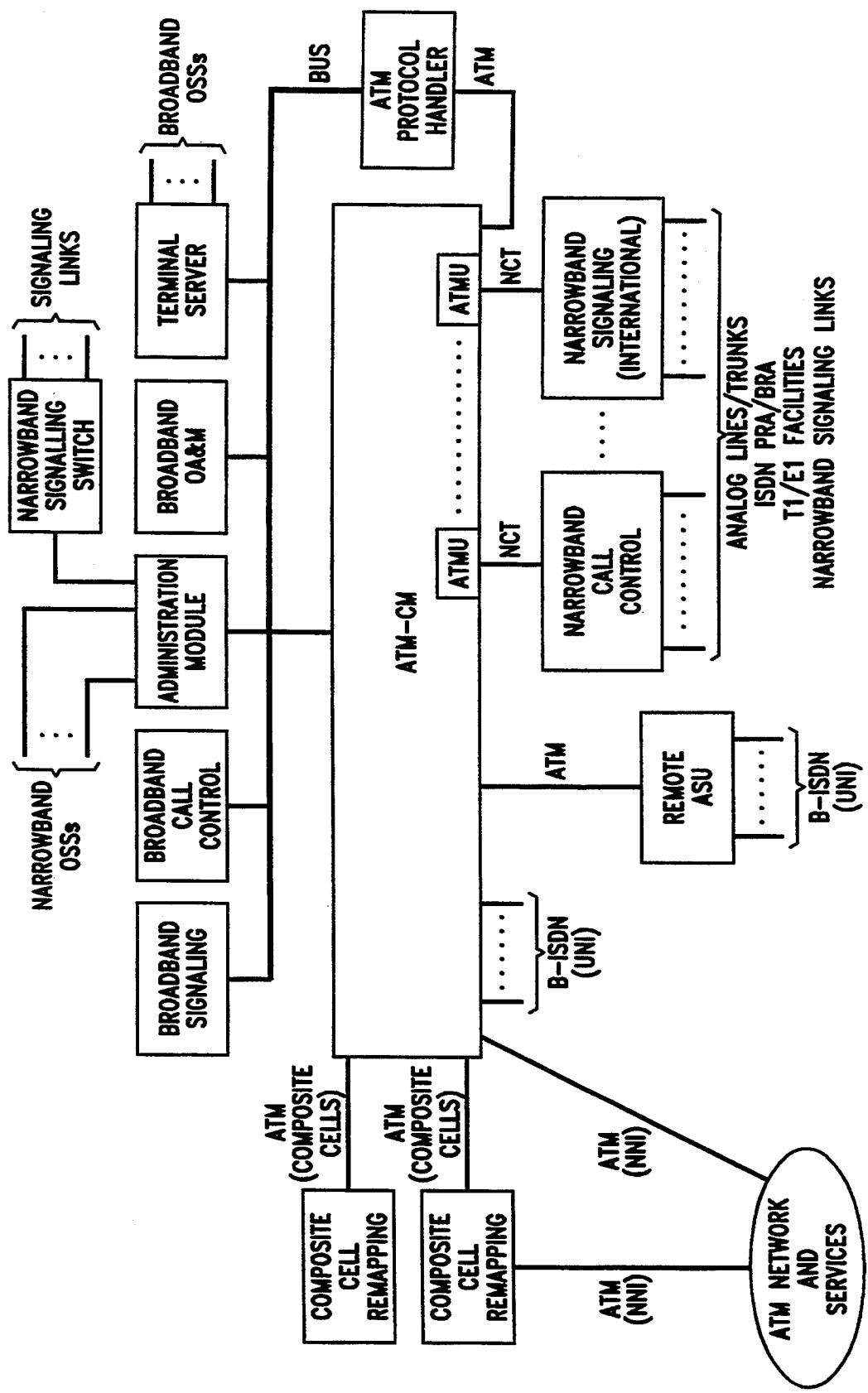
FIG. 22 is a block diagram of an ATM switch for supporting both broadband and narrow band ATM communications in conformance with applicants' invention.

FIG. 5 presents another view of the functions of the CCR and the ATM crossconnect. The input to the CCR comprises cells, each of which may have samples destined for a plurality of the CCRs at the output of an ATM crossconnect 600. The input CCRs gather these samples into cells, each of which contains samples destined only for a single output CCR. These cells are placed on an output ATM stream which enters the ATM crossconnect 600. The ATM crossconnect 600 then switches individual cells from all the incoming ATM streams to outgoing ATM streams such that the outgoing ATM streams each contain cells only destined for the particular CCR to which the output stream is connected. The output CCR then takes individual cells, each of which may contain samples for a plurality of the ATMUs of the access switch of which the output CCR is a part, and creates cells each of which contain samples destined for only one of these ATMUs. These cells are then subsequently switched in the ATM-CM of the output access switch to the appropriate ATMU of the output access switch. An ATM-CM 550 is basically an ATM crossconnect, enhanced to provide interfaces with other units as shown in FIG. 22. A distribution "network" consisting of a plurality of CCR units interconnected by one or more crossconnects is a very useful element for switching narrowband signals carried by ATM streams. In the preferred embodiment, such a distribution network accepts as its inputs ATM signals containing cells carrying PCM channels destined for any access switch accessible via the transit crossconnect connected to the output of the CCR (and in the case of a CCR directly linked to another access switch, the access switch to which the latter CCR is connected). The contents of the input cells to these CCRs are switched into cells each of which contains communications destined for a common access switch. The output cells of these CCRs are then switched in the transit crossconnect to the ATM streams connected to that destination CCR where the ATM signal is switched into cells each of which are destined for the same ATMU in the destination access switch. Advantageously, the combination of the CCRs and the transit crossconnect yields a distribution network of enormous capacity with low blockage for serving a large number of very high capacity access switches. In theory, the CCRs can be associated with either the access switches or the transit network. In the preferred embodiment, the control information required by the CCR comes naturally from the control of the access switch, thereby making a co-location of access switch and CCR more natural.

Advantageously, in such an arrangement permanent virtual paths can be established through the transit crossconnects for composite cells each carrying individual PCM samples for a plurality of PCM channels. Such permanent virtual paths can be pre-provisioned and need be activated only when an additional group of channels is required for a particular source/destination couplet of the transit crossconnect and are deactivated only when there is a substantial reduction in the need for the number of channels required of permanent virtual paths between such a source/destination pair of the transit crossconnect.

General Description

This General Description first presents an overview of all of the diagrams and is followed by a detailed description of special characteristics of elements of these diagrams for implementing applicants' invention.

Figure 6:
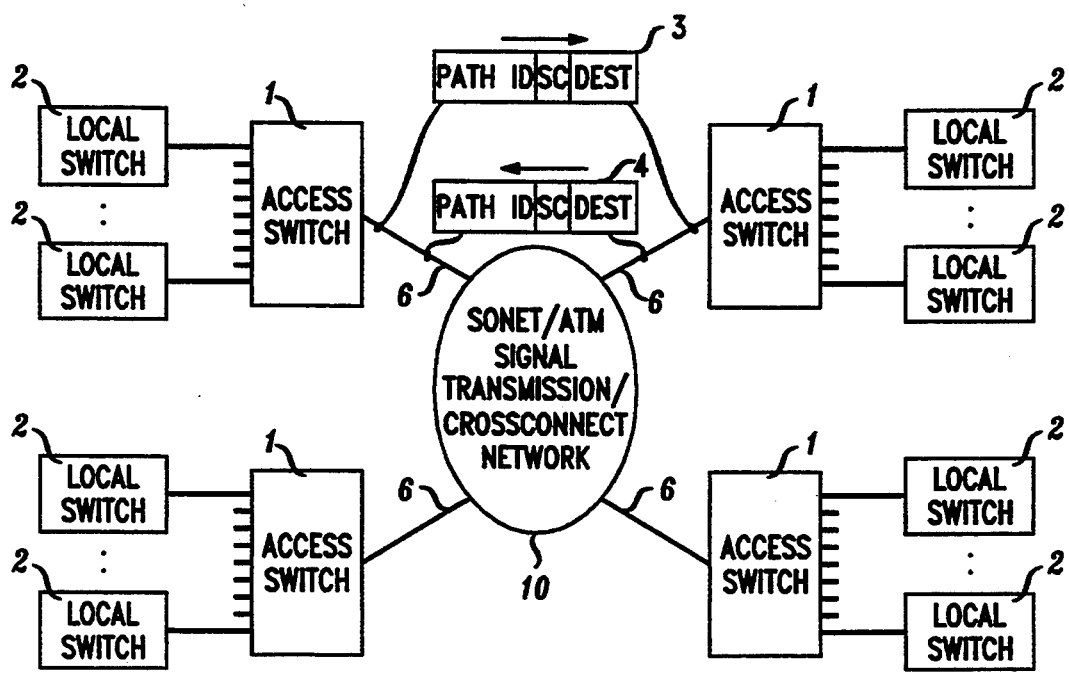
FIG. 6 is a block diagram showing a network of interconnected access switching networks.

FIG. 6 is a block diagram showing a plurality of interconnected access switching systems of a network. A group of access switches 1 are connected to an ATM signal transmission/crossconnect network 10 in accordance with the principles of this invention. Such a network is a network of ATM crossconnects for interconnecting a plurality of Composite Cell Remapping (CCR) units and for switching cells of the ATM streams generated by the connected access switches. Each access switch contains a CCR that receives an ATM signal from the ATM-CM of the access switch, comprising a plurality of Constant Bit Rate (CBR) composite cells each carrying signals destined for the network, i.e., for a CCR connected to the network, and distributes the individual PCM channel signals carded in each input cell to a CBR composite output cell having a common access switch as a destination. The composite output cell is then switched in the network of ATM crossconnects to a CCR of that destination access switch. The access switch contains an ATM interface unit (ATMU) for forming composite cells from PCM samples of inputs to the access switch and sending the composite cells on ATM signals to an ATM Communications Module (ATM-CM) which switches the individual cells of the ATM signal from the ATMU to the correct CCR of the access switch. Each composite cell of the output of an ATMU is destined for a single CCR of the access switch or for the same or for inter-access switch communicating for another ATMU of the access switch. Constant bit rate (CBR) cells are used to carry PCM voice traffic, and variable bit rate (VBR) cells are used to carry packetized data. (The term PCM as used herein refers both to voice signals transmitted by PCM and to data (including facsimile (FAX) and video) transmitted over PCM channels.)

Throughout this specification, there are frequent discussions of activation of permanent virtual circuits and permanent virtual paths. A permanent virtual path, comprising a plurality of permanent virtual circuits, is provisioned by including its identification in the memory of an ATMU, ATM-CM, CCR or ATM crossconnect. The memory is used for switching cells having the virtual path identification as their header, in the ATM-CM and ATM crossconnect and for identifying the cells to the ATMU and CCR for their operations. The virtual circuit information is retained in the ATMU and CCR in order to steer PCM samples between the correct cells or between the correct cells and correct PCM stream and position in that stream. A virtual path is activated only when actually used to carry communications. The number of provisioned permanent virtual paths can therefore be much greater than the number of activated permanent virtual paths. A permanent virtual circuit is similarly activated when the specific circuit (or channel), of an activated permanent virtual path, is used. If a cell of a virtual path is full and another channel is needed, then another, previously provisioned, permanent virtual path is activated to carry that channel over a virtual circuit of the newly activated permanent virtual path. Note that this is inconsistent with standard ATM terminology, but such terminology does not have to deal with composite cells for carrying a plurality of communications. Applicants have chosen to call the byte or segment position of a cell for carrying each such communication a virtual circuit since it carries, essentially, a circuit switched communication.

The access switch and transmission/crossconnect network can also be used for switching and transporting conventional packetized voice as illustrated in the cell of FIG. 17. The disadvantage of conventional packetized voice is that it incurs additional packetizing delay and it requires expensive interface circuits to assemble, store and transmit the 48 samples of speech that are conveyed in each cell.

The CCR units of the access switches are connected to entities which gather outgoing traffic and which distribute incoming traffic. The ATM-CM, to which a CCR is connected, switches individual cells of its input and output ATM streams between CCRs and Asynchronous Transfer Mode Interface Units (ATMUs), described further below. This unit distributes intra-cell traffic to a plurality of switch modules (SMs) of a 5ESS switch or distributes such traffic to one or more standalone switches. It may be desirable in the future to connect switch modules of more than one 5ESS switch to an ATMU.

Much of the traffic carded through the ATM signal transmission/crossconnect network 10 is CBR traffic wherein the individual CBR cells in each 125 μs frame are switched to a destination CCR unit. A CCR unit is used advantageously for switching toll voice traffic, because the access to a transit crossconnect for switching ATM cells provides the CCR with the ability to access a large number of different destination CCRs with different cells. The provision of (PVPs) permanent virtual paths to these destination CCRs and the relatively low rate of activation and deactivation of these PVPs allows for a relatively low rate of changes of paths in the network 10. The routing pattern for a particular permanent virtual path (PVP) does not change as long as the PVP is provisioned; the CBR cells can be routed according to a PVP as long as that PVP remains active. Similarly, PVPs in the ATMU also have a relatively long life. The dynamic portion of the switching of the ATM units in the access switches is primarily associated with the switching of VBR cells whose headers may be different with each 125 μs frame and which must be switched accordingly. The PVPs through the ATM-CM also have a relatively long active life since each PVP represents traffic from an ATMU to a source CCR, i.e., to a particular transit crossconnect. The configuration of the internal ATMU mapping data and the CCR internal remapping data change more rapidly as individual PCM voice call connections are established and disconnected. These units map individual PCM streams into specific locations within a PVP composite cell.

FIG. 6 shows the exchange of messages required to complete the selection of a CBR PVP and a PVC within that PVP. The ingress access switch signals to the egress switch (message 3) the identity of the source and destination parties, and the identification of the PVP and the PVC of network 10. The destination node returns with an acknowledgment (message 4) properly confirming that path.

The access switches are connected to the central SONET/ATM signal transmission/crossconnect network 10 by SONET/ATM access links 6. The term SONET (Synchronous Optical Network) is used herein to refer to either or both of the U.S. standard (SONET) or the European standard SDH (Synchronous Digital Hierarchy). SONET/ATM means SONET or SDH signals used to transport an ATM signal stream carrying ATM cells. Although not shown in FIG. 6, but shown in the details of block 10, FIG. 11, it is also possible to have links directly connecting the access switches within the network for those cases in which there is a large volume of traffic between two access switches. In this directly connected case, that part of the network functions as a 2-stage network (see FIG. 2), and a CCR function is only required in one of the two access switches or in one direction (e.g., incoming) in each of the two access switches.

Figure 7:
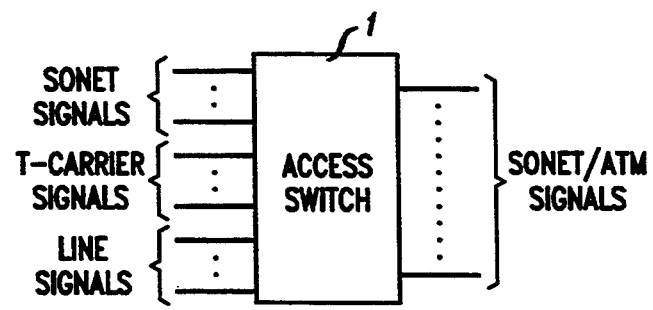
FIG. 7 illustrates the connections to the access switches of such a network.

The access switches themselves are accessed by a plurality of local switches. As indicated in FIG. 7, the local switches are connected to the access switches through digital facilities, such as the U.S. 24 channel conventional T carrier facilities or the European 32 channel systems for carrying PCM signals, which signals are converted in the access switches to CBR cells of ATM signals. The CBR cells discussed herein are primarily composite cells, each cell carrying data for a plurality of communications.

Figure 8:
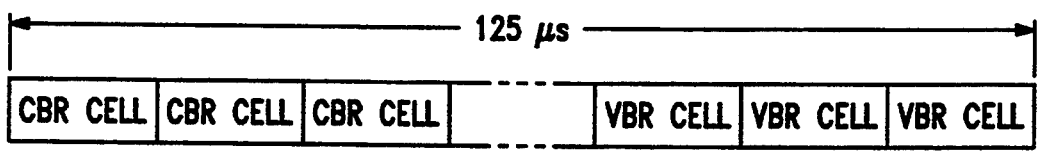
FIG. 8 illustrates one 125 μs frame of ATM cells (a glossary of abbreviations is found at the end of the Detailed Description) comprising a plurality of CBR and a plurality of CBR cells; the constant bit rate (CBR) cells carrying voice channels are sent every 125 μs.
Figure 24:
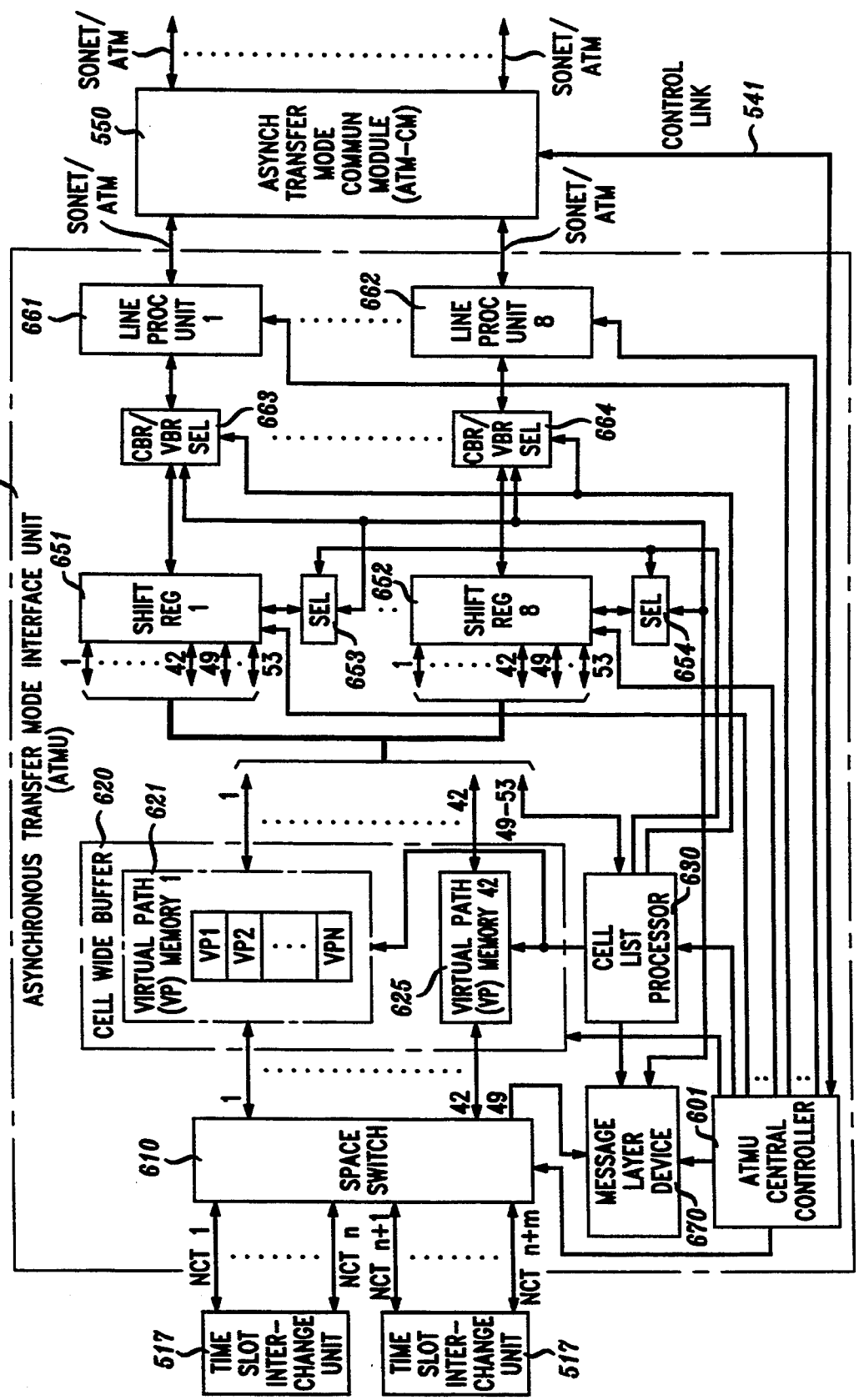
FIG. 24 is a block diagram of an Asynchronous Transfer Mode Interface Unit (ATMU) for interfacing between PCM signals and ATM signals.

FIG. 8 illustrates one 125 $\mu$s frame of a typical ATM signal that appears at the output of an Asynchronous Transfer Mode Interface Unit (ATMU) (FIG. 24). A 125 $\mu$s frame consists of a number of CBR cells and a number of VBR cells. For convenience, these are shown as being grouped at the beginning and end of each frame, but it is also possible to intersperse VBR cells among groups of CBR cells. The advantage of grouping the CBR cells in the indicated manner is that priority of CBR cells can be assured and the design of the cell list processor (FIG. 26, block 630) is simplified. Signals coming into an ATMU are interspersed CBR and VBR cells. CBR cells are transmitted from an ATM-CM (block 550, FIG. 23) as soon after they are received as possible, thus giving them priority over VBR cells; the output of an ATM-CM connected to an ATMU therefore is more likely to have CBR and VBR cells interspersed.

Figure 9:
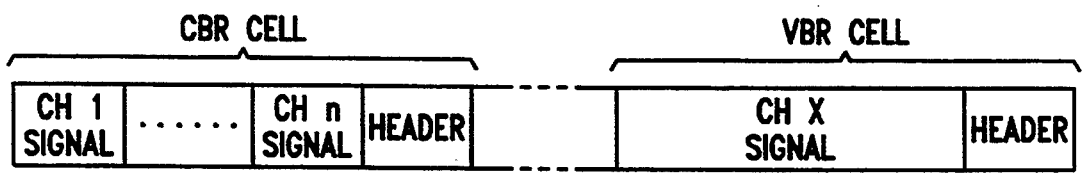
FIG. 9 illustrates an ATM segment including a CBR cell and a variable bit rate (VBR) cell.

FIG. 9 illustrates the content of a composite CBR cell and a VBR cell of a type used, for example, for transmission of signals across the ATM transmission/crossconnect network 10. The content of a CBR cell includes signals for a plurality of channels. Since an ATM cell comprises a 5 byte header and a 48 byte payload, one attractive arrangement is to have the 5 byte header identify the particular virtual circuit represented by the CBR cell, and to have the CBR cell payload contain the individual bytes (PCM samples) of 48 voice channels (64 kilobit PCM single channel DS0 signals). That is therefore, at of a CBR cell between CCR units.

In the preferred embodiment, a CBR cell as generated in the ATMU and transmitted between the ATMU and the ATM-CM carries PCM samples plus a supervisory signaling bit for only 42 separate channels in the 48-byte payload of an ATM cell. The transport of this supervisory bit, named the E-bit herein in conformance with 5ESS switch terminology, allows the supervisory state to be carried across module boundaries in the access switch, thereby simplifying compatibility with the present 5ESS switch architectural plan and software.

Described herein are arrangements for transporting a PCM sample plus one bit (the E-bit) having a specific purpose (supervision). More generally, A bits can be transported internally in a switch using the same principles, namely, transporting 8+A bit segments for each conversation, the A bits conveying information for an arbitrary function; of course, the greater the value of A, the fewer segments can be transported in each cell.

The VBR cell illustrated in FIG. 9 comprises a header and a payload, wherein the payload is associated with a single channel and a single destination. In effect, a VBR cell represents pan of a packet of data being transmitted from a source access switch to a destination access switch of the toll network.

It is, of course, also possible to have a CBR cell all of whose payload is devoted to a single communication, if the communication is a communication such as the 1.5 megabit/see signal required for a compressed television signal. A similar type of CBR cell, operating at a much lower repetition rate, can also be used for transmitting packetized voice signals, wherein 48 samples of a single voice channel are transmitted in one cell. For broadband signals, such as High Definition Television (HDTV) signals, it is more convenient to connect these signals directly to the ATM-CM. Based on the use selected for the CBR PVP as selected by the originating access switch, the payload in each cell is used as selected, with the same disposition being made for all cells transmitted over the CBR PVP for the duration of the existence of that PVP.

Figure 10:
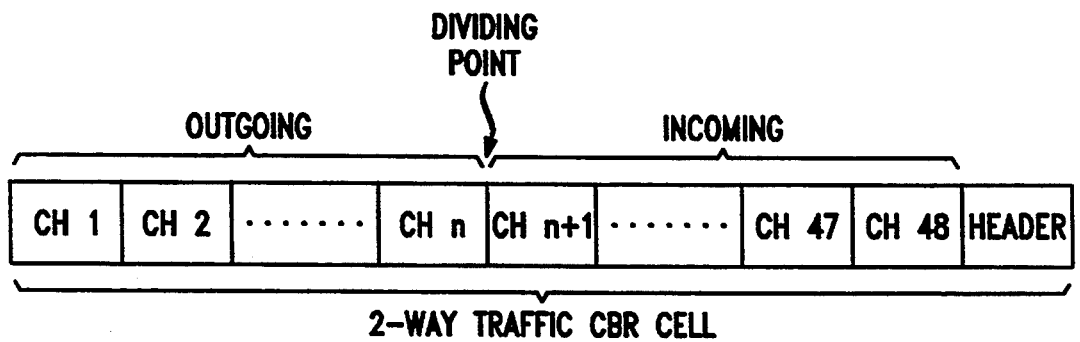
FIG. 10 illustrates one CBR cell for carrying traffic that is initiated from both of the two access switches communicating via the CBR cell.

FIG. 10 illustrates one CBR cell carrying two-way traffic, the first n bytes carry channels 1 to n of outgoing traffic, and bytes (n plus 1) to 48, carry (48 minus n) channels of incoming traffic. As discussed further hereinafter, the permanent virtual paths of this preferred embodiment are two-way, that is they consist of two-paired oppositely directed uni-directional PVPs. The two-way traffic described herein is the composite cell traffic that is originated from the two ends of a connection between a source and a destination. The object of the layout of time slots in a cell, such as that shown in FIG. 10 is to allow each direction of traffic to seize a time slot within a composite cell without encountering the concern that the other end is seizing the same time slot at the same time ("glare"). Since an egress CCR assigns a channel, the bytes for outgoing traffic are seized by one CCR, those for incoming traffic by the other CCR. This avoids "glare" problems wherein a channel is seized simultaneously for different cells from the two ends and where some back-out procedure is required. Since assignment of idle channels is upward from 1 for outgoing traffic and downward from 48 for incoming traffic, if many fewer than all of the channels are active, it will generally be possible to move the dividing point, set in this case between channel n and channel n plus 1, in the direction of additional requests for channels. The two-way traffic CBR cells are particularly useful for carrying traffic between a source and a destination CCR when there is relatively little such traffic being offered. One-way traffic CBR cells are useful when there is substantial traffic, because seizure is always from one end and "glare" problems can be avoided naturally.

Figure 11:
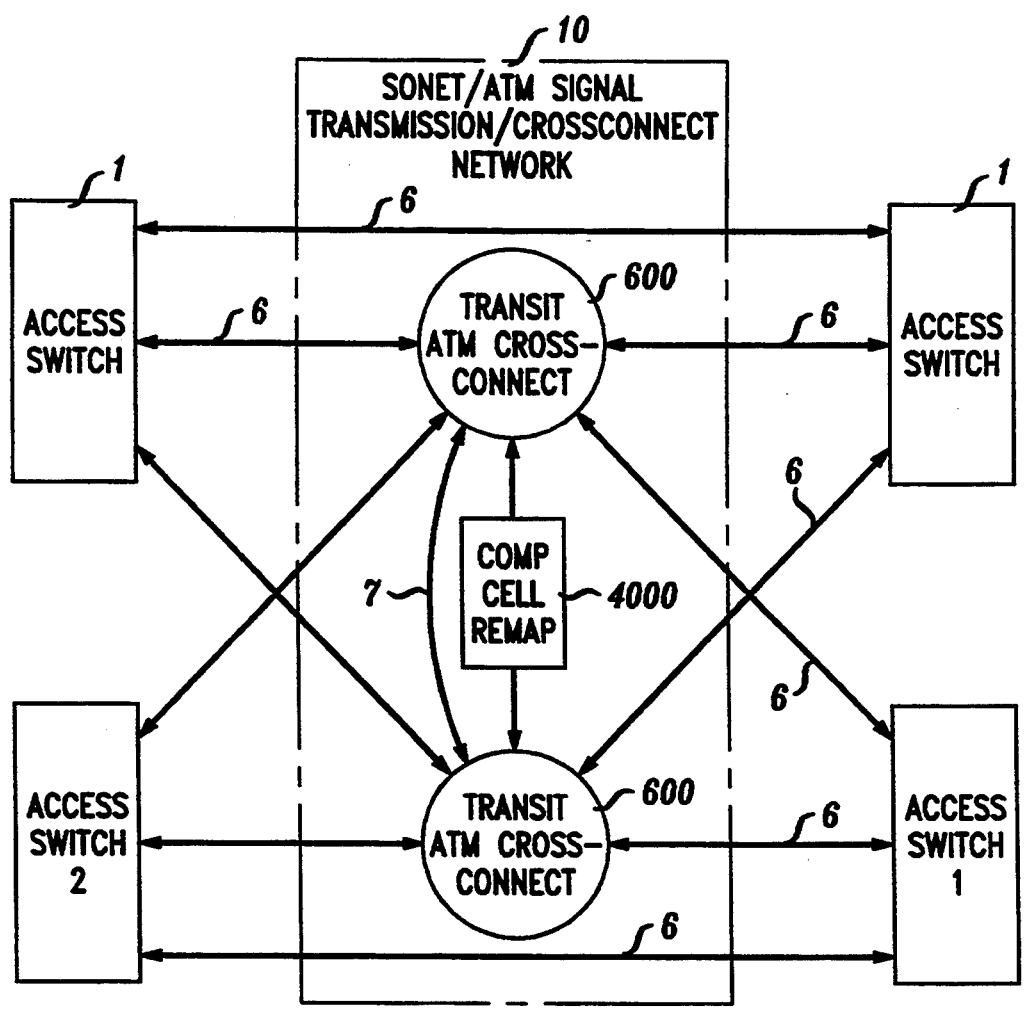
FIG. 11 illustrates the Synchronous Optical Network (SONET)/ATM signal transmission/crossconnect network of FIG. 6.

Because of the large number of switches that are required in, for example, the AT&T toll network, it is desirable to provide for an arrangement to switch cells from a plurality of CCRs in a transit ATM crossconnect 600 (FIG. 11). The transit ATM crossconnect is a switch which receives CCR inputs from a plurality of access switches and switches cells from these inputs for transmission over an ATM facility to CCRs of the plurality of access switches. As a result, in general, a CCR would have in its output individual CBR cells each of which carries signals destined for a single CCR, but the stream may have cells destined for a plurality of CCRs, the plurality being the CCRs to which the transit ATM crossconnect is connected. The CCRs connected to the transit crossconnects are full duplex CCRs for switching timeslots among cells in both the incoming and outgoing ATM data streams. Each such CCR is terminated not on another CCR but on a unit, the transit crossconnect, which switches cells to different ATM streams thus generating totally different ATM streams in contrast to the directly connected CCRs which bypass a transit crossconnect. For a CCR that is connected to only a single CCR, one of the CCRs, or one direction of each CCR can be simplified.

The transit crossconnects 600 have the function of switching cells from a plurality of ATM input data streams to a plurality of ATM output streams. Thus, the primary function is the same as the ATM-CM. One candidate for the transit crossconnect, therefore, is an ATM-CM. A second possibility is an ATM digital access and crossconnect system (ATM-DACS) which system is used primarily not as an active switch but as a means for providing generally long term connections among ATM facilities. The choice between an ATM-DACS and a unit like the ATM-CM depends on the rate at which new connections must be established and old connections removed in order to serve dynamic traffic adequately; the ATM-CM generally must establish virtual circuits more rapidly in order to accommodate packetized data transmission. At this time, it is believed that an ATM-DACS should be able to serve as an transit ATM crossconnect. The ATM-CM can also perform the function of providing conventional permanent crossconnects. It can provide crossconnect capability for ATM streams entering an access switch. Moreover, for example, spare capacity of an ATM-CM for a first access switch can be used for providing crossconnects between a plurality of other access switches, i.e., it can provide the functionality of one of the blocks 600 of FIG. 11. In addition, as discussed with respect to FIG. 4, two crossconnects may be connected through a CCR 4000. Such a CCR may require more dynamic control than the transit ATM crossconnects shown in FIG. 11. Further, to create greater access for access switches which have only a few cells destined for a particular destination access switch, an ATM inter-crossconnect link 7 may be provided to connect two crossconnects without performing cell remapping or to return a remapped cell to an ATM crossconnect; such connections also provide greater reliability in case of ATM link failures. The blocks of FIG. 11 are controlled by a centralized network control system (not shown) of a type used for controlling crossconnect systems.

Figure 12:
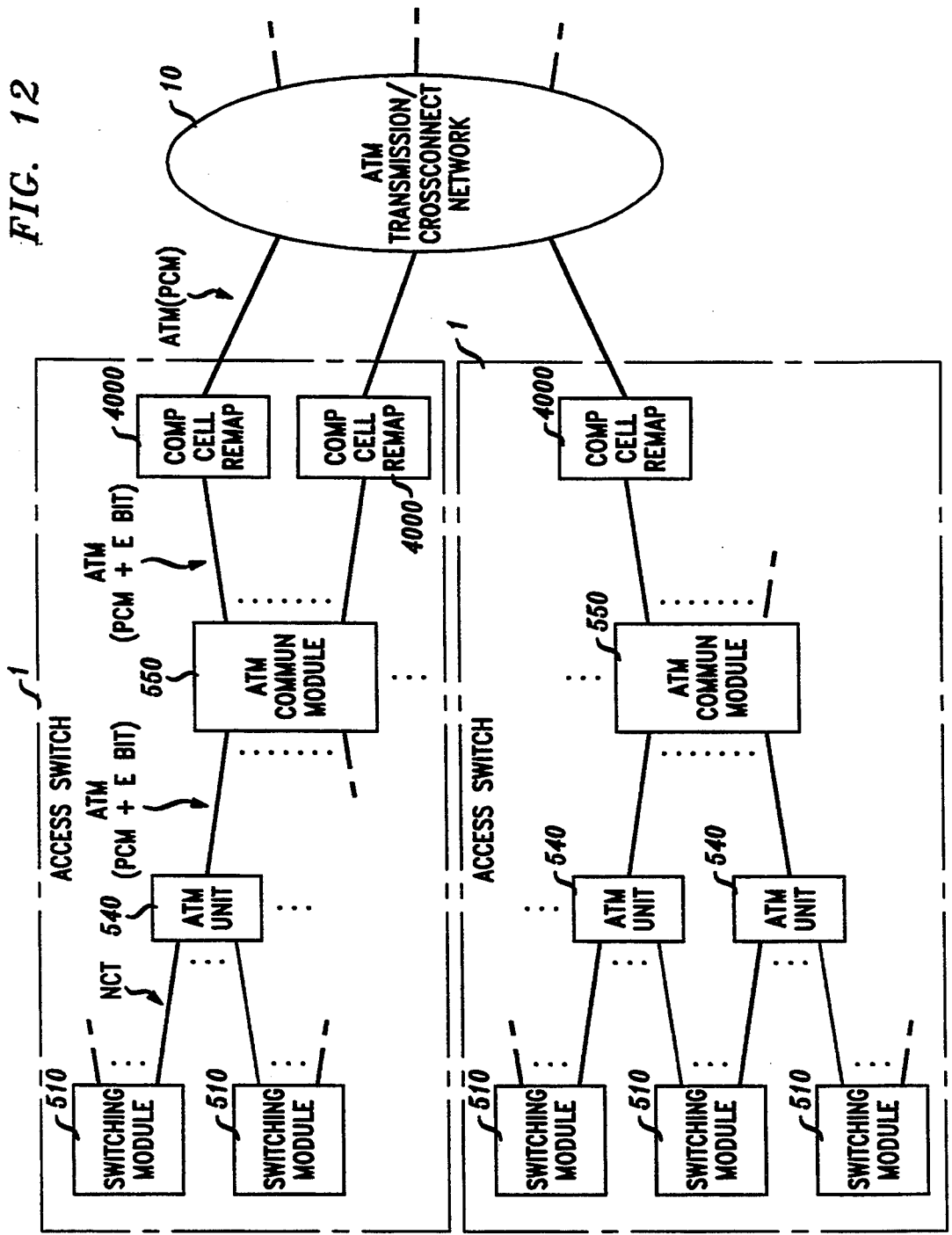
FIG. 12 illustrates the access switch structure and the position of a composite cell remap (CCR) function relative to the communication network.

FIG. 12, discussed in the Overview, is a diagram showing the relationships among the various blocks connected to an ATM network. In the exemplary embodiment, the inputs are switching modules which are connected to T-carrier facilities as well as analog trunks and analog or digital lines, and subscriber loop carrier systems. The outputs of the switching modules are 5ESS switch Network Control and Timing (NCT) links, each comprising PCM samples for a multiplicity of telephone conversations. Each NCT link is connected to one ATMU. The plurality of NCT links from each SM are connected to one or more ATMUs. In the ATMU, the PCM samples are packaged into cells of a plurality of ATM outputs. The ATM outputs of an ATMU are connected to one ATM Communication Module (ATM-CM) which keeps cells intact. The signals within each cell, destined for a single CCR, thence a single transit crossconnect, have access to a large number of access switches of a telecommunications network.

The output of the ATM-CM is connected to a group of CCRs 4000. Each CCR is controlled by ATM management module (AMM) 1202 (FIG. 30) for recording and controlling the virtual connections established within the controlled CCR. Each of the CCRs 4000 in an access switch 1 (FIG. 11) performs a cell remapping function, for switching any channel on any cell on its input ATM bit stream to any channel of any cell on its ATM output stream. The CCRs 4000 are part of access switches 1 connected to a SONET/ATM signal transmission/crossconnect network 10, shown in FIG. 11, by access links 6 which, in the preferred embodiment, also use SONET to carry the ATM signals. This network switches and transmits the CCR input/output links 6 of the access switches 1, directly interconnecting some, interconnecting others through Transit ATM crossconnects 600.

It may be desirable to provision some virtual circuits as "2-link" virtual circuits, each "link" representing a complete path between two access switches. The Real Time Network Routing arrangement, used in the AT&T toll network and described in U.S. Pat. No. 5,101,451, issued Mar. 31, 1992, can be used for selecting an optimum (i.e., relatively less heavily loaded) "2-link" circuit out of a plurality of such circuits. This is especially true where the expected CBR voice traffic between two access switches is much less than one cell per time frame, (i.e., less than 48 channels). The "two link" circuit shown in FIG. 21 requires traversing two CCRs and an ATM-CM at the intermediate node, and is equivalent to a five stage connection in the terminology of FIGS. 1–4. An alternative for providing an alternate route is a "four-stage" switch as discussed with respect to FIG. 4, using a CCR in network 10 as shown in FIG. 11.

In the exemplary embodiment, the ATM signals between the ATMU and the ATM-CM carry 9-bit segments for each conversation, an 8-bit PCM sample and the E-bit for that channel. Inputs from an ATMU to an ATM-CM may be switched back to the same or a different ATMU, or be switched to a CCR. Within the ATM-CM, individual cells of an ATM stream are switched to one of a plurality of ATM streams, but the content of each cell is kept intact. Since PCM signals that are switched back to the ATMU or from one ATMU to another require, in the preferred embodiment, the maintenance of the E-bit, the ATM signals passing through the ATM-CM maintain the E-bit signal associated with each PCM sample, including those signals passed from the ATM-CM to the CCR. In the preferred embodiment, each ATMU is connected to only one ATM-CM; this simplifies the provisioning of permanent virtual circuits. Alternative arrangements wherein an ATMU is connected to two or more ATM-CMs for reliability or for greater traffic flexibility are also possible.

When the digital facilities themselves carry packetized data, then this packetized data is processed by a Packet Switch Unit 519 (FIG. 23) within a switching module (SM) 510 of a digital switch, sent via the Time Slot Interchange Unit (TSIU) 517 of that SM to the ATMU 540 where it is converted to VBR ATM cells and transmitted over VBR PVPs to an ATM Communication Module (ATM-CM) 550. The ATM-CM has as its inputs and outputs a plurality of ATM bit streams, and has the capability of switching individual ATM cells from one of these bit streams to another; unlike the CCR, the ATM-CM does not unpack data within the payload (48 bytes) of an ATM cell, but only switches complete cells. In addition, signaling channels are treated as CBR or VBR channels and are transported, accordingly, in CBR cell channels or single channel VBR cells of the type described below. Significantly, by transporting signaling channels through the ATM network, the necessity for a separate signaling network, using Signal Transfer Points (STP), is avoided. For example, signaling information can be sent from a source switching module to a destination switching module over the physical paths shown in FIG. 20.

Thus, the SM is arranged so that any input of an incoming PCM stream may be placed in any time slot of any output NCT link. The ATMU is arranged so that any time slot on any NCT link input may be placed in any slot of any cell of any ATM output of the ATMU. Each ATMU is connected to a single ATM-CM in the preferred embodiment. The ATM-CM can switch any cell on any input to any cell on any output, but cannot switch data internal to cells. The CCR is arranged so that any channel (slot) of any cell of the input line may be connected to any channel of any cell of the output line. The SM, ATMU and CCR control memories are updated on each new call. In contrast, the ATM-CM has the function of connecting any cell of any input to any cell of any output line. Consequently, the control memory contents of the ATM-CM are relatively static for the composite cell CBR PVPs and are changed only when it is necessary to activate a transmission path (which transmission path can then serve 42 or 48 calls). It is therefore desirable to provide an ATM-CM control mechanism with a repertory of permanent virtual circuits which may be activated as needed.

Those outputs of an ATM-CM which are connected to the CCR do still carry 9 bits for each voice channel. In the preferred embodiment, each CCR has one ATM input connection and one ATM output connection, (treating the connection to the ATM-CM as the input and the connection to the SONET/ATM signal transmission network 10 or to the same or another ATM-CM as the output). In the CCR, only time division switching occurs. The contents of each composite cell are disassembled and reassembled in new time positions within a plurality of destination cells of the CCR. In the CCR, any PCM input sample in any position of any cell, may be switched to any position of any cell of the output of the CCR. Further, since the outputs of the CCR go to the ATM transmission network, there is no further need to carry along the E-bit associated with each PCM sample.

Note that while in the preferred embodiment, the CCR has only one physical ATM input stream and one physical ATM output stream, future changes in technology may make it desirable to provide, effectively, two stages of space division switching, one in the ATM-CM and one in the CCR, by providing the CCR with several input and output data streams. Similarly, and especially in view of the limitation on capacity imposed on the ATMU by the speed of its signal memory 620 (FIG. 24), it may be desirable to provide the ATMU with only a single ATM output stream. The present configuration assumes that the ATM-CM can switch cells from any input to any output, and each ATMU is connected to only a single ATM-CM; therefore, multiple ATM output streams from the ATMU do not increase the "reach" of the ATMU, provided the single output has as many cells per frame as a plurality of ATM outputs from the ATMU.

For an intra-access switch call (a call which does not involve the use of the CCR) a control mechanism which is either a switching module processor or an administrative module for the switch selects first a half-path between the originating switching module and the ATM-CM and then establishes the other half-path between the ATM-CM and the terminating switching module. Usually, the path through the ATM-CM will be an activated pre-provisioned virtual path known to the administrative module and provided to whichever processor(s) are used for controlling the path establishment in the SM and the ATMU; occasionally a new pre-provisioned virtual path must be activated, deactivated, or two activated paths consolidated.

An interswitch call via a transit crossconnect, requires the use of a CCR for each half-path. The half-path for the originating end is provided with the identification of a circuit group cell in the ATM-CM that connects the ATMU with the selected CCR and this half-path is established in essentially the same way that a half-path for an intraswitch call is established. In the CCR, it is necessary only to find an available channel in any cell of the ATM output which is destined for the destination CCR. The destination CCR must be informed of the identity of the cell and channel within the cell that is carrying the particular conversation and the same type of path establishment procedure is then carried out at the terminating access switch.

For an inter-switch call, each access switch half path is between a switching module and a CCR, and the processor of the module (a switching module processor) and the processor of the CCR (Administration Module 530, FIG. 23) control the termination of the two ends of the half path. For an intra-switch call, the two ends of the path are terminated at the switching modules, and the switch module processor (SMP) of these modules control the termination of the path.

Since the signals interconnecting the SMs, ATMUs, ATM-CM, CCRs and transit crossconnects are all signals capable of being transmitted over optic fiber, the units need not be in the same location. For example, an ATM-CM, thence a CCR may gather traffic from a group of SMs that are scattered over a relatively wide area. While a CCR could be colocated with a transit crossconnect instead of being colocated with ATM-CM, the arrangement in the preferred embodiment has the advantage of locating the CCR near its source of control information, i.e., the controls of the ATMU, ATM-CM and CCR. The object of this type of network configuration is to minimize the number of cases in which further reswitching is required. For cases in which there is relatively little traffic between two regions, a single ATM facility to a single transit crossconnect such as the top unit 600 in FIG. 11 (or two geographically diverse ATM facilities to two different transit crossconnects to provide backup) may be used to interconnect all traffic that has been gathered from a large region and transmitted to another crossconnect such as the bottom unit 600 in FIG. 11 for connection to the large region at the other end for subsequent redistribution.

In this network, the ATMU can arrange different PCM samples into different cells and, since the ATMU has a plurality of ATM outputs, can also perform space division switching to place any particular cell on any of the outputs. (The latter facility is not really needed since the ATM-CM can switch any input to any output.) The ATM-CM performs switching of cells from any of its input ATM streams to any of its output ATM streams, but without changing the payload contents of individual cells, i.e., PCM samples are not switched from one cell to another. The CCR can move PCM samples between different cells but in this embodiment performs no space division switching since it has only one physical ATM input stream and one physical ATM output stream. The transit crossconnect performs a switching function similar to that of the ATM-CM, namely, any input cell can be moved to any output ATM stream, but PCM samples are not moved from cell to cell. Consequently, individual cell outputs of the ATMU are such that any given cell has as its destination a single CCR which is connected to a single transit crossconnect; therefore, all PCM samples in a cell generated by the ATMU have as a common destination a given transit crossconnect. (This, or course, refers only to interaccess switch cells since cells which remain in the same access switch are restricted only to having the switching modules or systems connected to a single ATMU as their common destination. Similarly, those cells which are switched by the ATM-CM to a CCR that is connected directly to another access switch without passing through a transit crossconnect, have, as their common destination, that access switch.) The cells at the output of a CCR, which output is also an input to a transit crossconnect, have as their common destination a single destination CCR. The output of the destination CCR is cells each containing PCM samples of switches or modules connected to a single ATMU.

Figure 13:
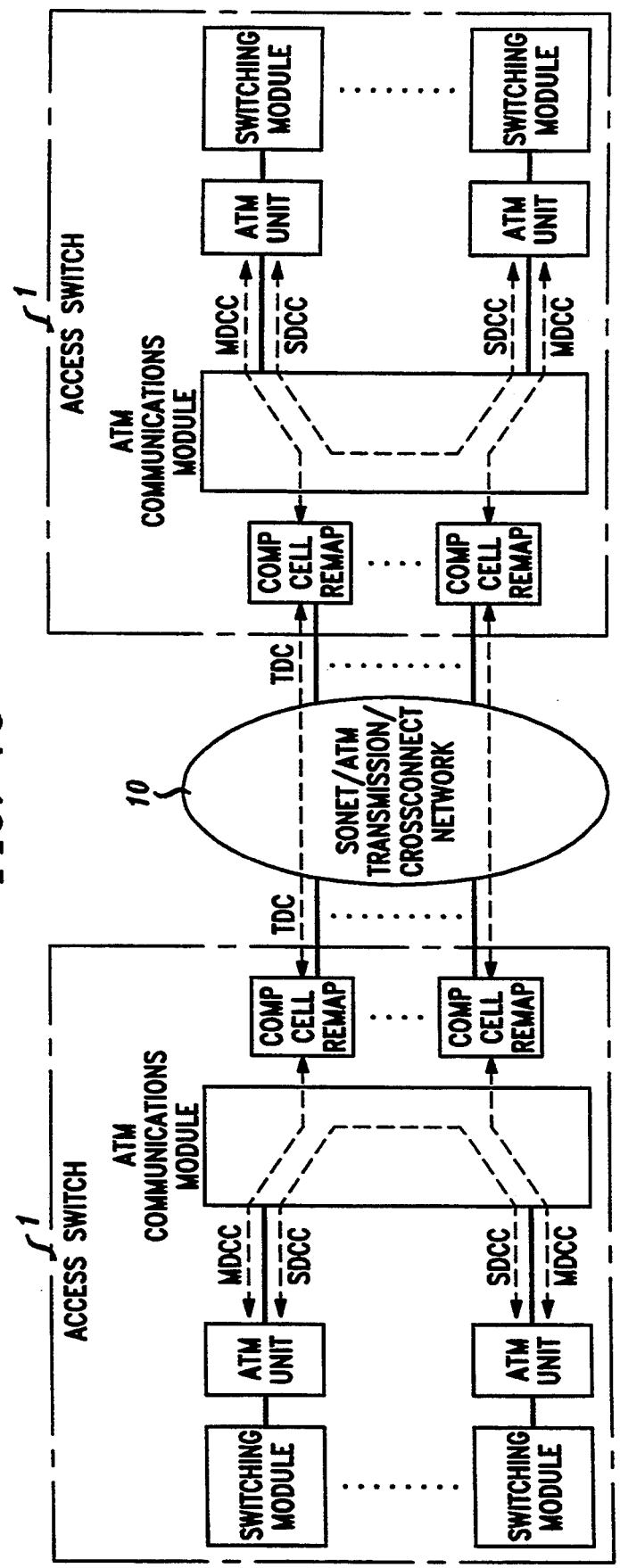
FIG. 13 presents an overview of how cells are transmitted from a source switch module to a destination switch module.

The topology of the switching plan can also be understood by examining the contents of different types of ATM cells. FIG. 13 shows the transport of DS0's using the three types of CBR composite cells. The timeslots between SMs of one access switch are transported using single destination composite cells (SDCCs). Timeslots destined for other access switches are transported internally within an access switch via multiple destination composite cells (MDCCs). In the particular embodiment using a 5ESS switch, only 42 PCM samples (time slots) are transmitted in each SDCC or MDCC. The other 6 bytes are used to transmit an E-bit for each channel (representing the supervisory state of that channel) and to transmit a Cyclic Redundancy Check (CRC) code. For SDCC cells transmitted toward another SM of the same 5ESS switch as the transmitting SM, the E-bit is preserved and transmitted back. For MDCC cells leaving the access switch, the E-bits and CRC are stripped prior to generating a TDC (Tandem Destination Cell) cell comprising 48 PCM samples.

FIG. 13 is a block diagram showing an access switch using an ATM-CM for providing connectivity between 5ESS Switch Switching Modules; in this case the switching modules are used for providing connectivity to other local switches. The ATM-CM provides access via the CCRs and network 10 to other access switches. When the ATM-CM acts as a crossconnect, separate segregated ATM facilities can be connected to other local switches from the ATM-CM. The SM in FIG. 13 is either a Switching Module of a 5ESS switch or a Switching Module-2000, described in Document 015-372-101, "5ESS-2000", July 1993, available from the Customer Information Center of AT&T, but both will be referred to herein as an SM. The ATM Unit (ATMU) provides an interface between a 5ESS Switch SM and the ATM-CM. The SM interface to the ATMU is an NCT link carrying a sequence of independent, single byte, 64 kbps time slots, as described in the following section, each byte enhanced by eight additional control bits including the E-bit previously described. The MDCC, SDCC, and tandem destination cell (TDC) signals shown in FIG. 13 are described further with respect to FIGS. 14–17. FIG. 13 also shows a composite cell remap unit (CCR) for forming CCR output composite cells each of which has as a destination a single CCR 4000 (FIG. 42), or a single access switch 1 connected to such a CCR, but each such CCR output composite cell may carry channels that go to different ATMUs of a destination access switch. In order to handle the special problems of the 5ESS switch, (transporting "E-bits" between switching modules), the single destination composite cells (SDCC) differ from the more general single destination composite cells (TDC) described with respect to FIGS. 16 and 17.

Internal to the switch, composite ATM cells are always used, but in interfacing to the network there is the option of using either composite ATM cells or conventional packet voice ATM cells. The payload in composite cells consists of 64 kbps samples from up to 48 separate calls, whereas a conventional packet voice ATM cell contains 48 samples from a single call.

The three types of composite cells are:
Single Destination Composite Cell (SDCC),
Multiple Destination Composite Cell (MDCC),
Tandem Destination Cell (TDC).

ATMU to ATMU connectivity uses the SDCC format. Since there are a relatively small number of ATMUs in a switch there is generally a lot of traffic between all ATMUs. Thus, paths carrying SDCC represent an efficient use of bandwidth.

FIG. 14 is a representation of the SDCC format. The cell destination is another SM.

A maximum of 42 simultaneous calls (and their associated E-bits) (48 byte payload) is accommodated. The ATMU maps the time slots which have the same destination ATMU into the same cell.

FIG. 14 is an example of a mix of time slot numbers which go to the same ATMU. The time slots are not necessarily in any order within the cell since time slot numbers change as calls are set up and torn down. Some byte locations (i.e., time slots) in the cell may not contain any information since the cell is not necessarily full, i.e, there may be fewer than 48 voice or data connections to/from the destination ATMU.

Although within the switch, SDCCs make efficient use of bandwidth the same is not true for cells going to other switches. For example, a particular ATMU in a switch may have very little traffic going to an ATMU in another switch and would still have to use a path capable of carrying 42 channels with the result of having many empty (unused) slots in the cell. In order to communicate more efficiently from an ATMU to the Composite Cell Remap (CCR) function, time slots which are destined for multiple switches accessible from a single CCR of the source access switch via a transit crossconnect, are packed by the ATMU into a single Multiple Destination Composite Cell (MDCC). FIG. 15 shows the cell structure. The MDCC also carries 42 voice channels instead of 48 because of the desirability within the ATMU of generating a single output format, set by the requirements of the SDCC.

The destination of these MDCC cells is a single CCR of the originating access switch. The mixture of cells with ATMU, access switch, or CCR destinations and the number of time slots going to a particular switch is a function of traffic conditions and will vary from ATMU to ATMU. The MDCC implementation allows reduced bandwidth between the ATMUs and the CCR because sparsely filled composite cells to/from ATMUs in other access switches are avoided by packing the time slots into an MDCC.

Paths carrying Tandem Destination Cells (TDC) are used to provide connectivity between CCRs. These TDCs can use either a composite cell format or conventional packet cell (48 samples of one conversation in one packet) format as shown in FIGS. 16 and 17.

For implementation of the composite cell format shown in FIG. 16 the CCR extracts the time slots from the MDCC and aggregates them with the time slots extracted from all received MDCCs from all the ATMUs in the access switch to form composite single CCR destination ATM cells. These composite cells have a single access switch (i.e., CCR) destination as specified in the header. Messaging between the SMs and the CCR is necessary to correlate the DS0 position in the ATM cell with the destination switch identity. Since no E-bits or CRC check are needed for inter switch connectivity, up to 48 simultaneous calls can be handled by the composite TDC ATM cell even if the switches used are 5ESS switches. Some DS0 positions may be empty depending on traffic conditions.

The CCR can also be used to convert the composite cell structure used inside the switch to "conventional packet voice" TDCs for transmission between switches as shown in FIG. 17. In order to carry out this function, the CCR accumulates 48 voice samples from each of the calls (active time slots) in the MDCCs, buffers them and then sends them out to the destination switch. The conventional cell TDC can also be used for packetized data.

ATMU

The primary purpose of the ATMU is the mapping of single byte PCM time slots into 53 byte ATM cells as well as providing the inverse function. The output of the ATMU towards the ATM-CM is ATM cells and toward the SM it consists of single byte time slots.

Figure 18:
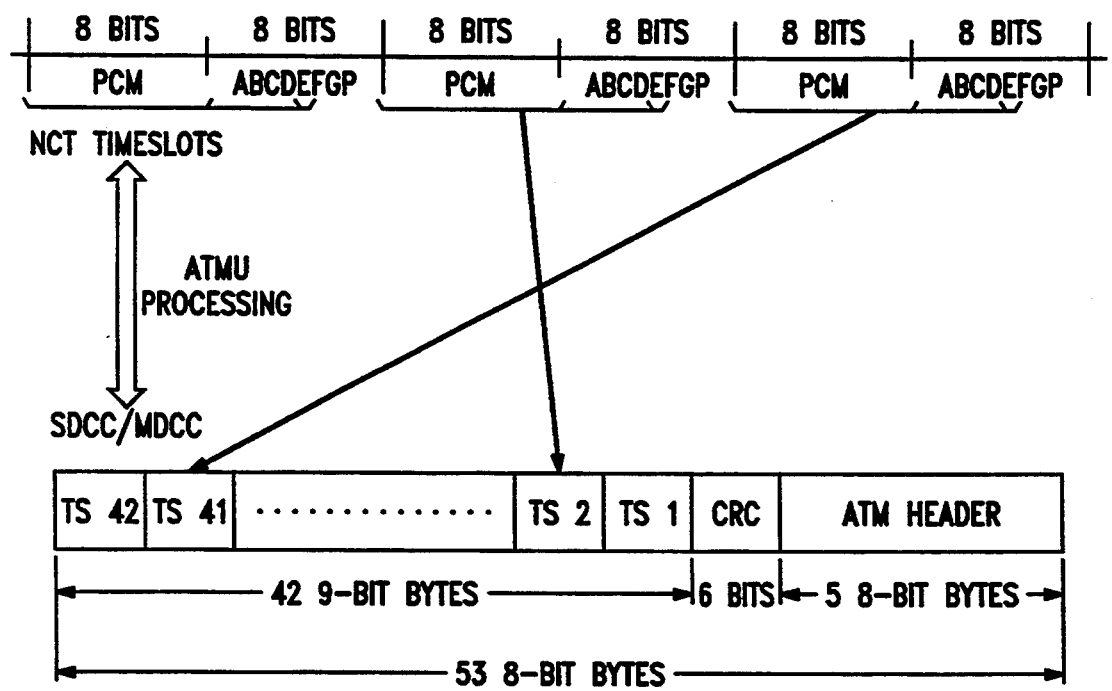
FIG. 18 illustrates the mapping performed between incoming time slots to an ATMU and an SDCC/MDCC (Single Destination Composite Cell/Multiple Destination Composite Cell) cell.

FIG. 18 shows the mapping between NCT PCM timeslot data and an SDCC or MDCC. FIG. 18 shows that up to 42 8-bit PCM samples from 42 distinct calls, plus their corresponding E-bits, plus a 6-bit CRC check field make up an SDCC or MDCC composite cell. The choice of a 6-bit CRC field is clearly an implementation choice and a larger or smaller CRC, or no CRC, could be implemented, as could other functions such as framing or parity information.

CCR

It is very inefficient if each ATMU on one access switch requires dedicated composite ATM cells (53 bytes each) to each ATMU in all the other access switches to which it is connected. This inefficiency gets geometrically worse with increasing numbers of ATMUs in an access switch. It also requires an Operation, Administration, Maintenance and Provisioning (OAMP) update for every switch whenever an ATMU is added in any switch. In the preferred embodiment, ATMUs send ATM cells to the Composite Cell Remap (CCR) function in their access switch, to aggregate the time slots from all ATMUs in that switch which have the same access switch destination into ATM cells and send them to the destination access switch.

The primary functions of CCRs are:
1. An operation must be performed which "remaps" internal composite cells into external cells. This remapping is done by the CCR.
2. For a 5ESS switch, the CCRs also perform the E-bit functions for inter-switch narrowband-to-broadband calls, since only one SM is involved in these type of calls. Refer to the call scenarios of FIGS. 34–41 for more detail regarding the E-bit functions of the CCRs.

Figure 19:
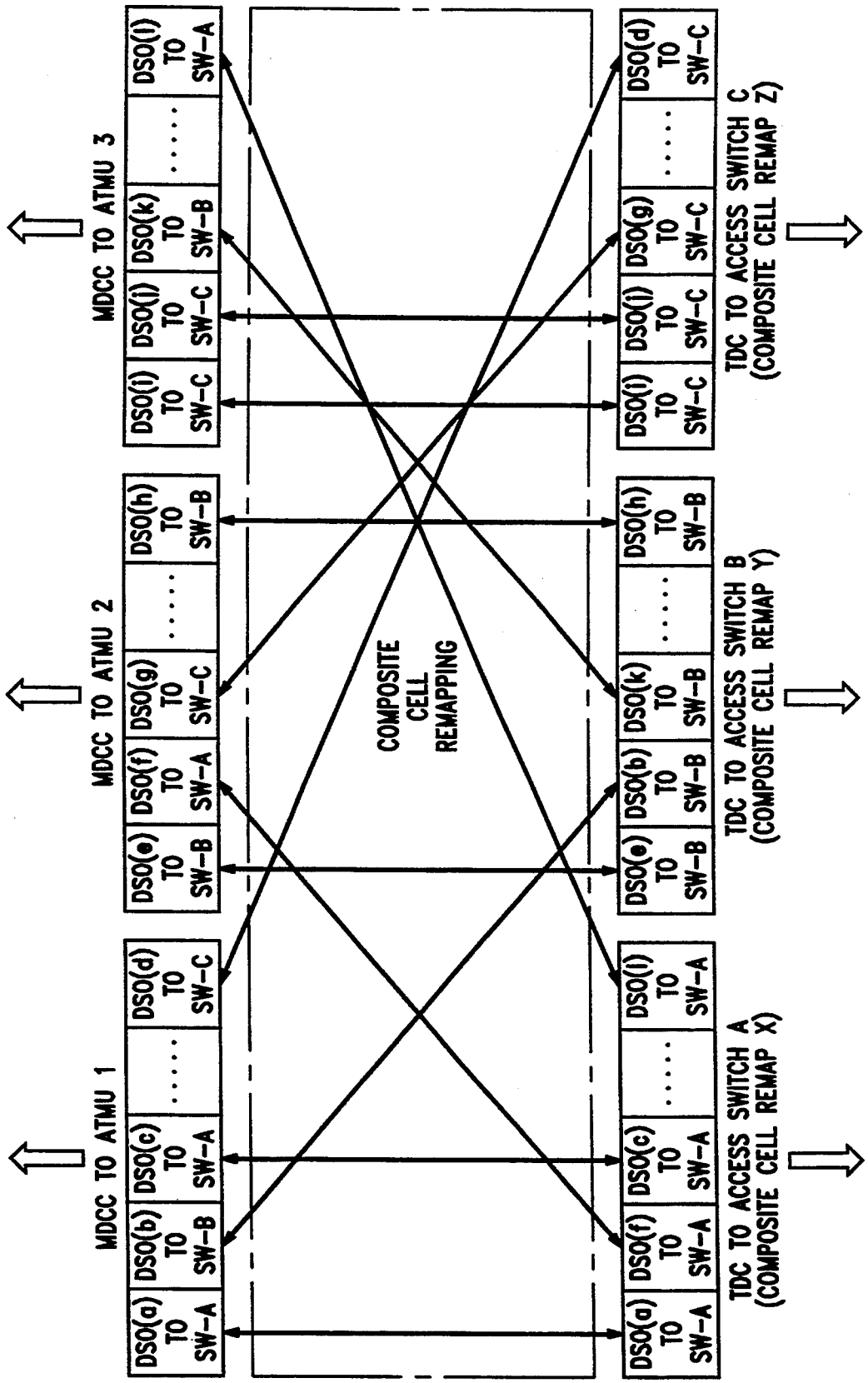
FIG. 19 illustrates the remapping function performed in the CCR.

The CCR takes DS0s that are destined for the same access switch (CCR) from possibly multiple MDCCs and places them into one or more TDCs that are switched to the given destination access switch as shown in FIG. 19.

At the destination access switch, an inverse process occurs. In this case, DS0s from the TDCs are mapped by the CCR into MDCCs that are internally switched by the ATM-CM to the proper terminating ATMU. As previously discussed with respect to FIG. 11, CCRs are interconnected primarily via transit crossconnects.

The foregoing composite cell discussion outlined the mechanism by which DS0s are transported between two ATM-CM offices. The signaling procedures work in concert with the composite cell hardware to negotiate and set up composite cell ATM paths and composite cell DS0 locations.

As in the case of the SDCC cells discussed earlier, a plurality of inactive virtual paths are initialized in the transit crossconnect. With MDCCs or SDCCs, whenever no channels are available between a particular source CCR and destination CCR or switch, an inactive virtual path is seized and made into an active virtual path. Channels are seized on active virtual paths having an available channel. For MDCCs, which connect ATMUs and CCRs, the assignment of a channel is performed not when the virtual path is activated but when the particular communication is requested. Any activated MDCC and TDC, interconnecting source and destination, with at least one available channel can be assigned. For SDCCs and MDCCs, new virtual paths are activated as needed on a per call basis, and channels within the virtual paths are assigned on a per call basis.

Figure 20:
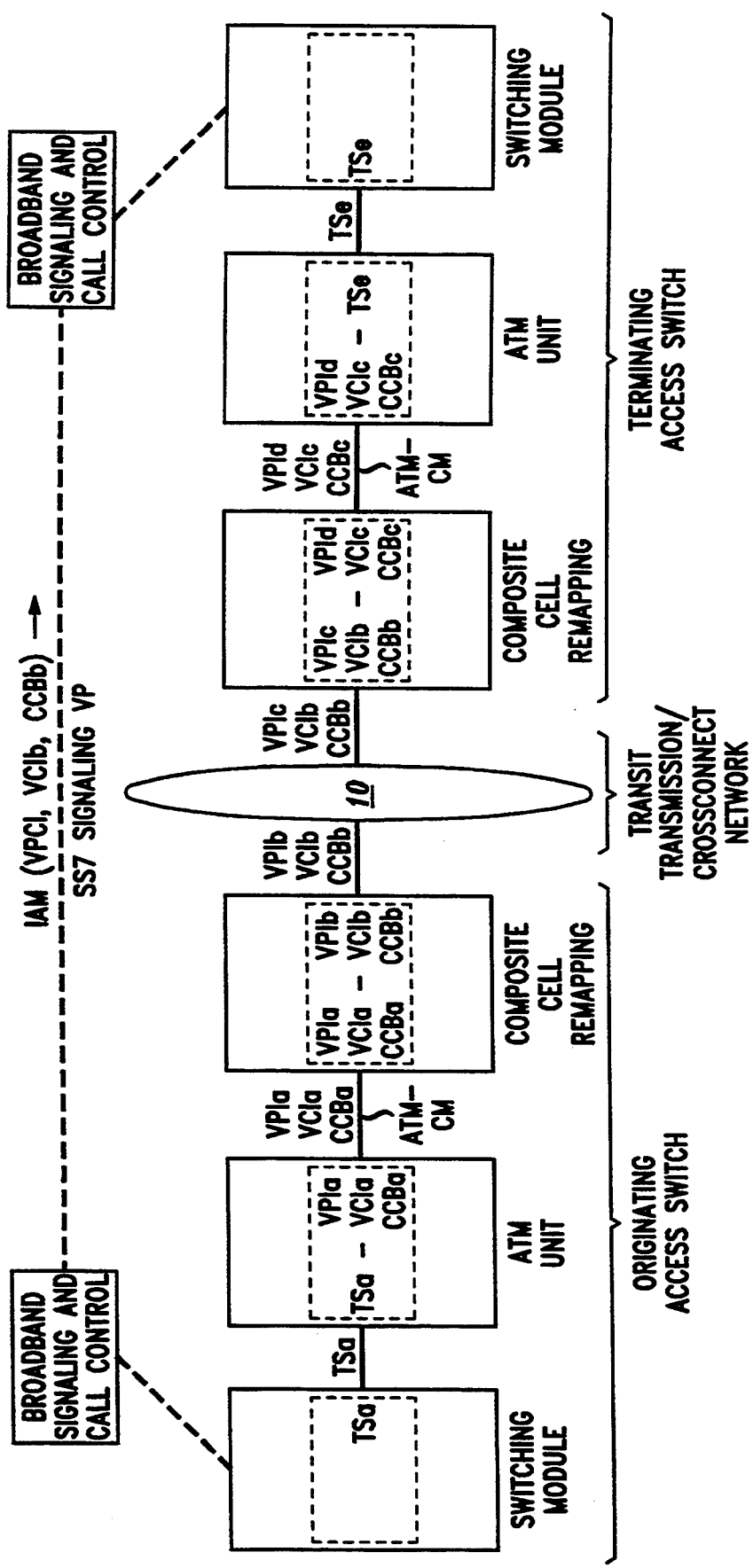
FIG. 20 illustrates the overall mapping process from source Switch Module (SM) to destination SM for communications using a composite cell remap function.

FIG. 20 shows functional block diagram of a call between an originating and terminating access switch, showing signaling and virtual paths and channels.

In the figure, the following functional entities and associations are indicated:

SM: terminates N-ISUP (Narrow Band ISUP) signaling and T1 from Local Exchange Carrier (LEC) switch, and provides mapping between LEC DS0 and a timeslot to the ATMU, ATMU: provides mapping between SM timeslots and SDCC/MDCC ATM paths and DS0 byte location in the selected cell of the virtual path.

ATM-CM: provides mapping from its incoming port, Virtual Path Identifier (VPI), and Virtual Circuit Identifier (VCI) to its outgoing port, VPI, and VCI. The VPI and VCI refers to standard ATM terminology, for identifying a virtual path in the terminology of this application. VPI and VCI are transmitted in the header of an ATM cell.

CCR: provides mapping between MDCC and TDC ATM paths and DS0 byte locations.

BB-CP: establishes TDC ATM path and DS0 byte location between two ATM-CM offices. The Initial Address Message (IAM) message carried on the Signaling System (Number) 7 (SS7) signaling virtual path contains the VPI, VCI and byte location in the cell.

Since composite cells are used inter-switch, an additional parameter must be included in the signaling message to the far-end ATM-CM office. This additional parameter identifies the composite cell byte position of the DS0 associated with the call. This additional parameter is identified as CCB (Composite Cell Byte) in the Initial Address Message shown in FIG. 20 above.

Permanent virtual circuits are used in the portions of the path wherein only cells are switched, i.e., the ATM-CM in the source and destination access switches and the transit crossconnect. (The term "virtual circuit" as used herein refers to a single channel and is thus equivalent to a "virtual channel".) Individual virtual paths are established in the ATMU connected to the source and the destination station, and in the CCR of the source and destination access switch. For an intra-access switch call, no CCR and no transit crossconnect is involved so that the only permanent virtual paths are those into and out of the ATM-CM. Thus, when there is a request to establish a path, the source access switch finds a permanent virtual path interconnecting the appropriate ATMU and CCR and connects the source PCM channel through the ATMU to the selected CCR in the ATM-CM of the source access switch and directs the CCR to make the appropriate connection of that channel as received front the ATM-CM to a cell of the PVP through the transit crossconnect. Similar actions are performed in the destination access switch. For an intra-access switch call, a PVP in the ATM-CM of the access switch is selected which interconnects the ATMU connected to the source PCM channel and the ATMU connected to the destination PCM channel. These two ATMUs (which may be the same ATMU) are then directed to establish a connection between the source or destination PCM channel and the selected PVP of the ATM-CM.

The permanent virtual circuits in this preferred embodiment are two-way circuits. Since the ATM signals themselves are uni-directional, this means that a pair of PVPs is assigned for a specific communication or, in the case of composite cells, for a group of communications. When a particular communication is assigned to a particular PVP carrying composite cells, it is assigned to corresponding positions within the cell for the two uni-directional PVPs that compose the bidirectional PVP. For the case in which a packetized data communication is being established where data communication may be heavily or entirely uni-directional, this simply means that the ATM switches and crossconnects will send fewer cells for that communication in one direction than in the other. The activation of a PVP merely requires that the active memory of the switch or crossconnect contains that PVP but does not in itself require the use of additional resources, the additional resources being utilized only when cells for that PVP are actually being transmitted.

Figure 21:
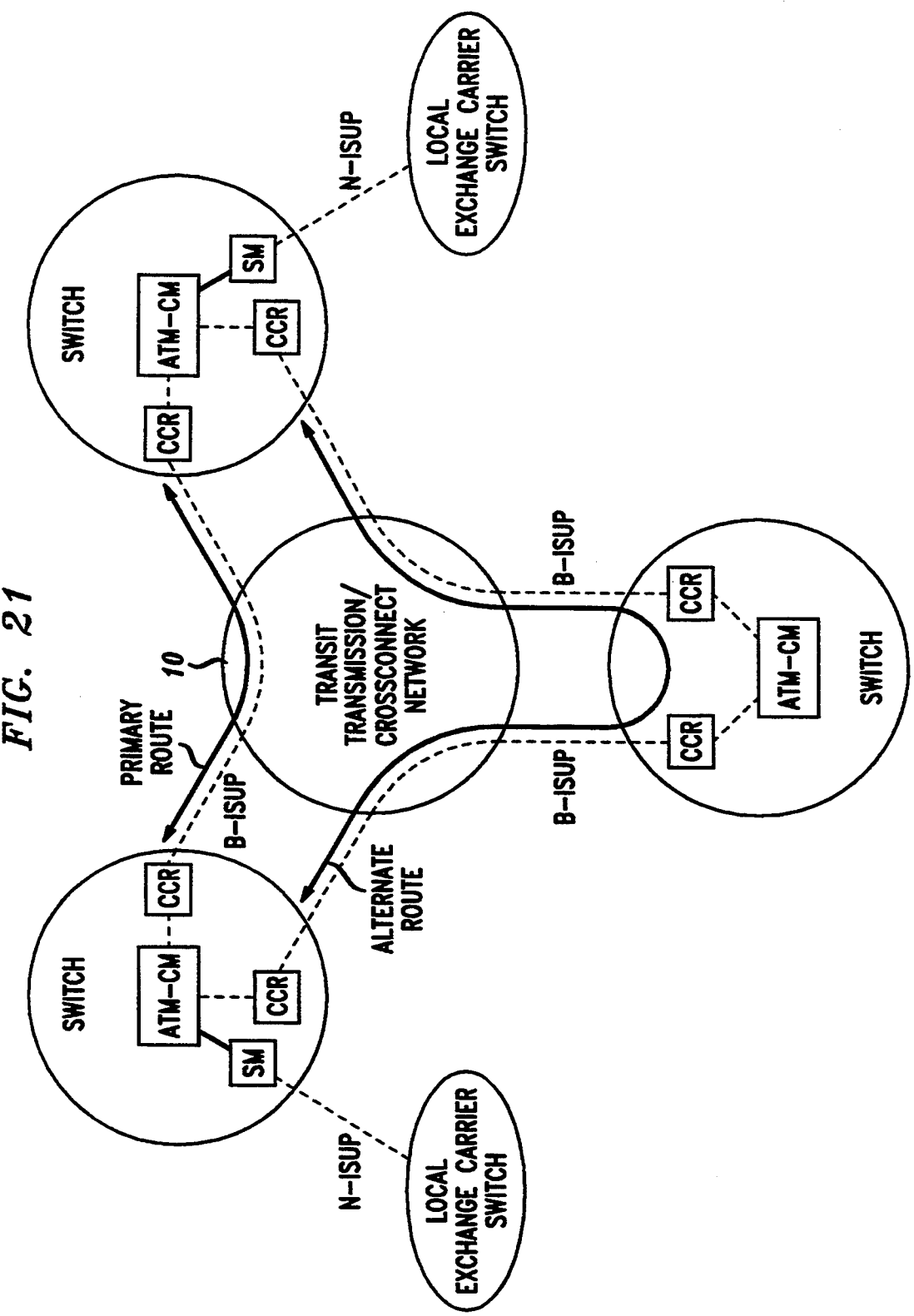
FIG. 21 illustrates the signaling used between ATM switches and between ATM and between toll and local exchange carder switches.

FIG. 21 shows a signaling network overview (omitting the ATMUs for simplicity) of an ATM network using the ATM-CM units. In this network architecture, the Local Exchange Carrier (LEC) switches communicate with the access switch using Narrowband ISUP (N-ISUP) signaling. The DS0s terminate on narrowband SMs in the originating access switch. As described previously, the originating access switch converts the DS0 samples into composite cells which are transported to the far-end access switch, via direct interfaces on the ATM-CM. As shown in FIG. 21, alternate routes can be established via the CCRs and ATM-CM of other designated access switches. A simpler, less expensive alternate route is established using an intermediate CCR as shown in FIG. 11. In all cases, only 2 narrowband SMs are involved in the call.

2.2 Architecture Overview

Shown in FIG. 22 is the architecture for a fully integrated narrowband/broadband access switch.

Noteworthy aspects of this architecture are:

Broadband network and user interfaces terminate on the ATM-CM.

Remote ATM Switching Units (RASUs) can be supported off the host ATM-CM.

The full complement of existing narrowband interfaces, signaling protocols, and features are supported by the SMs.

The broadband components can be common with other applications.

The ATMUs are located in the ATM-CM.

Composite cells are used internally within the switch, between ATMUs and CCRs for incoming/outgoing narrowband-to-broadband calls, as well as between ATMUs for intra-switch narrowband calls).

Broadband ISUP is the signaling protocol used between switches.

E-bits are transported over the NCT links, and mapped into the composite cell segment by the ATMU. For SM-to-SM calls, this results in no change to the E-bit processing in the SMs. For narrowband-to-broadband calls, E-bits are transported in the composite cells between the ATMU and the CCR. E-bit processing is then performed by the CCR. The CCR removes E-bits for outgoing calls. Further, E-bit processing in the CCR mimics that which would be done by an SM, since the call processing software in the SM is not affected by the introduction of the ATM-CM. This means that it should be transparent to the one SM in the connection that there is not another SM (i.e., the CCR manipulates the E-bit just as an SM would). Thus, when a connection drops, the CCR turns off the E-bit, which thereby allows the SM to recognize the loss of continuity to the far end. No E-bits are transported in the cells between CCRs.

The functional distribution among the components is as follows:

The AM provides support (pumping, initialization control, etc.) for the ATM-CM, the SMs, the ATM Packet Handler (APH), and the CCRs in the switch. In addition, the AM performs call processing functions similar to a standalone narrowband switch, such as trunk hunting and NCT timeslot selection. The AM provides information to the ATM-CM necessary for per-call path setup when a narrowband termination is involved in the call.

For this preferred embodiment, the AM is required to be a relatively high speed processor such as AT&T's 3B21D in order to support the Futurebus+extension. This permits the connection of a Broadband Signaling Processor (BB-SP), a Broadband Control Processor (BB-CP), Broadband OAMP System (BB-AP) and Broadband Terminal Servers to be attached directly to the AM and the ATM-CM.

The BB-CP provides the broadband call processing and subscriber services for the switch. It terminates layer 3 B-ISDN (Q.93B) and B-ISUP (Broadband ISUP) (Q.764) signaling, and maintains the subscriber profile for the broadband subscribers on the system. Broadband call processing software in the BB-CP interworks with the narrowband call processing and features on the SMs.

The BB-SP is the broadband signaling processor and performs the termination of the ATM and ATM Adaptation Layer (AAL) layers, for both the Network-Node Interface (NNI) and the User-Network Interface (UNI).

The BB-AP handles all OAMP activities related to the broadband components of the switch. This includes integrity and recovery of the BB-CP, BB-SP, and Remote ASUs.

The Terminal Server supports asynchronous terminals and interface access units for broadband Operations Support Systems (OSSs).

The ATM-CM is the switching fabric for switching cells between different ATM input and output bit streams. The ATM-CM terminates the lowest layers of the UNI and NNI interfaces. It is also responsible for control of the per-call and provisioned Virtual Path (VP) connections and all bandwidth allocation. The ATM-CM is responsible for the integrity and recovery of the ATMUs.

The CCR remaps internal composite cells to standard external ATM cells. The external cell to composite cell/byte mapping tables in the CCR are maintained by the ATM-CM. It is also possible to carry out the function in units associated with the CCR echo canceling.

The ATMU, as described earlier, provides conversion between NCT timeslots and ATM composite cells. The timeslot to composite cell/byte mapping tables in the ATMU are maintained by the ATM-CM.

The RASU (Remote ATM Switching Unit) is an optional unit comprised of an ASU-2000 fabric, of the type used in the ATM-CM remoted over an ATM facility.

The SM-2000 or other SM provide all the narrowband call control, supplementary services and features, as described earlier in this document. Call processing in the SMs interworks with broadband call control in the BB-CP for connections between narrowband and broadband subscribers.

For International applications, the GSM-2000 (a global version of SM 2000) directly terminates the lower layers (i.e., Message Transfer Part (MTP)) of the narrowband Signaling System No. 7 interoffice signaling protocols. For the AT&T network switches, a CNI (Common Network Interface) Ring performs this function.

The APH is an optional unit which is present if an RASU is equipped in the system. The APH performs SDH termination and ATM Adaptation (AAL) layers functions, and provides a communication mechanism for accessing units in the system which are remoted over ATM, such as the RASU. In the preferred embodiment, ATMUs and CCRs receive control information over control links 541 and 551, respectively (see FIG. 18) from the call control units (Administration Module, Broadband Call Control, Broadband Signaling, Broadband OAMP, etc.) This is in contrast to the SM which receives control messages over control time slots of the NCT links connecting these units to a message switch.

DETAILED DESCRIPTION

FIG. 23 is a block diagram of an access switch 1. The 5ESS ® switch, manufactured by AT&T, and extensively described in *AT&T Technical Journal*, Vol. 64, No. 6, Part 2, July-August 1985, pages 1303–1564, is the switch described for use with applicants' invention. It includes a plurality of switching modules. The input from the local switches 2 (FIG. 6) are terminated on switching module 510. This switching module comprises both circuit and packet switching units, such a module is described in M. W. Beckner, J. A. Davis, E. J. Gausmann, T. L. Hiller, P. D. Olson and G. A. Van-Dine: "Integrated Packet Switching and Circuit Switching System", U.S. Pat. No. 4,592,048. This module is controlled by a switching module processor 511 which communicates with a message handler 5 13 for receiving and transmitting messages. The T-carrier inputs from local switches 2 are terminated on digital interface 515 and are switched by time slot interchange 5 17. Since the signals arriving at the digital interface also contain packet switched signals (for example, signals from the D-channels of Integrated Services Digital Network (ISDN) sources) a packet switching unit 519 is also provided. The outputs of this packet switching unit are sent to the time slot interchange unit for further switching onto output digital links of the SM 510. In addition, a SONET interface unit 521 is provided for interfacing with PCM signals carded over SONET facilities from the local switches. The outputs of the switching module 510 are a group of network control and timing links (NCT 523, . . . , 524) (typically, up to 20). The NCT link signals are carded over optic fiber links and can readily be made long enough to allow a SM to be remotely located. A subgroup of these 20 links is then terminated in an Asynchronous Transfer Mode interface Unit, (ATMU) 540 which can also terminate NCT links from other SMs. Other subgroups from this SM can also be connected to other ATMUs, the latter also being connected to ATM-CM 550. The output of the ATMU is a plurality of SONET/ATM signals to the common broadband platform (ATM-CM) 550. The AMM, an extension of the administrative module (AM) 530, is used to control switching connections in the ATM-CM 550 and to carry out common functions for a plurality of switching modules connected to a particular ATM-CM 550. The ATM-CM is also used to switch signals between different switching modules 510 connected to ATM-CM 550 in order to handle tandem calls between local switches 2 that are not connected to a common switch module.

FIG. 23 shows a configuration wherein the ATMU can be separated physically from both the ATM-CM and the SM; both the NCT link and the SONET/ATM link are arranged to transmit signals over longer distances. Clearly, if the ATMU abuts or is pan of either the SM or the ATM-CM, these facilities can be simplified.

As an ATM crossconnect unit, the ATM-CM is able to perform the function of connecting ATM cells between ATM inlets and ATM outlets. To ensure that the composite CBR cells that carry voice traffic are not delayed or lost, the CBR cells are given high priority. They are sent on facilities that are selected to have sufficient bandwidth to support their transport, and buffering is always able to accommodate these cells. Simulations have demonstrated that the probability of a queueing delay across an ATM-CM in excess of 50 µs for a CBR cell, even when facilities are fully loaded, is less that $1 \times 10^{-11}$. Narrowband VBR signaling and other priority cells are guaranteed transport via margins of bandwidth in the facilities that are reserved for this purpose. Those VBR cells use buffers that are separate from the CBR cells, even though they are on the same facility. Broadband connections use separate facilities coming directly into the ATM-CM. These broadband signals use different buffers in the ATM-CM that are separate from the narrowband CBR and VBR buffers.

The ATM-CM is connectable via CCRs to a transit network 10, and is also used to interconnect a group of ATMUs and their connected SMs to form a single giant switching system or switching system cluster, the giant system or cluster being connected to other switching systems via a network connected to the SMs. During a transitional period, the existing time multiplexed switch (described in the *AT&T Technical Journal* reference, for example, on pages 1425–1426) can continue to carry pan of the inter-SM traffic and the ATMUs and ATM-CM can carry the rest.

While in this specific embodiment, the inputs to ATMUs are from a group of switching modules of a single switching system, such as the modules of a 5ESS switch, the teachings of applicants' invention are equally applicable if separate switching systems, instead of switching modules, are connected to ATMUs.

The block diagram of FIG. 23 is a specific embodiment of the invention based upon the 5ESS switch architecture. The Asynchronous Transfer Mode Interface Unit (ATMU) provides the interface between a switching module and the ATM-CM. The ATM-CM acts as a combination communication module for interconnecting connected switching modules and as an ATM crossconnect for connection via ATM links to other ATM-CMs. The 5ESS Switch Module normal format for voice and data transport is a single byte time slot. The ATM-CM format is a 53 byte cell containing 42 9-bit segments, each segment containing an 8-bit PCM sample and one E-bit, for voice and data transport, and 5 bytes for overhead. The ATMU provides the conversion between the single segment time slots and the 53 byte ATM cells. It also provides arrangements for transmitting the multiple time slots required, for example, for a 384 kilobit/second channel, into different segments of a single ATM cell. The 5ESS Switch Module interfaces to the ATMU over Network Control and Timing (type 1 or type 2) (NCT) links and the ATMU interfaces to the ATM-CM over Synchronous Digital Hierarchy (SDH) or its U.S. version, Synchronous Optical Network (SONET), links. The SDH or SONET links transport ATM cells. If, as in the preferred embodiment, the ATMU is part of a physical unit containing the ATM-CM, there is no need to provide either SDH or SONET functionality; in this case, the ATMU interfaces with the ATM-CM via ATM cells. By providing voice and data switching the ATM-CM eliminates the need for the time multiplexed switch used in the communications module of the prior an 5ESS system. In this preferred embodiment, the switch module (SM) is an SM-2000, previously referred to, larger than that described in the *AT&T Technical Journal* reference to take advantage of the higher speed circuitry available today. The dimensions of the SM are discussed below, as appropriate. While in this embodiment the ATM-CM interfaces via the ATMU with switching modules of one switching system, it can equally readily interface with one or more stand-alone switching systems.

Although not currently planned for the preferred embodiment, the ATM-CM also could provide SM message routing to both the Administration Module (AM) (of the 5ESS switch), and to other SMs, thus eliminating the need for intra-switch message router. The ATMU could convert the SM messages from Message Handlers and/or the Packet Switching Unit (PSU) of the 5ESS Switch Module to a format suitable for routing across the ATM-CM. A standard ATM Adaptation Layer could be used for this purpose. The ATMU also provides transport for the ATM-CM Processor Intervention (CPI) function that can be used to force a restart of an SM if a situation arises that requires a reset.

Signaling System 7 (SS7) messages are handled by virtual paths of the transit network 10, thus providing switch to switch messaging without the need for an intervening STP for routing messages. (An STP, at least initially, is still desirable for use in accessing data bases, by providing data base access to the signal transmission network 10.) The ATMU implements this function by assembling packets into ATM cells, associating a virtual path with each switch SS7 Point Code and then transferring the cells to the toll ATM network over the designated virtual path.

The preferred embodiment described herein takes the view that the ATMU is closely associated with the ATM-CM, since that appears to be the most useful from the toll network point of view. An alternative wherein the ATMU is closely associated with the SM is also possible. If the ATMU is closely associated with the ATM-CM, then the ATMU receives its control from the ATM-CM's controller and the AM. In the event that the ATMU is closely associated with the ATM-CM, control signals are sent over a control link 541 via the ATM-CM from the AM to the ATMU central controller (ATMU CC).

As shown in FIG. 23, the ATM-CM is under maintenance control and circuit control of the AM. The AM acts as the ultimate maintenance master for the the ATM-CM. In this embodiment, the ATM-CM serves only as an ATM crossconnect, and provides no processing for either video broadcast, frame relay, or Switched Megabit Data Switch (SMDS). Alternatively, the ATM-CM can be directly controlled to accept ATM inputs and to switch such inputs to a desired destination. This arrangement is useful, for example, for switching such broadband signals as high definition TV (HDTV) signals, which have a bandwidth that makes direct connection to the ATM-CM more economical. The AM or another special processor can be used for controlling the establishment of ATM paths for these services.

The assumption is made herein that computers or other terminals that send or receive data have reserved adequate bandwidth for sending and receiving such data before making a request for a connection through an ATM-CM.

FIG. 24 is a block diagram of an asynchronous transfer mode interface unit (ATMU) 540. The ATMU is tinder the overall control of an ATMU Central Controller (ATMU CC), which receives control signals over control links 541 from the ATM-CM. The inputs are from a time slot interchange unit 517 of one or more switching modules 510. The outputs are to the common broadband platform (ATM-CM) 550. The ATMU is considered an ingress and egress node of the overall network, and a PVC interconnects two ATMUs. This allows traffic from several SMs to be collected for transmission over one PVC from one ATMU to one ATMU. The outputs of time slot interchange units 517, which are groups of NCT links, enter space switch 610 which has 42 outputs leading to cell wide buffer 620 (CWB). Cell wide buffer stores 9 bit segments, each segment comprising an 8-bit PCM sample and one E-bit for the associated channel. Each NCT link carries 512 16-bit time slots every 125 $\mu$s. The 16 bits include 8 PCM or user data bits, 7 internal control bits, including a supervisory signaling bit (the E-bit) and one parity bit. All but the 8 PCM bits and the E-bit are discarded before an ATM cell is formed. CWB 620 includes 42 separate segment-organized memories whose outputs can then be used in parallel to form the 48-byte payload of an ATM cell. The space switch is used to switch the outputs of the NCT links to the appropriate one of the 42 virtual path memories 621, . . . , 625. The 48-byte parallel output and a 5-byte output, representing a header, from the cell list processor 630 enter one of 8 shift registers 651, . . . , 652. The particular shift register is selected by one of the select units 653, . . . , 654 under the control of cell list processor 630. The output of each of these shift registers goes via one of the CBR/VBR selectors 663, . . . , 664 to a Line Processing Unit 661, . . . , 662 (LPU), each LPU generates a SONET/ATM data stream. These 8 data streams are then switched in ATM-CM unit 550. The term ATM-CM as used herein refers to an ATM crossconnect switch, having, in this case, ATM/SONET inputs and outputs. The treatment of VBR cells is discussed further below. Details of the treatment of packets for VBR cells are provided in the descriptions of FIGS. 28 and 29.

The number of NCT links which can be terminated on one space switch is limited by the speed of the CWB memories and the Cell List Processor (CLP). If several SMs are terminated on one ATMU it is desirable to maximize the quantity; in the preferred embodiment 24 NCT links are used, but a larger number, such as 60, appears feasible with present technology.

Figure 25:
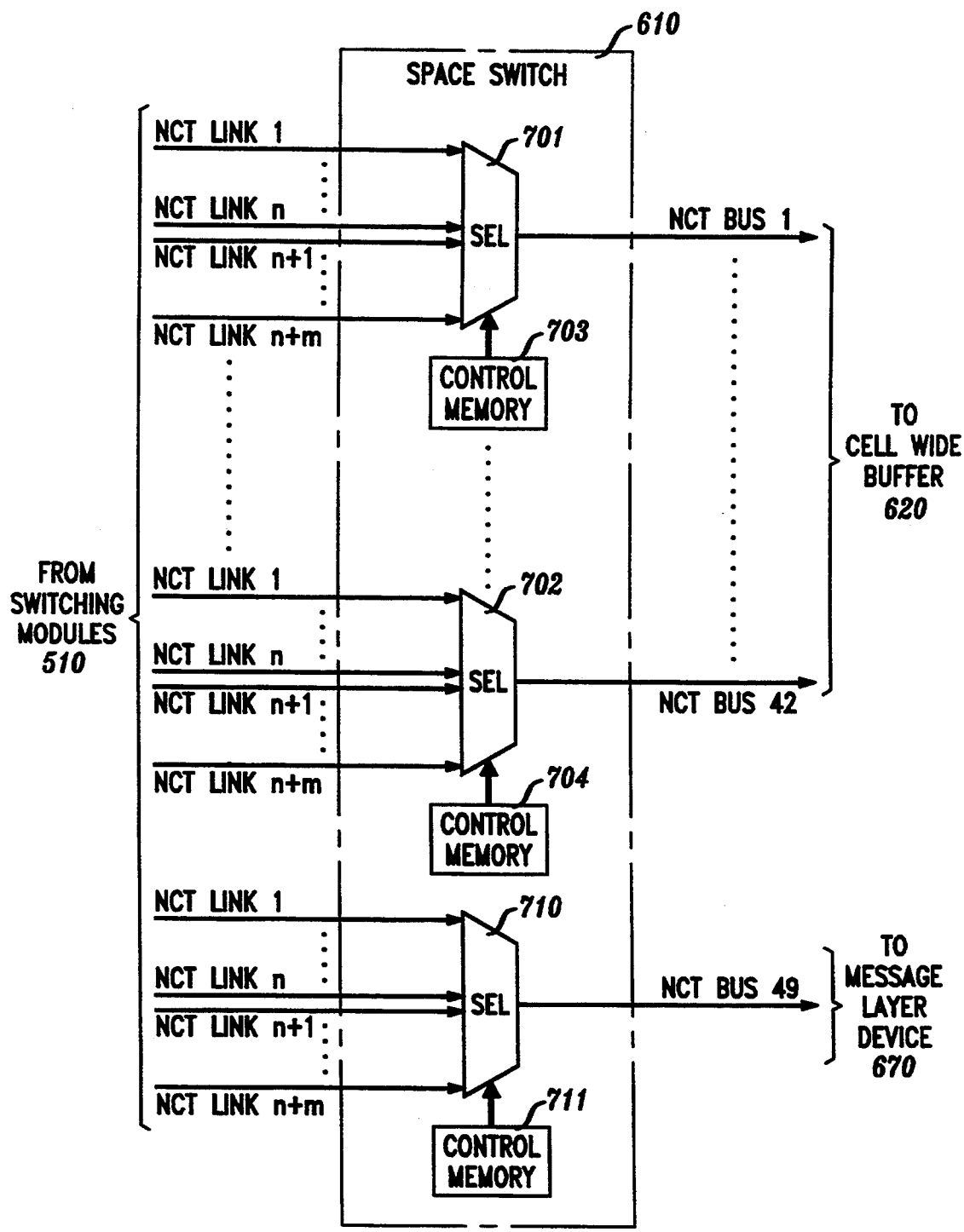
FIGS. 25–29 illustrate various blocks of the ATMU.

FIG. 25 illustrates the space switch 610. 42 selectors 701, . . . , 702, each controlled by a control memory 703, . . . , 704 are used to switch the outputs of the incoming NCT links to the appropriate one of the 48 virtual path memories that form a cell wide buffer. Each 9-bit switched segment (1 PCM sample plus the E-bit) in each of the NCT links may go to any one of the 42 positions in the cell wide buffer. In addition, selector 710, under the control of control memory 711, is used to steer (packetized) variable bit rate data including signaling and other messages to Message Layer Device 670 (MLD) (FIG. 13). The MLD converts messages into ATM cells which are transmitted by the cell list processor 630 a CBR/VBR selector 663, . . . , 664 into one of the LPUs 661, . . . , 662 into the ATM-CM after the CBR cells have been transmitted for a given 125 $\mu$s.

Figure 26:
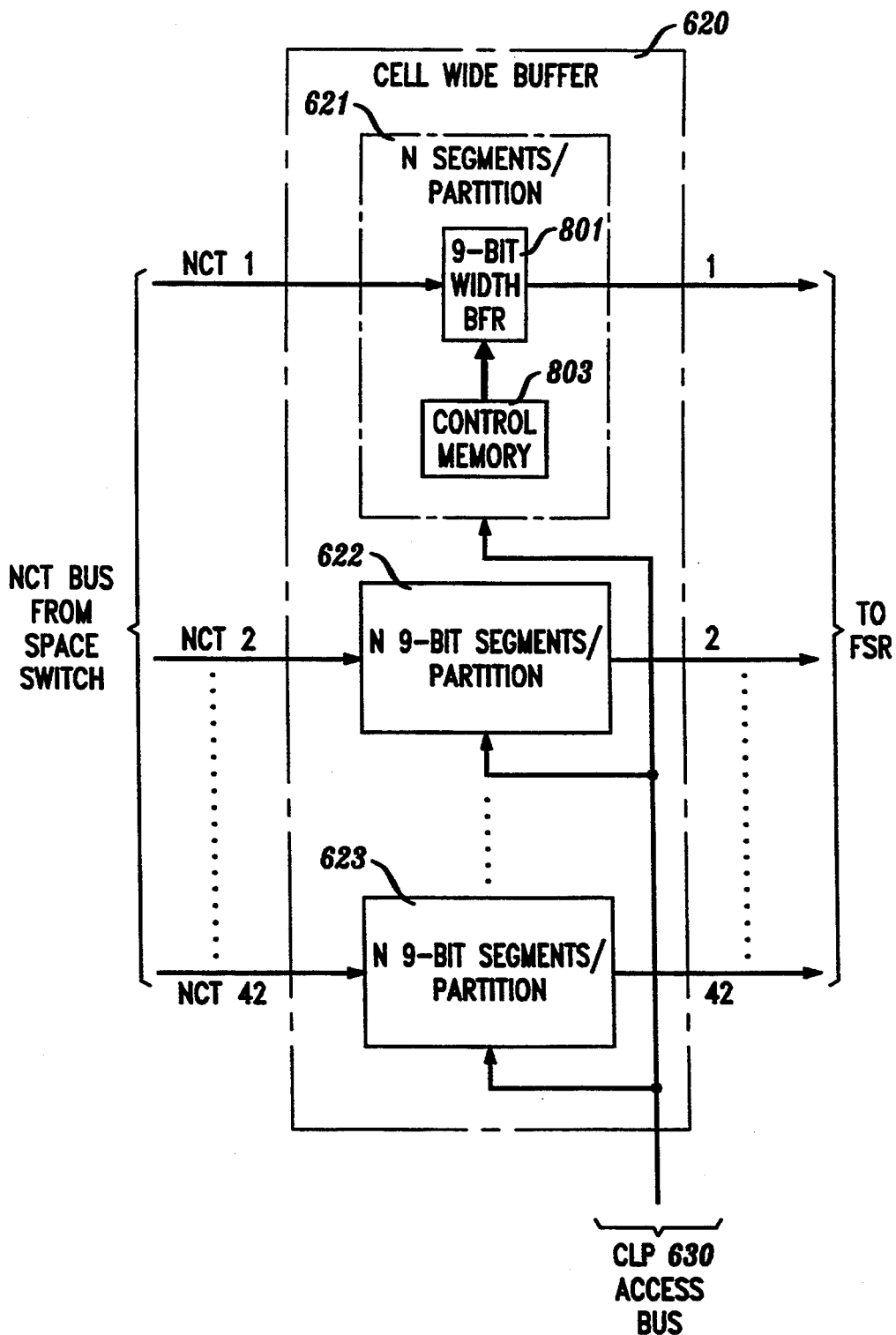

FIG. 26 illustrates the cell wide buffer 620. It comprises 42 9-bit wide memories, 621, 622, . . . , 623 each comprising a 9-bit by N buffer 801 and a control memory 802, where N represents the depth (i.e., number of cells that can be stored) of the buffer. In accordance with well-known principles of the prior art, in order to preserve frame integrity, the transmit cell wide buffer is a duplex buffer, one part being loaded while the other is unloaded; the receive cell wide buffer is triplex to solve jitter and frame integrity problems. The control memory steers bytes from the incoming NCT bus to the appropriate position in the buffer. In addition, the system is arranged to transmit a pseudo random code in idle DS0 time slots to test continuity of DS0 channels over ATM facilities; in one embodiment, the control memory of a CWB is arranged to insert and to detect the presence of the code under the control of the ATMU CC. Alternatively, tones from tone sources in the SM can be transmitted over DS0 channels and detected at the far end.

Figure 27:
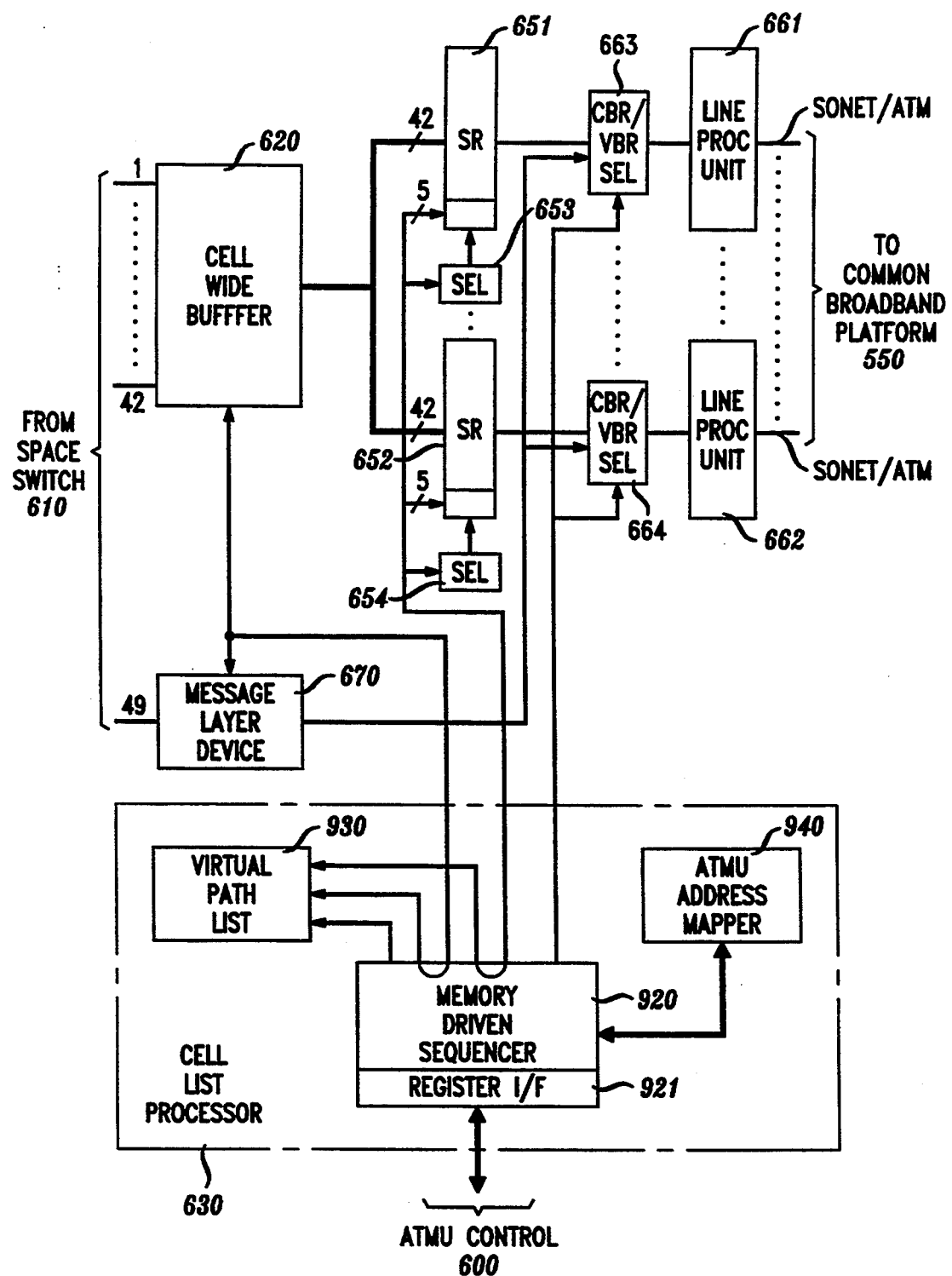

FIG. 27 illustrates the Cell List Processor (CLP) 630, Facility Shift Register (FSR) 651, and Line Processor Unit (LPU) 661. The CLP 630 simultaneously reads the CWB 620 while controlling the Selector 653. This causes one 48 byte CBR cell to be written into the SR 651. In addition, the CLP outputs the 5 byte header into the SR at the same time. Thus a full 53 byte cell is loaded into the SR. The cell is now shifted into the LPU 661 via CBR/VBR selector 663. The LPU 661 transmits the cell onto the SONET facility to the ATM-CM.

Figure 28:
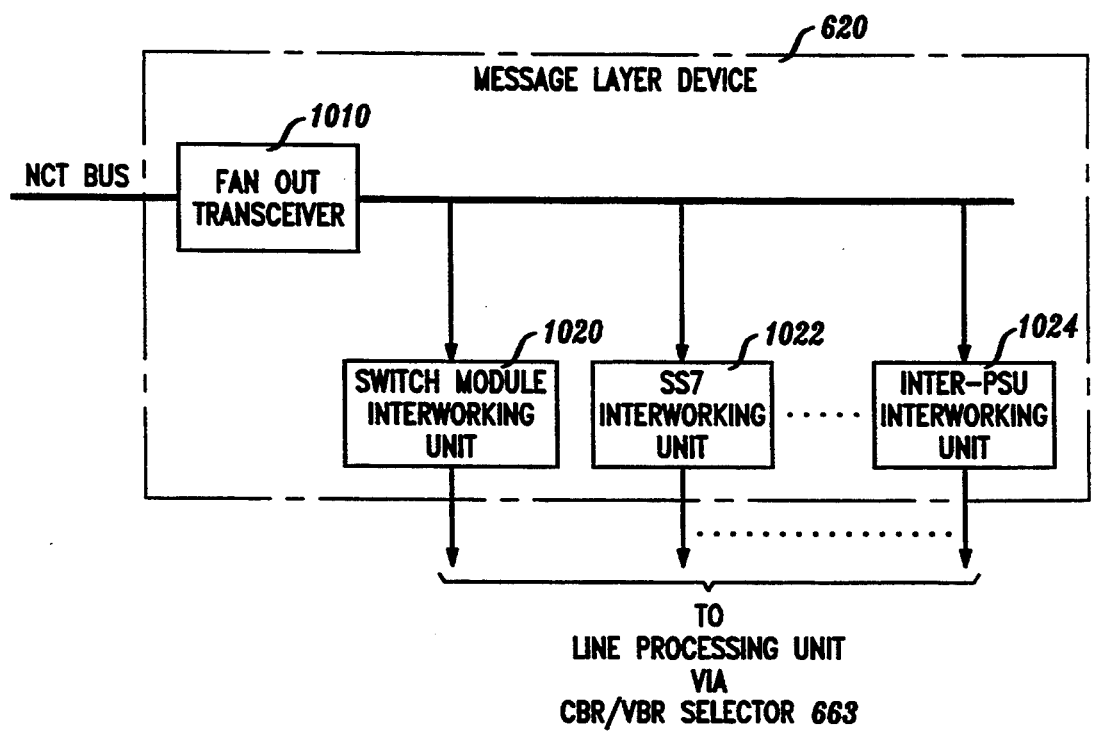

FIG. 28 shows the Message Layer Device 620. The MLD 620 receives messages on NCT time slots from the Space Switch 610 into Interworking Units 1020, 1022, . . . , 1024. These messages could be inter-SM messages, SS7 messages, or user generated messages such as CCITF X.25 messages. The Inter-Working Units (IWUs) determine the correct pre-provisional ATM Virtual Circuits identifier, and segments the message into ATM cells per CCITT specifications using the determined VC identifier and other header fields as described by CCITT ATM Adaptation Layer specifications. These cells are subsequently shifted out of the Interworking Unit into the CBR/VBR selector and LPU 661 shown in FIG. 16, under the control of the CLP. In the preferred embodiment, the outputs are joined and sent to one or more of the CBR/VBR selectors.

Figure 29:
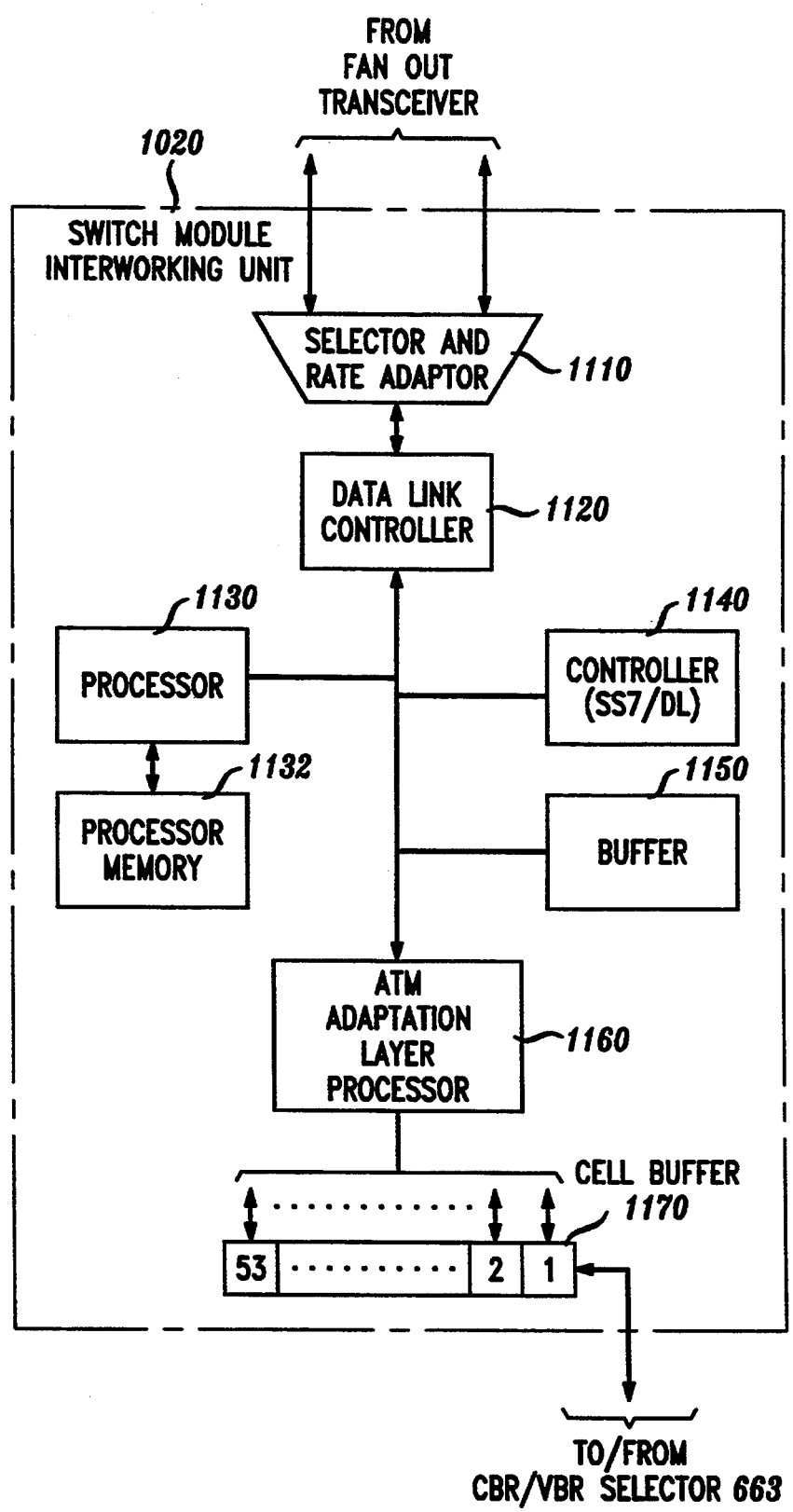

FIG. 29 shows an Interworking Unit 1020. NCT time slots are connected via the selector 1110 to the data link controller 1120. A Data Link Controller 1120 processes bit level protocol that includes flags, bit insertion, and CRC. A second controller 1140 processes SS7 or link access protocol within the messages. A processor 1130 determines the Virtual Path to be used for the message, and commands the ATM Adaptation Layer (AAL) Processor 1160 to segment the message into ATM cells. The ATM cells are placed, under the control of ATM Adaptation Layer Processor (AALP) 1160, into the Cell Buffer 1170 (not to be confused with Cell Wide Buffer 620 (FIG. 24)) where they are later transmitted under control of the CLP 630 (FIG. 16) into the CBR/VBR selector 663 (FIG. 27). High priority cells are inserted into Cell Buffer 1170 before low priority cells. Cells from the cell buffer 1170 (FIG. 29) constitute the VBR cells shown in FIG. 8 (the 125 µs frame). The cell buffer may have to be several cells deep to take care of VBR cell bunching from the ATM-CM.

Figure 30:
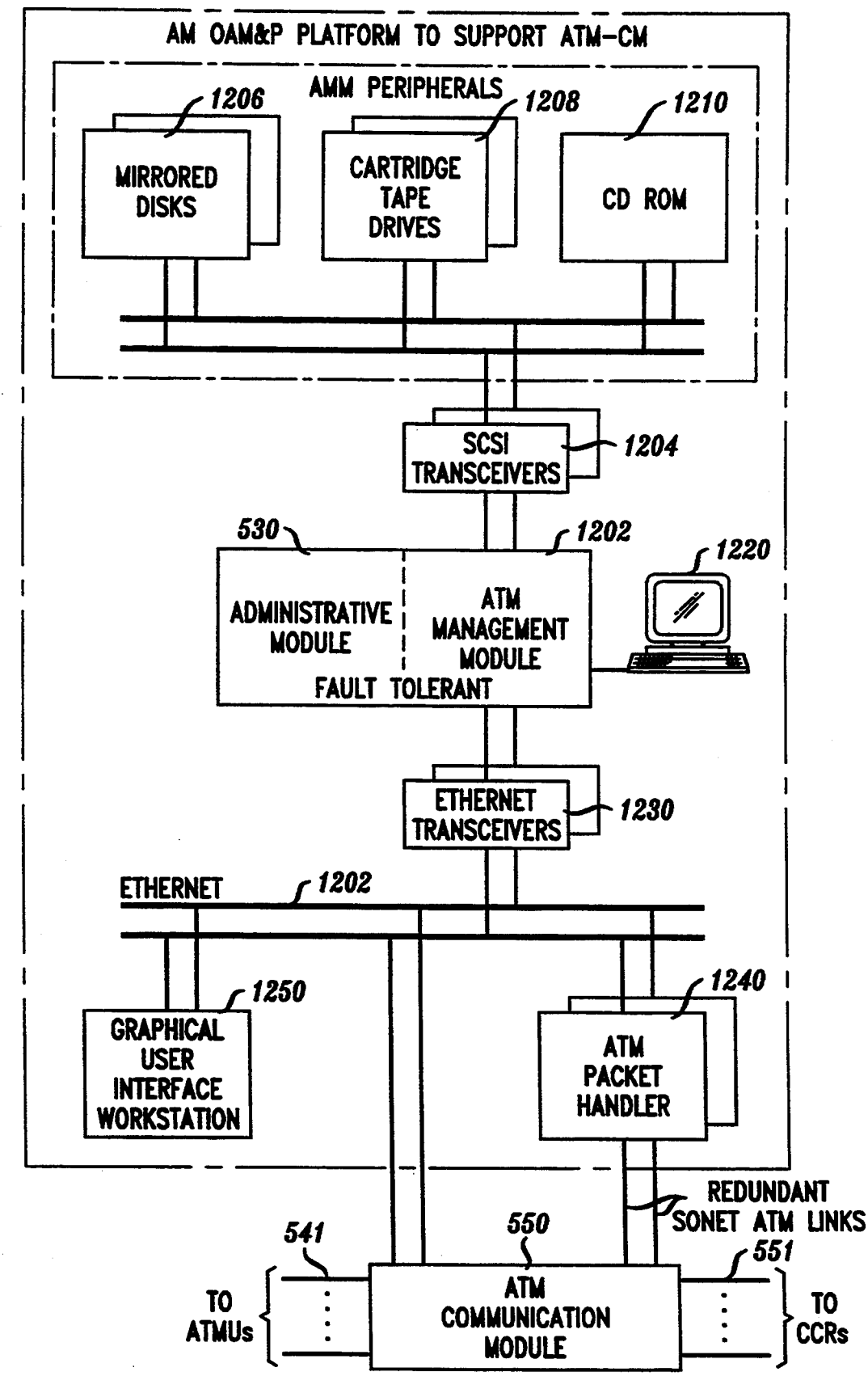
FIG. 30 illustrates the control complex of an ATM Communications Module ATM-CM unit for switching ATM cells.

The AM serves to support the entire 5ESS switch and ATM-CM (including ATMUs) OAMP needs. These include download and control of the ATM-CM, craft graphical display, and communication via ATM with SMs. FIG. 30 shows the AM/ATM-CM system architecture as comprising the following components:

- ATM Management Module (AMM) including directly connected terminal. This is an adjunct fault tolerant processor that connects to the existing 5ESS switch AM, and serves to provided added processing throughput for new ATM-CM and ATMU capabilities.
- Ethernet® Bus to interconnect AM/AMM with Graphical User Interface (GUI), ATM Packet Handler (APH), and ATM-CM.
- Small Computer System Interface (SCSI, an industry standard) peripherals for disk, tape, and Compact Disk Read Only Memory (CD ROM) on-line documentation: These augment the existing AM non-volatile peripherals.
- GUI workstation terminals that supports existing 5ESS switch equipment, ATM-CM, and ATMUs.
- ATM Packet Handler provides the AM/AMM with the ability to communicate via ATM over SONET to the SMs. The SMs terminate the APH's ATM in their ATMU MLDs. To communicate with SMs, the AM/AMM sends messages via Ethernet to the APH which performs the message to cell conversion and transmittal to ATM-CM over SONET.

The GUI and non-volatile memory are commercial components whose control resides in AMM software. The design of the AMM and APH components are expanded in Section 5 of the Detailed Description.

Figure 31:
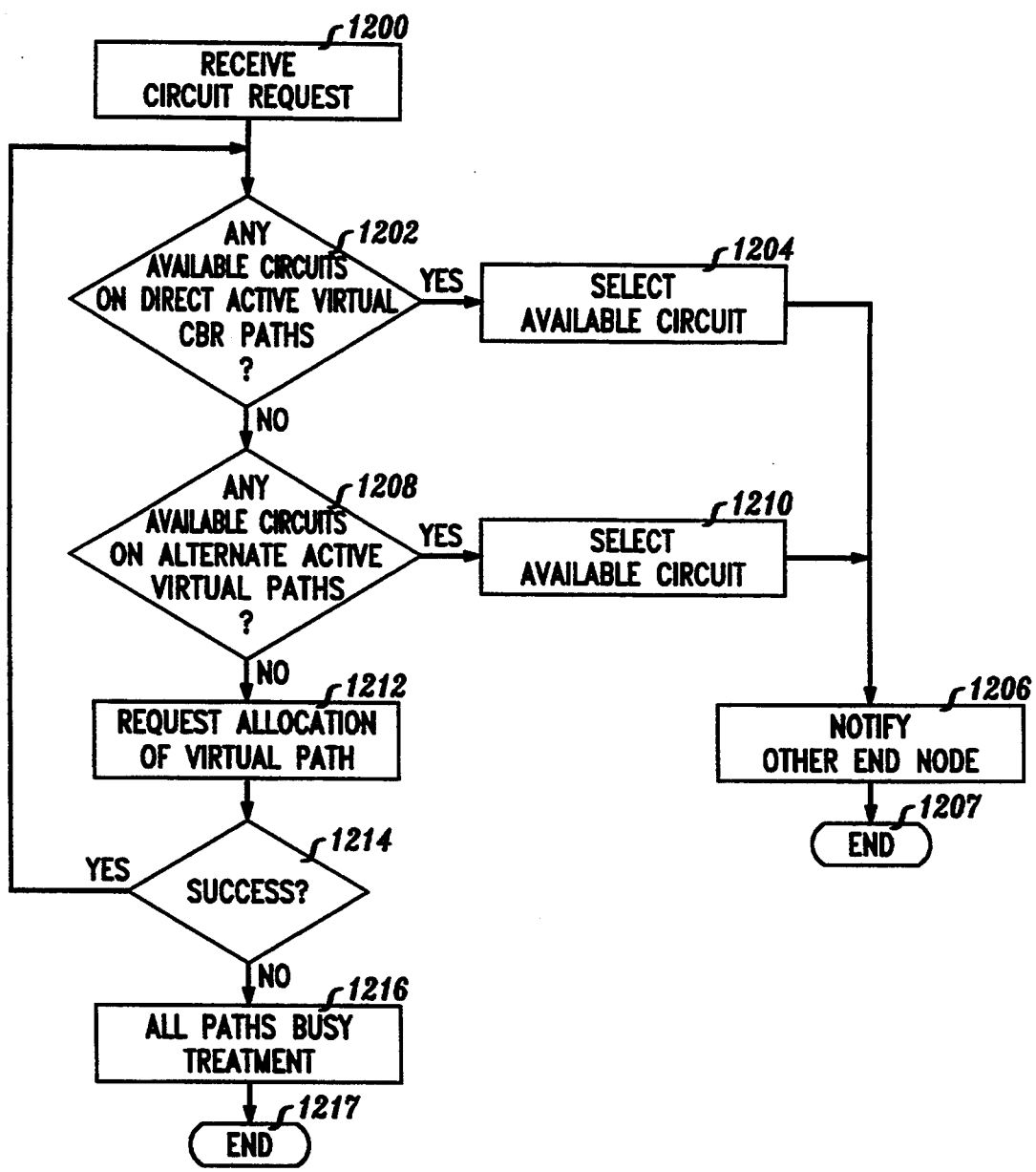
FIGS. 31–33 are flow diagrams illustrating the processes of selecting a channel for a communication activating permanent virtual circuits and combining traffic of partially loaded permanent virtual circuits.

FIG. 31 illustrates the circuit (channel) hunt which is performed by a switching module processor 511, or other processor having data about the status of PVPs from the connected ATMU to the destination of the call. This processor receives a path request (action block 1200) and determines (test 1202) if there are any available circuits (channels) on direct active virtual CBR paths to the destination of the path request. If so, then an available circuit is selected (action block 1204) and a message is sent to the node (typically, a processor for another ATMU) at the other end to notify that node that a circuit has been established on a particular slot of a particular active CBR PVP.

If no available circuits on direct active CBR PVPs are found in test 1202, then test 1208 is used to determine if there are any available circuits on alternate active CBR PVPs. If so, then an available path from one of these alternate active virtual paths is selected (action block 1210) and the node at the other end is notified (action block 1206). (An alternate active virtual path is an active virtual path using an alternate route which is a route that uses at least two links instead of the single link direct route.) If no circuits are available on active virtual paths for this circuit request, then a request is made to allocate an additional virtual path (action block 1212). This request is sent to the administration module 530 (FIG. 12) which activates an additional virtual path as described in FIG. 32. Eventually, the administrative module responds to SMP 511 with a success or failure indication and, in the case of a success indication, the identity of the allocated virtual circuit. Test 1214 is used to determine that success or failure. If the allocation request has been successfully responded to (positive output of test 1214), then test 1202 is reentered in order to perform the process of selecting an available circuit. If the allocation process was unsuccessful (negative output of test 1214) then an all paths busy treatment is given to the call for which the path request was originally received in block 1200.

It is assumed in this discussion that the controlling processor, such as the switching module processor maintains a list of active CBR virtual paths for carrying traffic outgoing from its associated switching module and maintains an activity state for each channel of such a virtual path. It is, of course, also possible to maintain this information elsewhere such as in the administrative module, but the suggested arrangement minimizes the time required for establishing most calls. Further, it is possible to use virtual CBR circuits with two-way channels but such an arrangement, while it allows for more efficient use of the virtual channels, requires negotiation between the two endpoints in order to prevent "glare" (i.e., a situation wherein the same channel is seized concurrently by the two end nodes connected to the channel).

Figure 32:
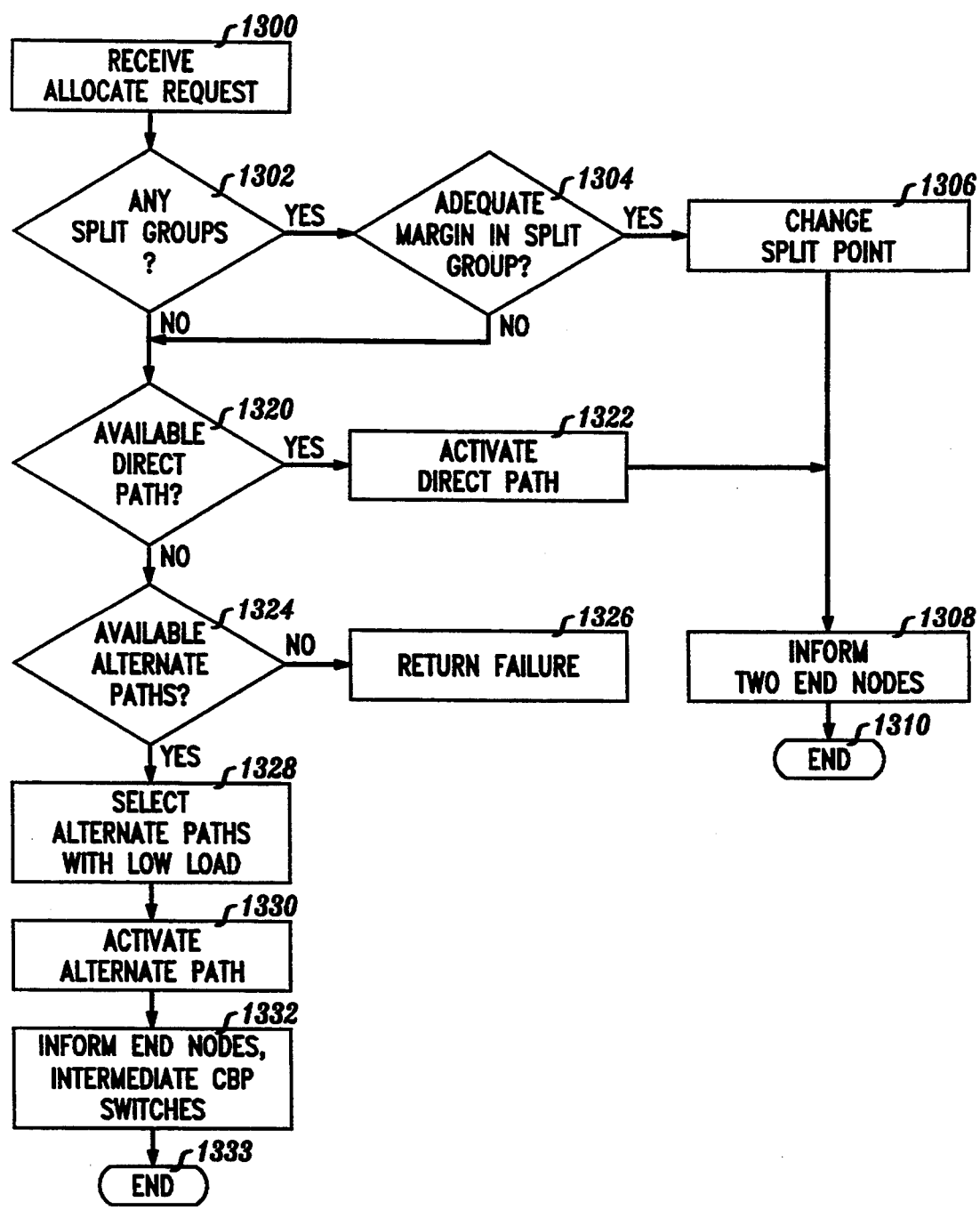

FIG. 32 describes the process of activating a virtual CBR path, or for a split path, a group of channels. Many more virtual CBR paths are provisioned (i.e., stored in memories of the network) than can be active at any one time. Basically, virtual CBR paths are provisioned to handle the peak traffic between any pair of nodes. Virtual CBR paths are considered activated when they are available for carrying traffic. The process of activation is designed to ensure that the physical ATM facilities carrying the virtual CBR paths are not overloaded and that no defective physical ATM facilities are used to carry traffic. In case of a failure, for example, all virtual CBR paths that use the failed facility must be deactivated.

In this specific embodiment, the process of activating additional virtual CBR paths is analogous to the process of seizing individual trunks in accordance with the teachings of the real time routing arrangement as described in G. R. Ash et al.: U.S. Pat. No. 5,101,451, by routing additional traffic over less heavily loaded transmission facilities, in this case, SONET/ATM facilities. One special characteristic of the arrangement described herein which is not analogous to a situation encountered in routing traffic over individual trunks is the use of split groups, illustrated in FIG. 10, i.e., active virtual CBR paths a portion of whose channels are used for outgoing traffic in one direction and another portion of whose channels are used for outgoing traffic in the other direction. Such split groups are especially efficient for use in carrying traffic between two nodes for which the level of traffic is relatively low. Another difference is that more links may be required for alternate routed traffic so that the load of several links may have to be considered in selecting an alternate route PVP for activation. A third difference is that PVPs using an intermediate CCR, as shown in the middle CCR of FIG. 4 and of FIG. 11, can be used as alternate routes, equivalent to "2-link routes" of the cited patent; such alternate routes are relatively inexpensive since they do not require traversal of an intermediate access switch.

An administrative module receives an allocate request from a switching module processor 511 (action block 1300). The administrative module first determines (test 1302) if there any virtual CBR paths carrying split traffic (i.e., outgoing from the two end nodes). If so, the administrative module determines how many channels are currently busy in each direction and checks if there is adequate margin in the split group to allow for an additional few channels to be allocated in the direction associated with the allocate request. The channels of split groups are arranged so that the first n channels are hunted in one direction and the remainder in the other direction and that the hunt for a channel is performed in such a way as to keep the middle channels available whenever possible. If middle channels are available and if the number of these available channels is sufficiently large to allow for a movement of the division point (positive result of test 1304) then the split point is moved (block 1306) and the two end nodes are so informed (action block 1308). The requesting node is informed of a success in response to the allocate request and when the requesting SMP retries test 1202 and 1208, one of these will now pass. In this embodiment split groups are checked first; simulation studies may show that the alternative of checking for available additional PVPs first, is more optimum.

If no split groups are available (negative result of test 1302) or if there is inadequate margin in the split group(s) (negative result of test 1304) then test 1320 determines if there is an available idle provisioned direct virtual CBR path. If so, it is necessary to check whether activation of an additional CBR PVP will cause congestion on any link carrying that PVP. If such congestion is found, that idle provisioned direct virtual CBR path is rejected and not activated, and test 1324 is tried; if no congestion is caused, that path is activated (action block 1322) and the two end nodes of that path are informed of this activation (action block 1308). Otherwise, test 1324 is used to determine if there are any alternate available virtual CBR paths. In making the choice among available alternate CBR paths, the principles of real time network routing are used by preferably selecting available alternate virtual CBR paths that use relatively lightly or less heavily loaded ATM facilities. In making the determination of which facilities are less heavily loaded, since two link circuits are preferred over 3-link circuits, the loading of the potential 2-link circuits can be ascertained by requesting the administrative module connected to the ATM-CM that is connected to the destination switching module to report on the loading of its ATM circuits. Since each activation of a virtual CBR path represents a larger utilization of resources (48 channels versus 1 channel) than is the case for the selection of a single trunk for real time network routing, a loading threshold limit beyond which virtual CBR paths should not be activated should be applied for any facility that is used by a candidate CBR PVP. The limit is also affected by the amount of VBR traffic supported by the ATM facilities. Clearly, this limit is a parameter which should be under control of the network administrators, which may be different for different ATM facilities, and which should be adjusted as field experience is obtained.

Note that in the preferred embodiment, all provisioned PVPs have a predetermined path traversing two end nodes and a variable number of intermediate nodes. Alternatively, switched virtual paths could be provided having a variable path selected at activate time.

If no available alternate CBR virtual paths are available for assignment, then the allocate system returns a failure indication to the requesting SMP (action block 1326). If an available alternate path has been chosen (action block 1328) (the available circuit is selected among alternate circuits with relatively low load) then the alternate path is activated (action block 1330) and the end node and intermediate ATM-CM switches are notified of the activation of the CBR virtual path.

The active CBR PVP consolidation process will now be discussed. In the course of normal toll call activity, it usually happens that different composite cells between two end nodes are not completely filled. Furthermore, it is a frequent occurrence that the total number of DS0s in N active composite cells is less than or equal to the total number of DS0s supported by N−1 composite cells (48 N—N). In that case it is desirable to consolidate the PVPs carrying these cells to form more fully utilized cells that carry the DS0s. The PVP for composite cells which no longer have active DS0s can then be made inactive, thus freeing bandwidth on one or more ATM facilities. That freed bandwidth can then be used for composite cells between other sources and destinations. Thus, more efficient utilization of the network is achieved. The consolidation process is described in FIG. 33.

In the discussion that follows the composite cells being consolidated will be discussed as being between ATMUs, and the processing of consolidation is performed by the ATM-CM controller. Alternatively, it is also possible for the AM or SM processor (SMP) to control the consolidation of composite cells instead of the ATM-CM. However, the processing would be the same in either case, only the identity of the processor would be different.

To perform consolidation, processors continually check active composite cells for a partial fill condition which is defined to be N composite cells to the same destination such that the total number of active DS0s within N cells is less than the total number of DS0 in N−1 composite cell (i.e., (N−1)*48). The amount by which the sum of the active channels in the N cells is less than (N−1)*48 is a parameter which should be set as a result of simulation and experience. If the parameter is too low, say zero, thrashing may occur; if it is too high, say 10, inefficient use of facilities will occur. For this discussion a cell and its corresponding PVP are used more or less interchangeably. Each active cell is under the control of one connected end node, the end node that originates outgoing traffic, or, in the case of split traffic cells, a node selected arbitrarily. When the controlling processor determines that a partial fill condition exists, it communicates a request to the destination node to consolidate the N composite cells. The request contains:

The identity of the N composite cells (e.g., via the Virtual Path Identifier). N−1 cells are the consolidated cells, and one cell is the cell to be eliminated (since it will carry no DS0s following consolidation.)

A list of DS0 cell re-ordering from the cell to be eliminated to the consolidated cells.

In this embodiment, DS0s of the consolidated composite cells remain in the same cell locations, and DS0s from the eliminated cell are moved to idle positions in the consolidated cells.

The other node responds with an acknowledgement to consolidate. During the consolidation period, new calls that require transport between these two nodes (typically switching modules) will only use DS0s from the consolidated cell that are not to be filled from the cell to be eliminated. It is possible that calls could arrive and therefore trigger the activation of a PVP for one composite cell while another PVP is being eliminated. This unlikely occurrence is in accordance with the invention since eventually excessive PVPs are eliminated.

In order to consolidate, newly arriving DS0 signals for the cell to be eliminated are sent into both the consolidated cell and the cell to be eliminated. Within the ATMU, a DS0 on an NCT link from the SM is read from the memory at two discrete times to be placed into two different cells and DS0 locations.

The processor performing consolidation commands the ATMU CC to perform this function. After performing this action, the processor sends a message to the other node indicating that the aforementioned copy action has transpired. The other node must send a similar message to the original node. Upon reception of this message, the destination processor commands the ATMU CC to deactivate the PVC of the eliminated cell. The ATMU CC causes the ATMU to mad DS0s from the buffer locations associated with the consolidated cells instead of locations associated with the eliminated cell. The ATMU CC then removes this cell from the CLP's active composite cell list. The eliminated composite cells are no longer sent or processed into DS0s on the NCT links. Since the DS0s are switched via the ATMU to the NCT links, them is no change of time slots on the NCT links to the SM TSI (Time Slot Interchange). The other end then also deactivates the PVP of the eliminated cell.

A problem arises if a channel from one cell is transferred into the same channel in another cell; during the period of transition, this cell would be written into the same channel position of two buffer locations. This problem can be overcome in one of three ways:

- The speed of the CWB can be doubled to allow two writes to occur in one interval
- the consolidation can be arranged through software to avoid such a transition
- the transition can be made in two stages, first by freeing another channel of the transferred-to cell by copying a busy channel to the idle position and then releasing the previously busy channel, then by transferring the channel from the cell being released to the newly released channel of the target cell.

If two or more SMs are connected to one ATMU, either the SMP of one of the SMs controls the PVP being deactivated or, preferably, the AM of the connected ATM-CM controls the PVP. In either case, only a single processor controls the consolidation process at the controlling node.

Figure 33:
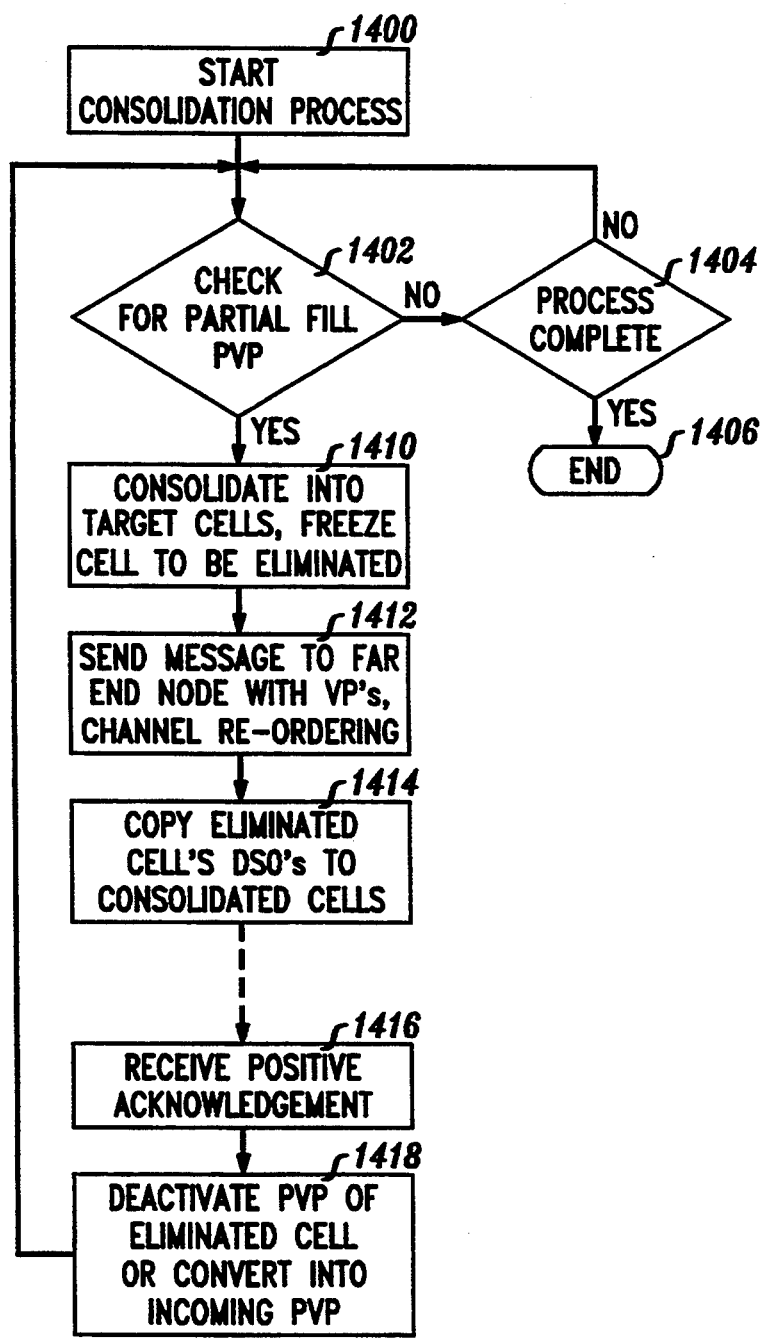
Figure 34:
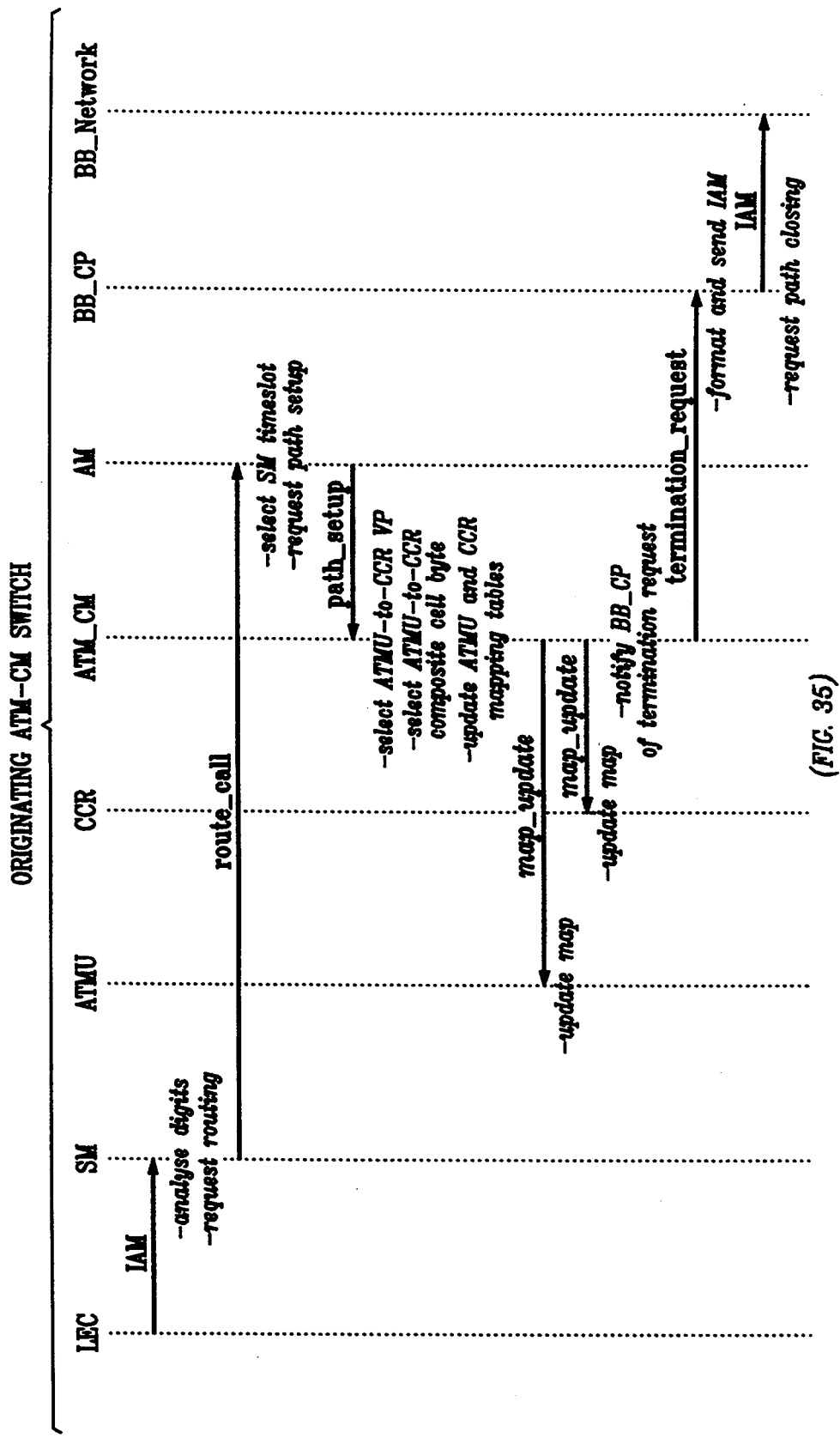
FIGS. 34–37 illustrate the operation of a call at the originating end.
Figure 35:
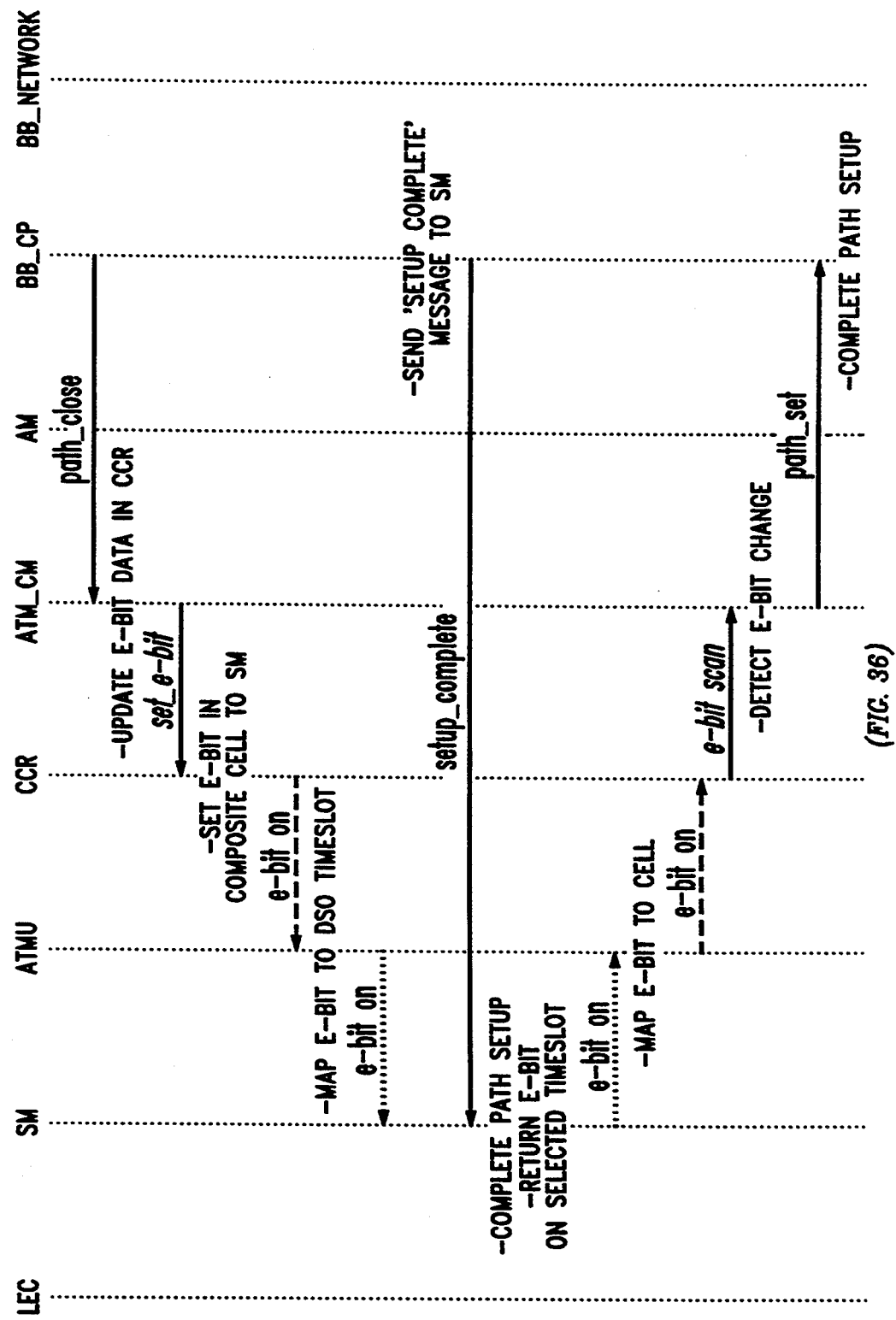
Figure 36:
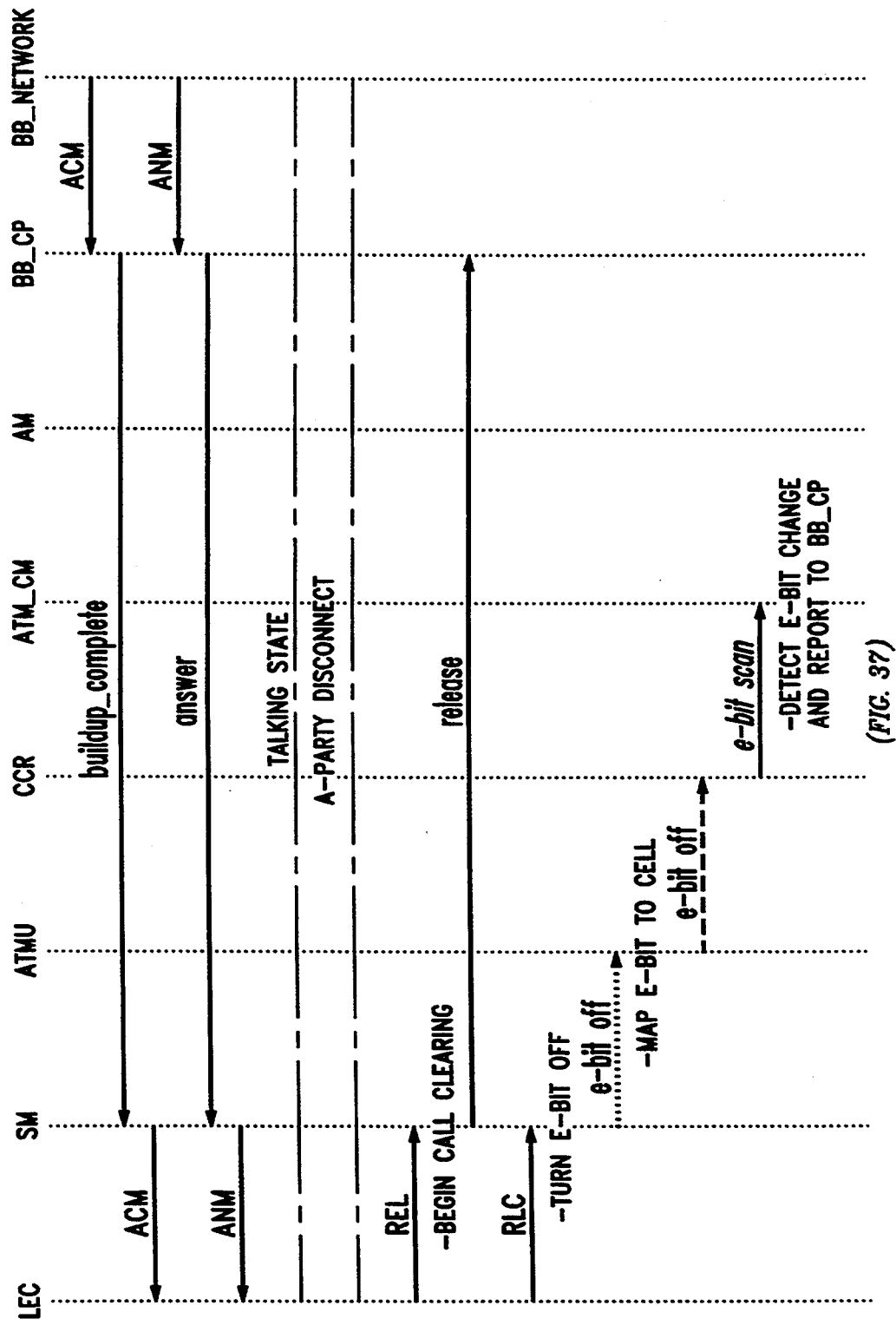
Figure 37:
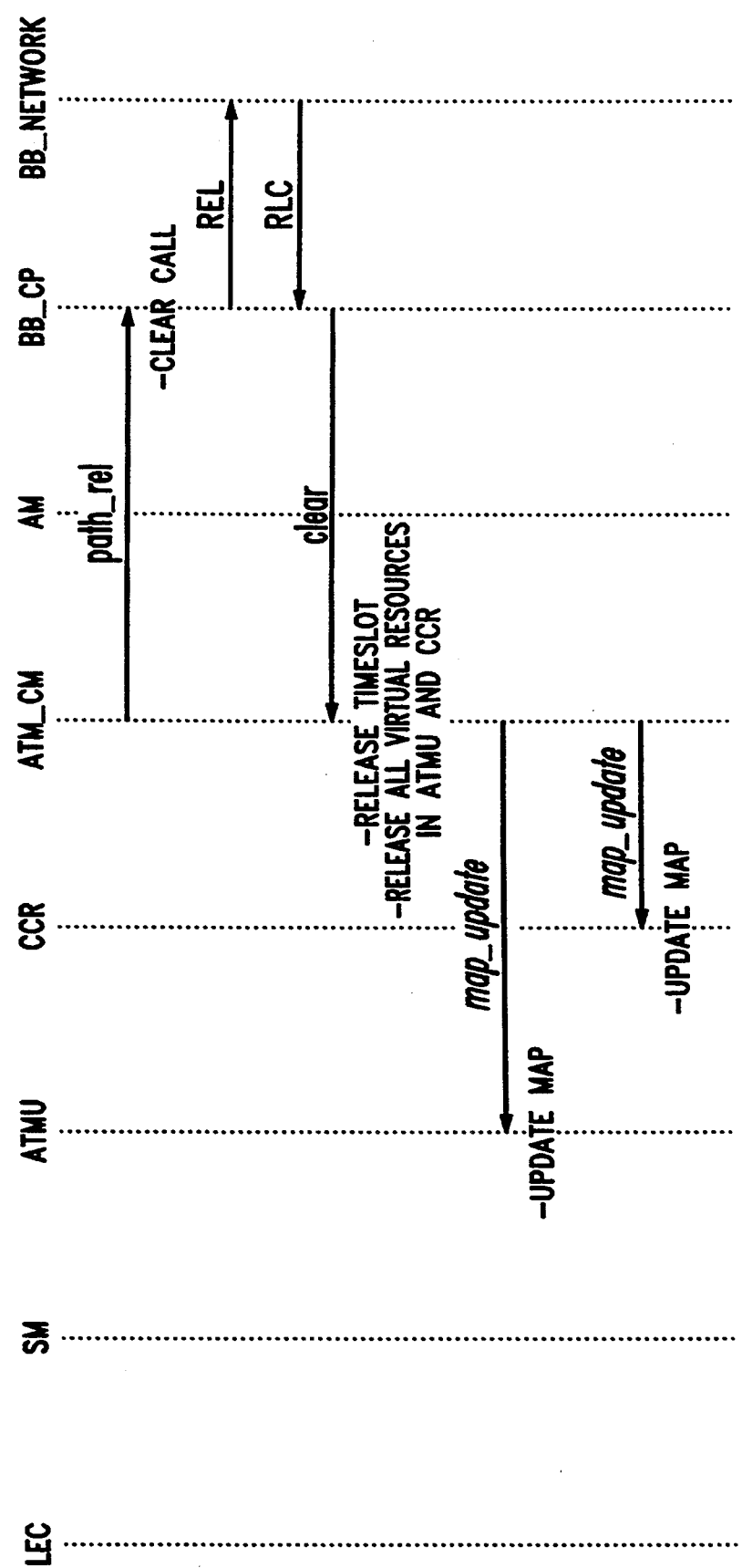
Figure 38:
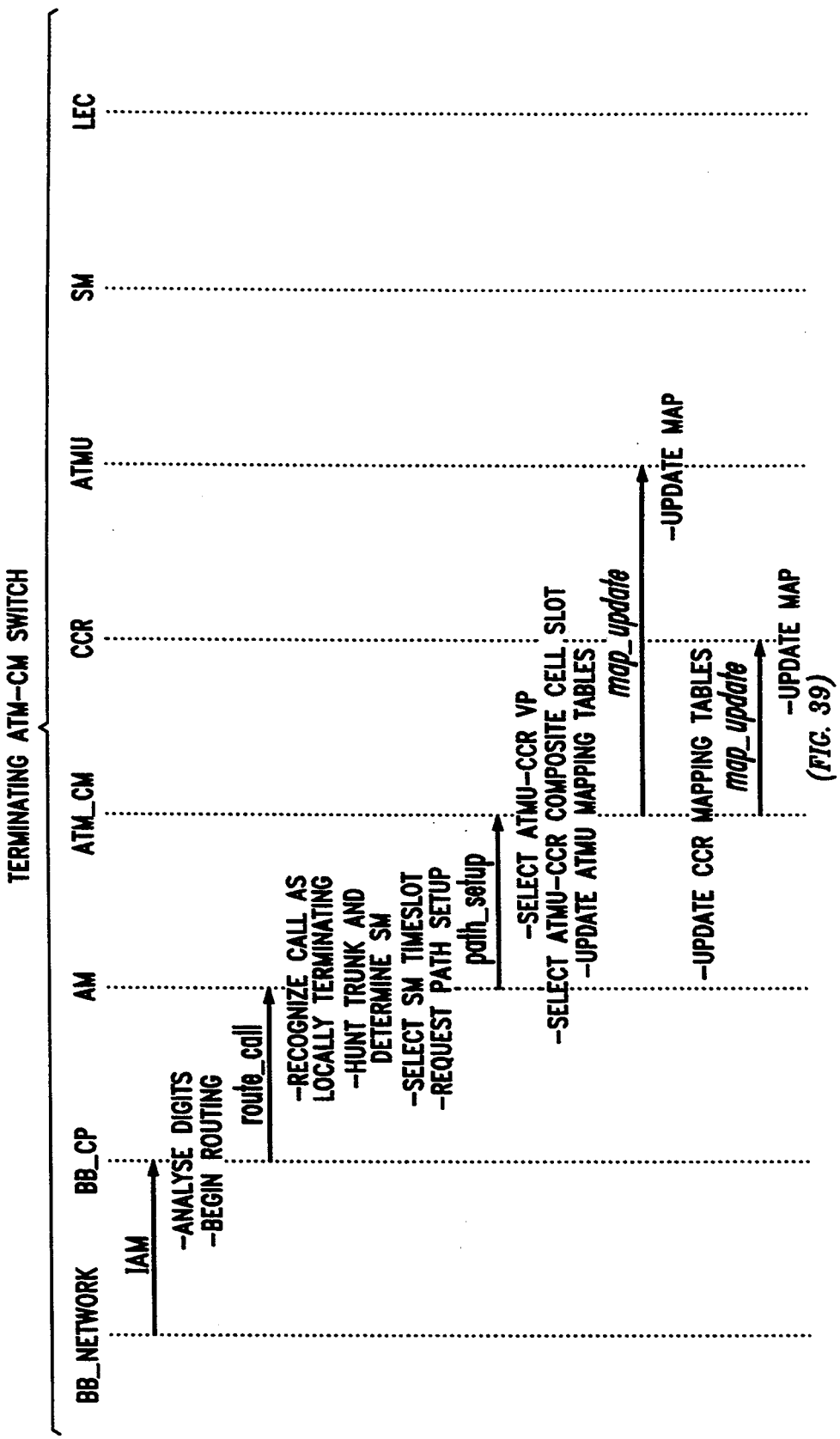
FIGS. 38–41 illustrate the operation of a call at the terminating end.
Figure 39:
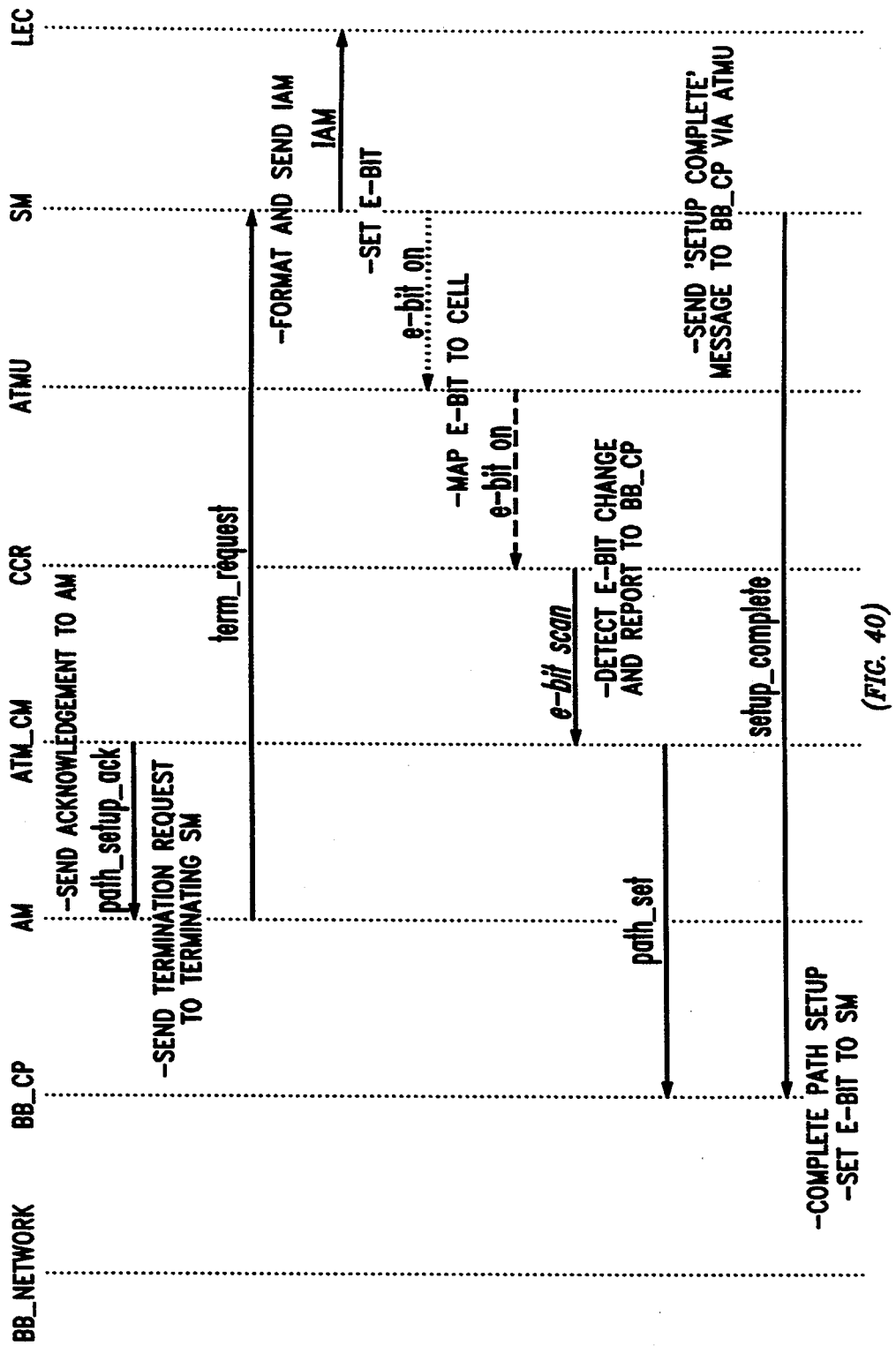
Figure 40:
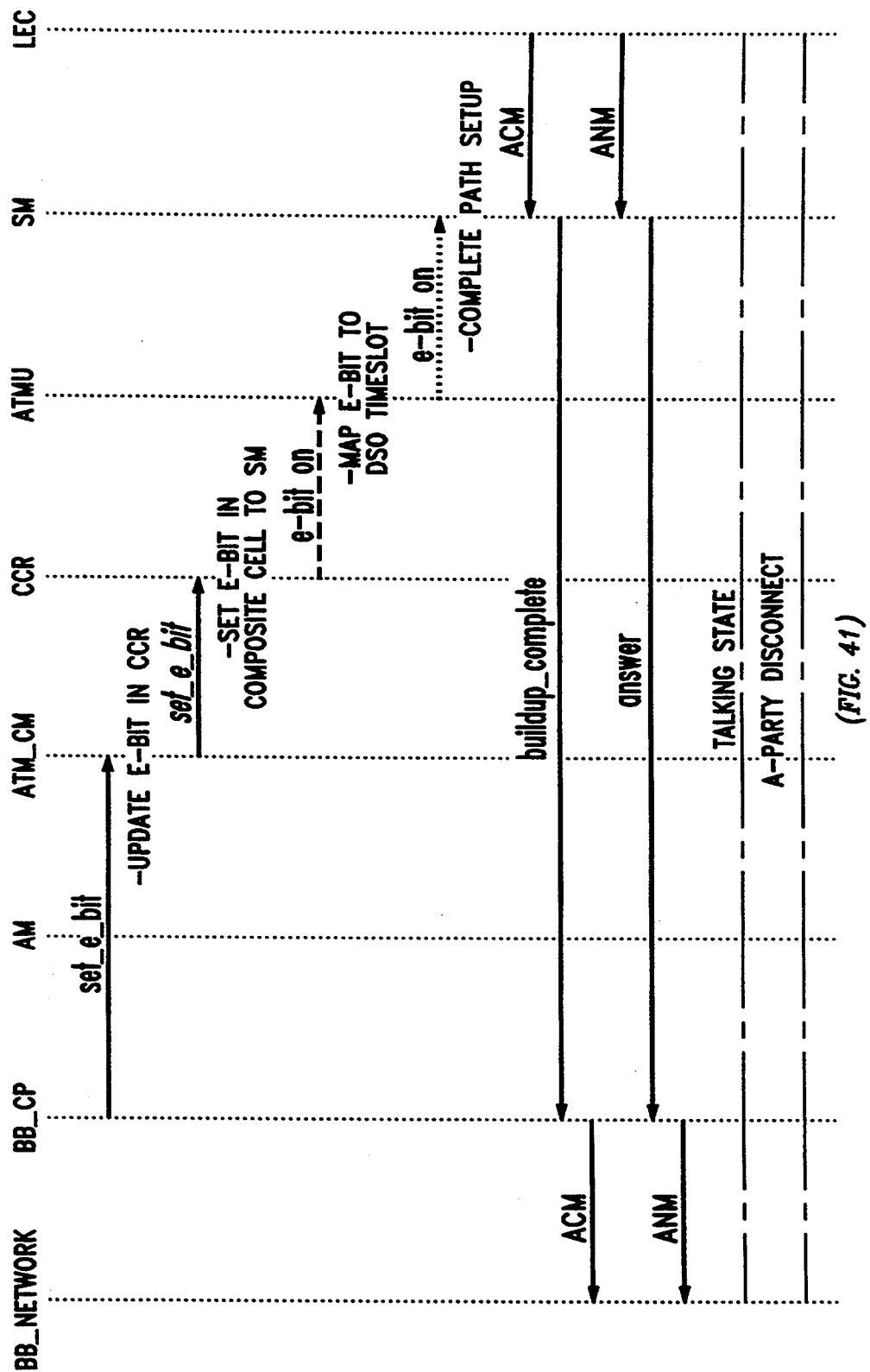
Figure 41:
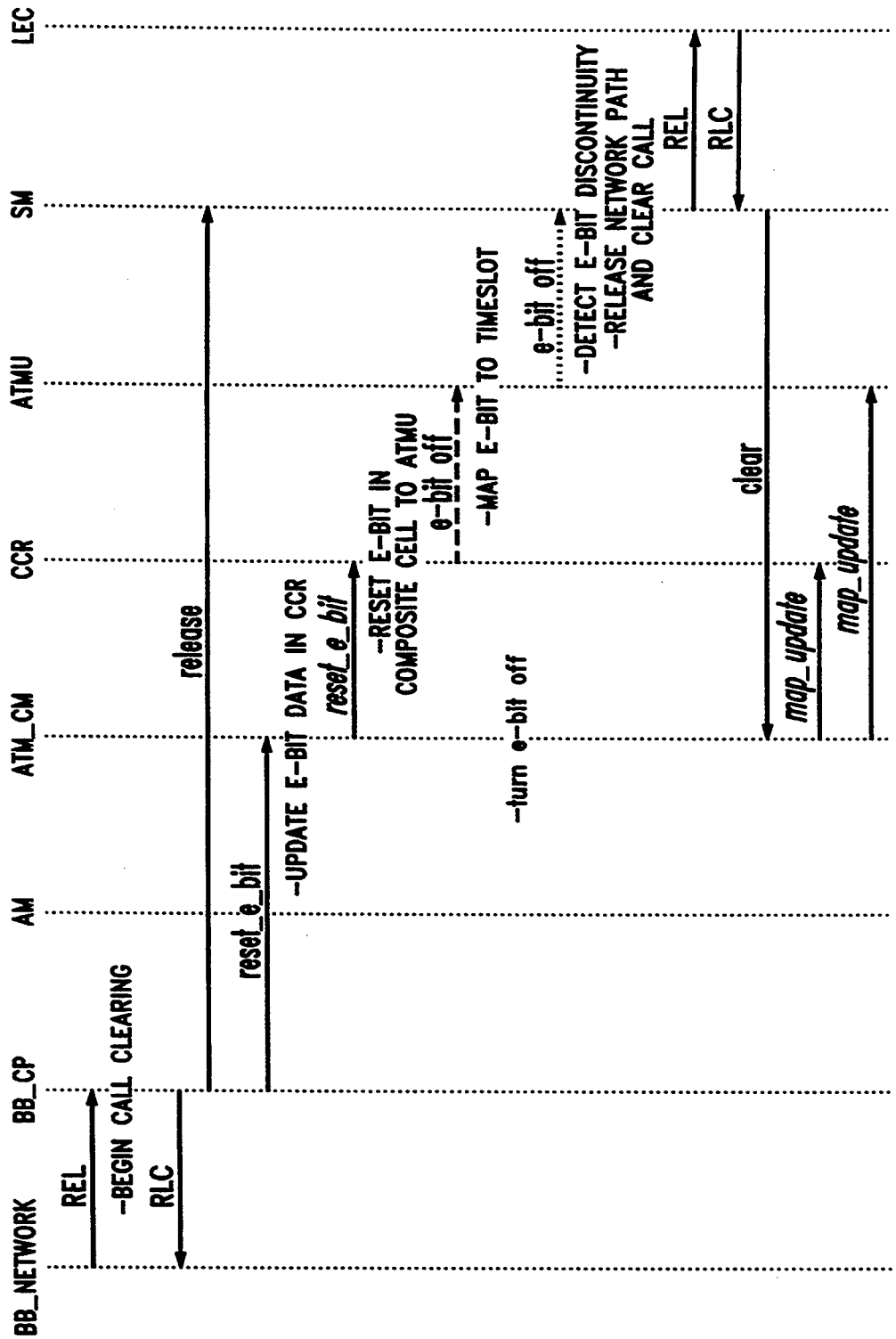

A flow chart for implementing the consolidation process is shown in FIG. 33. At some point, the consolidation process is started by the processor which controls allocation of permanent virtual paths (action block 1400). A test is made to determine the existence of partial fill permanent virtual paths (test 1402). This test is performed by checking to see if there are N PVPs with a common source and destination node which in combination carry less traffic than can be carried by N−1 PVPs. Since there is normally an order to the search for PVPs to a particular destination, the partial fill PVPs are most likely to be found at the end of such a list. As each source-destination set is checked if the partial fill condition does not exist (negative result of test 1402), a check is made to see if the process is complete (test 1404) and if so, this is the end of the consolidation process at this time (end block 1406). If not, another set of PVPs is checked for the partial fill condition. (In general, it is expected that no more than one PVP would carry traffic initiated from both ends. A PVP carrying such traffic can be eliminated in two steps by first eliminating the outgoing channels from one direction and after these channels have been eliminated in the process described hereinafter, converting the cell to be eliminated, not to a cell of an inactive PVP, but to a cell of a PVP carrying the traffic that is now fully controlled by the other end node.)

If a partial fill PVP set is found (positive result of test 1402), and it is found that the total traffic carried over the route served by these PVPs can be adequately served by one less PVP (to eliminate excessive shuttling of PVP activation-consolidation), then the controlling node (carrying outgoing traffic for that PVP) consolidates channels from a cell to be eliminated into the target cell (action block 1410). A message is then sent to the far end node (the node with incoming traffic for that PVP) informing that node of the new channels to be occupied by the channels from the PVP which is to be deactivated (or, in the case of a two-way traffic PVP, to be converted into a one-way traffic PVP). The outgoing node also arranges to have traffic from the channels of the cell to be eliminated transmitted to both the cell of the PVP to be eliminated and the consolidated target cell (action block 1414). The outgoing side node then waits to receive a positive acknowledgment message from the incoming traffic node (action 1416). In response to that message, the PVP corresponding to the eliminated cells is deactivated (action block 1418) (or, in the case of a two-way PVP, that PVP is then converted into an incoming traffic only PVP). Following execution of block 1418, other PVPs are checked for the partial fill condition (test 1402).

Detailed Description of ATMU

This section discusses the high level design of the Asynchronous Transfer Mode Unit (ATMU) that is used to perform the following two general functions and their reverse:

- Conversion of DS0 Transport to ATM Composite Cells
- Conversion of Variable Length Data Messages to ATM Cells This overview focuses on DS0 flow from the 5ESS switch to the ATM network (CBR traffic).

Space Switch

A block diagram of the ATMU is shown in FIG. 24. Network Control and Timing (NCT) links from the SM Time Slot Interchange TSI 517 are shown terminated on a space switch within the ATMU. The purpose of the space switch is to fan out the NCT links to 42 internal links. These links terminate on an array of cell memory devices, called the Cell Wide Buffer (CWB) in FIG. 24, that store the 42 DS0 PCM samples and E-bits of a composite cell. Thus, the space switch serves to route time slots (DS0s) to the correct composite byte location on the input of the CWB.

Cell Wide Buffer

The function of the Cell Wide Buffer (CWB) is to assemble the segments of the virtual path cells in a format which allows them to be simultaneously read out in a single memory read cycle. The CWB is a buffer whose width is the size of one ATM cell (not counting header bytes). The width is 42 segments (a segment, as used herein, is an 8-bit byte plus an E-bit, and the depth equals the number of unique active virtual paths that needs to exist at a given moment. As shown in FIG. 24 each of the PCM byte positions in the cell is written into separate memories each of which has independent write control circuitry. Each memory address in these memories corresponds to a specific virtual path. Each of these byte memories has a control memory that maps individual time slots (only the PCM part plus the E-bit) to one virtual path segment location in the CWB. Since the control memory for each segment memory is independent, each active time slot on the 42 links is able to go to any virtual path memory location in the buffer. Thus, bytes on the 42 links that appear at the same time at the input to the CWB can be stored in different virtual path memory locations in their respective buffer memories and thus assembled into different virtual path cells in the CWB. The control memory is able to block a write to the byte buffer memory if a particular DS0 on an NCT link is not active i.e., not presently in use for a any call.

Cell List Processor

During every 125 μs interval all active DS0s are written into the assigned byte locations of their selected virtual path cell. Composite cells are read from the cell wide buffer every 125 μs under control of the Cell List Processor (CLP) 630, shown in FIG. 24. The CLP has a list of active composite cells that are stored in a linked list. The linked list stores the ATM virtual path address header bits, and the CWB address that holds the virtual path's composite cell. The CLP list only stores the virtual paths for which active DS0s exist. The CLP traverses the list once every 125 μs, thereby causing each composite cell to be transmitted. After the CBR cells are transmitted, the CLP reads VBR cells (if any are queued) from the Message Layer Device (MLD) 670 to use up spare time in the 125 μs interval, as illustrated in FIG. 8.

Conversion to Synchronous Time Multiplex (STM)

Since the cell wide buffer is the width (data part) of an ATM cell, an entire ATM cell can be read from the cell wide buffer in one access. Parallel to serial conversion is implemented by means of parallel-in serial-out shift registers 651, ..., 652 which are selected by means of the Shift Register (SR) Selector 653, ..., 654 under control of the CLP 630. The read data along with ATM header data from the CLP is loaded into a shift register that connects to a SONET facility interface 661, ..., 662. In the case of a 46 byte cell, the two byte index is also provided by the CLP 630. The SONET facility interface connects directly to the ATM-CM.

ATMU Control

The control of the ATMU is provided by the ATMU central controller (ATMU CC) 601. Control messages are received in the ATMU CC from dedicated time slots intercepted in the space switch and transmitted to the ATMU CC over a dedicated control bus (not shown). The control messages are transmitted from a switching module processor (SMP) 511 of the 5ESS switch module (SM) 510 via a Message Handler 513 in the SM. The control signals from the ATMU CC are distributed in the ATMU over a group of control buses. The Space Switch 610 is provided with path set up and messaging control memory information, active link selection and active side selection. Link selection is used to determine which NCT links from the SM are active. Alternatively, the E-bits, discussed hereinafter, can be used to identify the active links since E-bits are only active for active paths. Link selection is used to determine which NCT links from the SM are active. The links can be either active or standby. The side selection determines which side of the ATMU is active or standby. The Cell Wide Buffer is provided with the mapping of the time slots to virtual paths and allocation of byte positions within the ATM cell. The Cell List Processor is provided with active virtual path information and provides the Shift Register Selector 653, ..., 654 with shift register address information. In this ATMU design, the ATMU can support more than one SONET facility, and so each ATM cell can go to one of the possible 8 Shift Registers. The CLP is provided with the identity of the proper shift register for each virtual path. The Inter-Working Units (IWU) 1020, 1022, ..., 1024 (FIG. 17) of the MLD are provided with the provisioned virtual path destination addresses also. The ATMU CC provides the maintenance control of the ATMU. Maintenance messages for the ATMU CC itself such as initialization of the ATMU CC are received over the dedicated control bus before entering the space switch.

The ATMU is controlled by the SM in the preferred embodiment. Alternatively, the ATMU can be controlled by the ATM-CM. In that case the ATMU Controller receives control from the Common Broadband Platform's Controller (CBP). The ATMU provides SM to SM, and SM to AM message based communication services for the 5ESS switch via interprocessor packets.

Message Interworking

The ATMU provides the following message based communication services for the 5ESS switch:
  SM to SM, and SM to AM via interprocessor packets
  SS7 Message Transfer Pan (MTP) packet transport
Both of these functions are handled in a similar manner. In FIG. 24, the Message Layer Device (MLD) receives messages from the SM via the space switch. Variable length 5ESS switch and SS7 messages are carried in time slot channels that originate from protocol handlers (PH) in the Packet Switching Unit (PSU) or from the SM Message Handler. The MLD contains three types of Inter-Working Units (IWU), the 5ESS switch messaging IWU, the SS7 IWU whose function is to reconstitute messages from the SMP, and the inter-PSU IWU for handling user to user data messages. The function of these units is to:
  Accept messages carried from the space switch
  Associate a virtual path that connects to the destination identified in the message's header
  Perform ATM segmentation and reassembly
  Shift data, when instructed by the CLP.

The handling of SS7 is slightly different than 5ESS switch interprocessor messages. For 5ESS switch interprocessor messages, the frame is relayed in a virtual path to the destination AM or SM. The messages are processed to read the destination address. The destination address determines which Virtual Circuit the ATMU uses for segmentation to cells.

In the SS7 message case, the signaling data link is terminated in the SS7 IWU, and the MTP message is relayed on a virtual path to the destination toll office. The handling of cell based messages coming from the ATM network and general control and fault tolerancy are discussed in detail hereinafter.

For inter-PSU messages, the messages are processed to read the destination PSU address; this destination address determines which virtual circuit the ATMU uses for segmentation into cells.

SM/ATMU Remoting via SDH/SONET

In this embodiment, the ATM-CM and ATMU are connected via intra-office SDH/SONET (Synchronous Digital Hierarchy/Synchronous Optical NETwork) facilities that carry ATM. The SM with ATMU is not a Network Element as viewed by the SDH or SONET network, and does not terminate the digital communications channel (DCC) section overhead. However, the intra-office facility is optical, so that an SM with ATMU can be remoted from the ATM-CM. If the SM with ATMU connects directly to the ATM-CM, then only fibers (and, where appropriate, repeaters) are needed for such remoting.

In the event that an SM with ATMU is remoted via the general SDH/SONET network, then SDH/SONET multiplexors or crossconnects that support Synchronous Time Multiplex-1 (STM-1) and multiplexed STM-1 are used in order to properly terminate section DCC at the SM end. In this general case the SONET/SDH facility at the SM end must be terminated by a SONET/SDH multiplexor in order to provide an intra-office SONET/SDH facility directly to the ATMU. This will make it unnecessary to develop separate SDH/SONET DCC Operations Administration Maintenance Provisioning (OAMP) functions in the SM and avoid the possible confusion of having both the CBR and the SM performing SONET/SDH OAMP processing in the same office.

The above discussion applies only to the SM to ATM-CM links (assuming that the ATMU is part of an SM). The ATM-CM terminates section DCC for inter-office trunks, and is viewed by the SDH/SONET network as a general Network Element. Thus, due to the capabilities of the ATM-CM, the 5ESS switch (i.e., an AM, a group of SMs, their associated ATMUs, and an ATM-CM) is an SDH/SONET Network Element even though the SM by itself is not.

Alternatively, it is possible to associate a group of ATMUs directly with an ATM-CM instead of directly with the SMs. In this case, the NCT links connecting the SMs with ATMUs are longer as in the well-known case of optically remoted SMs for the 5ESS switch. In that case, a SONET facility can be used to convey the ATM signals to the ATM-CM in essentially the same way as distant ATM signals are conveyed thereto, or if the ATM-CM can be so arranged, the ATM signals can be directly transmitted from the ATMU to the ATM-CM.

ATMU General Functions

This section summarizes the functional relationship of the ATMU to the ATM-CM and SM. The ATMU is treated by the connected SM(s) as an intelligent peripheral unit that receives control messages from the SMP(s) in the same way that other intelligent units do. The purpose of the ATMU is to provide:

1. SM time slot to ATM composite cell conversion assuming fixed, provisioned virtual paths. Up to about 10,000 time slots (20 NCT links) are supported using present technology. (An NCT link transmits 512 multiplexed DS0 bit streams, and uses optic fiber transmission.) The ATMU can route any incoming time slot to any byte position of any connected active CBR virtual path. The active CBR virtual paths are a proper subset of a large number of pre-provisioned virtual paths, most of which are not active at any one time.

2. Inter-SM and SM to AM and/or SS7 variable length message to ATM cell virtual path conversion, using fixed provisioned VBR paths. Because of the high priority of SS7 messages, it is desirable to pre-allocate VBR bandwidth for the SS7 signal paths. The ATMU transports inter-SM Link Access Procedures (type) B (LAPB) frames without any termination of LAPB protocol. In the case of SS7, the ATMU terminates the SS7 Level 2 (High-level Data Link Controller (HDLC Part)), and transports MTP/SCCP (Message Transfer Part/Signaling Control and Connection Part) messages. The MTP protocol is not terminated at the ATMU.

3. An SDH/SONET facility access to the ATM-CM is provided for the virtual path cells. The rates are STS-3 (Synchronous Time Signal) to STS-12 and STM-1 to STM-4 for SONET and SDH respectively, and a sufficient number of these facilities is provided to meet outgoing composite cell needs for an SM supporting up to 10,000 trunks. For more or fewer trunks, more or fewer facilities can be equipped.

4. Handling of NCT A-G bits (bits that are sent with each PCM sample from the SM to the ATM-CM) that is as transparent as possible to the SM, including E bit (supervision of a time slot) functions. Time slot parity on the NCT is also terminated/generated.

5. Support Central Processor Intervention (CPI) This is a function that sends special bits on the NCT link that will reset the SM's processor, in case that processor loses sanity.

6. Support inputs from a plurality of SMs.

7. Support inter-PSU user to user message traffic.

ATMU Components

This section discusses the design of the individual blocks of the ATMU and the duplication plan to achieve high reliability:

Space switch 610
Cell Wide Buffer 620
Cell List Processor 630
SS7 message Inter-Working Unit 1022
Inter-SM/AM message Inter-Working Unit 1020
ATMU Central Controller (ATMU CC) 601

The first three blocks of the ATMU listed involve DS0 to composite cell conversion. The next two blocks involve variable length message to ATM cell conversion. For purpose of architectural discussions, the SS7 and intra-switch IWU are considered to be part of the Message Layer Device.

Discussed after the ATMU CC section are alternatives for implementing the CBR Processor Intervention capability of the ATMU (with CM-ATM).

Space Switch

The space switch interconnects NCT link DS0s from the SM Module Controller Time Slot Interchange (MCTSI) with NCT bus DS0s to the Cell Wide Buffer (CWB) and the ATM Message Layer Device (MLD). The number of NCT buses to the CWB is 42. There also is one NCT bus to the MLD. By convention, NCT buses on the "SM MCTSI side" are called links, buses on the "CWB side" are called NCT buses. Anywhere from 2 to 24 NCT links (i.e., up to 10,000 trunks) (or more in a next generation SM) can be supported by the space switch. The internal design of the space switch is shown in FIG. 25. The fabric is the core of the design, and consists of multiplexors that accept up to 24 NCT links. These multiplexors have a control memory that selects one of the up to 24 NCT links for each of the 512 locations on the NCT link. The selected NCT link's time slot is then the output of the multiplexor for the given time slot period. The number of multiplexors is equal the number of segments in the composite cell (i.e., 42 multiplexors) plus one more multiplexor to create the NCT bus to the MLD. Thus there are a total of 43 multiplexors depending on the composite cell chosen for the overall system. In this manner, any of the 512 time slots on any of the NCT links can be connected to any of the byte locations in the cell wide buffer or the MLD.

The NCT links from the MCTSI terminate on the NCT Link Interfaces (NLI). The NLIs present a synchronized set of backplane buses to the space switch multiplexors so that all multiplexors are switched synchronously. The multiplexors then present a set of synchronized buses to the CWB and the MLD.

In the reverse direction (i.e., from CWB towards SM MCTSI) the space switch operates operates in exactly the same manner. Bytes from the CWB terminate at fabric multiplexors driven by control memories. The output of these multiplexors connect to NLIs that then cross couple to SM MCTSI hardware.

The core fabric of the space switch interfaces to the NCT links via the NLI cards. The NCT links are duplex, meaning they originate from each side of the SM MCTSI. In order to cross couple to the SM MCTSI, the NLIs themselves are duplicated. The NLIs are part of the core fabric failure group, so that each side of a NLI connects with one multiplexor fabric side. The NLIs are coupled to both sides of the SM's TSI, but attach to only one side of the space fabric. Thus, either space fabric side can reach either SM TSI side. The multiplexor fabric cards connect directly to the CWBs. The NLI, multiplexor fabric, and CWB are all in the same failure side. As discussed below, the Cell List Processor is also in this same failure group. From a system perspective, the cross coupled NCT links terminate two common sides of the ATMU, each of which which has a space switch plus associated hardware to form the ATM cells.

The NCT buses are coupled via the space switch to the MLD. The MLD is cross coupled with the space switch, and is in its own failure group.

The space switch (with NLI) uses the following error detection methods:
Parity on NCT time slots
Parity on control memories
Parity on control buses from the ATMU CC
Loss of clock and synchronization
Errors from these detectors are send to the ATMU CC, which then executes fault management procedures.

Space Switch Control

The control memories in the multiplexors, as well as other control registers used to select active NCT links and ATMU sides, are all under control of the ATMU Central Controller. The space switch hardware has no firmware or software; all control is provided via buses from the ATMU CC.

There are two operational uses of the space switch, both of which require space switch memories to be written by the ATMU CC, namely call circuit switching and provisioning of message DS0s from message sources in the SM to the MLD. For call circuit switching, when a call is set up, signals for one DS0 must be connected to a cell wide buffer virtual path byte location. The SMP (in conjunction with the AM) determines the virtual path byte location to use for each DS0 signal. The SMP causes each DS0 signal to be placed into an NCT link time slot using an MCTSI TSI slice, and then orders the ATMU CC to write the appropriate multiplexor memory to route that DS0 signal to the correct CWB byte location. Cell wide buffer hardware then moves the DS0 signal to the correct virtual path cell in the memory.

The SMP provisions DS0 channels to carry messages from the Message Handler or PSU, through an MCTSI slice to the space switch. The SMP then orders the ATMU CC to write an appropriate multiplexor location that routes the DS0 channel(s) to the MLD.

In the above scenarios, the duplicated space switches are written with identical information.

Cell Wide Buffer (620) (FIG. 26)

One of the two output destinations of the space switch is the CWB 620 (FIG. 26). Each segment location in the CWB has a control memory called a Time Slot Assign (TSA) that loads the virtual path segment for each NCT time slot received (FIG. 26). The TSA can also be programmed to not accept a given time slot on the NCT bus. Thus, each cell wide buffer location can, on a per NCT slot basis, independently load a different (or identically same) virtual path composite cell. (The serial NCT link signals shown in FIG. 26 are converted into segments prior to being stored in buffer 801).

The unloading of the CWB towards the ATM-CM is under control of the Cell List Processor (CLP) 630. The CLP makes requests synchronously to the CWB by sending an address and a read request. An entire cell payload portion is read at once in one memory access into a shift register. At the same time, the CLP loads the cell header into the shift register. The shift register is shifted out to an SDH/SONET facility Line Processing Unit (LPU) 661, . . . , 662. CLP read operations of the shift registers are interlaced with the TSA controlled writes from the NCT links.

In the reverse direction (from ATM-CM to SM MCTSI) the cell header is unloaded from the shift register into the CLP. The CLP uses the header to determine the CWB location for the call. (Because of the symmetry of the two directions of the paths, all segments of a particular input cell to the ATMU may be stored in a common location of a cell-wide buffer.) Then, the CWB is loaded from the shift register into the buffer. Finally, the TSA control memories in the buffer read the bytes onto the NCT buses at the correct time.

The depth of the CWB until now has been discussed as being equal to the total number of (active) virtual paths so that one DS0 per virtual path (in each direction can be stored). However, the buffer must be two or three times as deep (depending on direction) due to the following reasons:

The fundamental nature of ATM is that jitter of cells can occur due to random internal queuing within the ATM-CM.

CWB loading and unloading from the shift registers must be synchronized with CLP reads and writes to/from the shift registers to avoid cells being sent that have DS0s from different NCT 125 μs frames. Such frame misalignment could disrupt the continuity of N*DS0 services being transported by the composite cell.

To solve this problem, in the direction from the SM MCTSI towards the ATM-CM, the CWB is double deep (two partitions). This means that the space switch loads one half of the CWB, while the CLP reads from the other half. After one partition is written the CLP and space switch access the other partition. Each half (partition) is identical in composition (i.e., has the identical number of virtual circuit composite cells supported). In the direction from the ATM-CM towards the SM TSI, the CWB is of triple depth (three partitions) in order to allow 125 μs of "build-out". Build out is used to keep the CWB from "under-running", and amounts to 125 μs of fixed delay. Under-run occurs if cell jitter occurs to the extent that no new DS0 exists in the CWB when the NCT bus time slot must read that location. Thus, two of the "partitions" of the CWB provide the buffering to account for the jitter, and the third partition accounts for the time to read the DS0s from the CWB without interference from cell writes due to incoming cells. The control memories in the TSA of the CWB automatically cycle through the CWB buffer partitions. The CLP determines into which partition an incoming cell from the ATM-CM a cell should be written. The partition varies from virtual circuit to virtual circuit due to the fact that jitter can cause (e.g.) zero, one or two cells to arrive in a given 125 μs interval. If cells are lost, then the triple buffer CWB can wrap around (in effect an underrun). This is detected if the space switch and CLP ever access the same partition, and causes the CLP to read from the partition that is furthest in time from the current build-out partition.

DS0 Path Monitoring/Test

Monitoring circuitry is provided to determine that composite cells are being received by the ATMU every 125 μs on average. To achieve this, the CLP maintains a counter for each composite cell virtual path that is active. Every time a cell arrives, the counter is incremented. The counter increments on average every 125 μs. The counter may not increment exactly every 125 μs due to jitter of ATM cells resulting from random queuing in the ATM-CM. This jitter is a fundamental aspect of the ATM-CMs. The CLP determines every 10 milliseconds (ms) whether the counter has incremented approximately 80 times. This will have a variation of plus or minus 3 due to near term jitter, and very low probability cell loss and insertion. If the counter is further from this value, the ATMU CC is notified which is able to read the counter to determine if virtual path loss has occurred. The counter is able to reach 8000 plus or minus 4. The counter is then checked after one second to determine if it has reached 8000 plus or minus 4. The 8000 count is used to determine if a high cell loss per second has occurred.

A direct test of circuit continuity is designed into the ATMU. ATMU CWB memory devices at the source (towards the ATM network) insert a code (possibly multi-byte) into a byte location of a cell. This occurs before a talk path is connected. At the destination end of the connection, the cell wide memory devices read the pattern and detect a match. This byte code can be changed as part of the test to cause bits in the DS0 to toggle. This toggling can then be recognized within the ATMU CWB and reported to the ATMU CC. The ATMU CC can then cause E bits on (path continuity bits that are internal to a 5ESS switch and not transmitted over inter-switch facilities) on the NCT link that carries the DS0 signal to toggle, as well as send messages to the SMP that indicated that continuity has been established. (E-bit use is described in E. H. Hafer et al.: U.S. Pat. No. 4,280,217).

The CWB is in the same failure group as the space switch, as discussed above so that failures in the cell wide buffer result in a side switch of the CWB, space switch and CLP and the MLD. The LPUs are cross coupled to the facility shift registers (FSRs) and CWB. Thus, a CWB can receive cells from either of the duplicated LPUs. Which of the two LPUs is being used is under control of the ATMU CC.

The primary error detection method in the CWB is parity over:
NCT buses from the space switch
Virtual path byte memories
TSA control memories
Control buses from the ATMU CC

Control

The CWB is controlled by the ATMU CC. There is no firmware or software in the CWB hardware.

From an operational point of view, the CWB is used to map a given composite cell byte location to a particular virtual path. The SMP routes a DS0 channel through the SM MCTSI, and then causes the ATMU CC to connect a DS0 through the space switch to a given byte location on the CWB. The control memory in the CWB for that byte is then written with an address associated with the virtual path. This occurs in TSA control memories for both directions. At this point in time, a connection exists from an SM MCTSI DS0 and a given composite byte (DS0) on a given virtual path.

All other functions are likewise under control of the ATMU CC, including error detection control associated with DS0 continuity test and monitoring, and LPU state control.

Cell List Processor (FIG. 27)

The CLP 630 (FIG. 27) is responsible for moving cells between the CWB 620 and the Facility Shift Registers (FSR) 651, . . . , 652 (FIG. 24.) Towards the ATM network, the CLP has a linked list of records that store the CWB location for each active virtual path. Every 125 μs the CLP traverses this list and causes the CWB to load all active cell into the FSRs. In the other direction, the CLP has an address look-up function that is used to load the CWB with cells incoming from the FSR. As stated in the description of the CWB, the CLP keeps track of the CWB partition to be accessed for signal transmission in both directions.

The FSRs connect to the facility Line Processing Unit (LPU) (661, . . . , 662) which is the actual hardware device (circuit card) that transforms bits for transmission to the physical media, and that performs facility related maintenance functions. Thus the LPU card supports optics, synchronization, and SDH/SONET overhead processing circuitry such as Byte Interleaved Parity, etc.

FIG. 27 shows the internal design of the CLP. The sequencer 920 reads service request bits from the FSR. The request bits can be inhibited if an FSR does not connect to an equipped or otherwise In-Service LPU. The sequencer responds to a service request bit for a given FSR by checking a list of active virtual paths that are provisioned to the facility associated with the FSR. The list, stored in the virtual path list memory 930, accessed by the sequencer, is started at the beginning of every 125 μs interval, and must be completed before the start of the next 125 μs. The last requirement is a reflection of the fact that the bandwidth offered to a facility should not be greater than the capacity of the facility for constant bit rate services such as voice. Each time a service request is made, the sequencer reads a virtual path cell entry from the list, loads the FSR with the header information that is stored in the list entry, and causes the CWB to load the 48/46 bytes into the FSR.

Active virtual paths are made inactive by removing entries from the list of active virtual paths associated with an FSR. The ATMU CC has a buffer 921 it shares with the sequencer that the sequencer uses to add and delete entries from active lists at idle times while cells are being transferred out of the FSRs.

The forgoing was described in a sequential manner. However, in reality, significant overlap of operations exist. For example, the checking of FSR request bits overlaps with the accessing of previously checked FSR requests, as well as with the sending of read orders to the CWB.

In the direction towards the SM (from the ATM network), cells are clocked into the FSRs from the LPUs, and request bits are set. The CLP services these bits by first mapping the virtual path address in the composite cell header to a CWB location. This function is accomplished by the ATM Address Mapper (AAM) 940 within the sequencer which translates the ATM header address to a physical address in the CWB memory devices. The AAM also uses the an index associated with the FSR so that the same ATM cell headers can be used on the different facilities, otherwise the headers would have to be different on all facilities. Then the sequencer loads the cell in the FSR into the CWB location. All FSRs are on a parallel bus to the CWB, so that only one can be loaded at a time into the CWB. In the preferred embodiment, the AAM is implemented using a Content Addressable Memory (CAM).

The design of the sequencer 920 is based on the use of high speed logic (programmable logic) that runs at over 100 MegaHertz (MHz) and scans shift registers request bits, operates the CAM, reads the linked list, gates data between the CWB and shift registers, and counts the cell arrivals. Examples of such logic are the PAL logic circuit family manufactured by Advanced Memory Devices (AMD) that uses parts such as the 22V10 device provided by many manufacturers. Another component is the PLC14 by Signetics. Other gate array technologies exist from Texas Instruments that can also run 100 MHz plus.

ATM Congestion Test Function

One function of the ATMU is to be able to determine whether or not a composite cell virtual path that is about to be placed into the active state will experience congestion, and thus prevent such congestion from occurring. Congestion is defined as occurring if the utilization of the path increases above some threshold along any segment.

Alternatively, when congestion occurs, cells are marked by one or more ATM-CMs along the path. The marking concept uses congestion control bits in the ATM header to test the occupancy of links between the source and destination. When the occupancy is above a threshold, the ATM-CM (and other intermediate ATM-CM) will mark the cell. The ATMU must note this and report the event to the ATMU CC, which then reports the event to the SM. In order to provide a static indication, the cells should all arrive marked over a period of a predetermined number of cell arrivals. Upon reception of a cell from an FSR that has request bits set, the CLP will transfer the congestion control bits and the virtual path identifier to a memory that is accessible by the ATMU CC. The ATMU reads this memory and reports the result to the SMP. If congestion occurs, new CBR PVCs are not activated if they use the congested link, and PVC consolidation (FIG. 22) is accelerated.

A diagnostic to test this mark detection mechanism is as follows: The CLP is ordered by the ATMU CC to set the congestion bits on a link known not to be congested. Downstream ATM-CMs will not affect already set bits, so the far end ATMU should detect the set bits. The ATMU CC then orders the bits to be cleared. The receiving ATMU should detect that the bits ,are cleared. Such a test can be used to verify the detection circuitry of the marked ATM cells, and the ability of the network to transport these bits after they are marked.

The exact use of the congestion bits has not been determined by the CCITT. In the arrangement described herein, these bits are used to verify bandwidth in a manner analogous to the frame marking algorithm used in Frame Relay. That algorithm drops frames that are marked if congestion occurs. However, ATM cells are not dropped since the marking threshold is below the capacity of the channel.

The CLP is pan of the same failure group as the space switch and CWB. A fault in the CLP causes a side switch of the ATMU, under control of the ATMU CC.

Parity is used on all list and sequencer driven memories. Additional hardware such as a timer that checks for sanity and dead clock conditions are also employed. The memory driven sequencer program is downloaded by the ATMU CC as part of CLP initialization.

Control

The CLP is controlled by the ATMU CC. Registers exist on the CLP that cause the CLP to modify information in the linked list table and/or the ATM Address Mapper (AAM). In effect, the CLP simply writes ATMU CC data directly to those memories, but at a time that is synchronized with other CLP activities. The FSR request bits are inhibited by registers accessible directly to the ATMU CC. Other communications such as marked cell information, or control to mark cells is handled through registers 921 shared between the CLP and the ATMU CC. Any complex processing that does not have to be done on a cell by cell basis is performed by the ATMU CC.

In operation, after the SMP has connected a DS0 through a given SM MCTSI slice onto a NCT link, and has caused the ATMU central controller (ATMU CC) to connect the DS0 through the space switch into the correct virtual path memory in the CWB, at the time a virtual path is activated, the ATMU CC causes the virtual path address to be added to the list of active cells associated with the facility (FSR) the virtual path. At this point in time, the composite cells are transferred to the ATM network, and DS0 continuity exists (at this end). The ATMU CC then performs various actions discussed above to test and monitor DS0 continuity.

ATM Message Layer Device (FIG. 28)

The ATM Message Layer Device (MLD) (FIG. 28) provides variable length message to ATM conversion for the 5ESS switch for the following three communication systems:

SM to SM, and SM to AM communications
SS7 Network: SM to SM communications in the toll network
Inter-PSU packet communications By providing these interworking services, the ATM network can be used for message transport, thereby simplifying inter-SM message exchange within in the 5ESS switch, and/or eliminating the use of STPs for messaging between switches in the toll network. STPs used for point of presence for local carriers to the interexchange carrier are not affected by this use of ATM. However, reduction of STPs brings about a savings in operations cost and hardware costs.

Further, in accordance with the teachings presented herein, in the preferred embodiment, the Message Switch within 5ESS switch (described, for example, in the *AT&T Technical Journal* reference on pages 1418–1421) is eliminated from the 5ESS switch, and the CM Processor Intervention (CPI) function is provided as discussed below in Section 4.6.

Contained within the MLD are the SS7 Inter-Working Unit (SS7 IWU) (1020) and the SM Inter-Working Unit (intra-switch IWU) (1022), and the inter-PSU Working Unit (1024) as shown in FIG. 17. A NCT bus from the space switch of the ATMU transports one or more DS0 based channels that contain either SM or SS7 messages from the Message Handler and/or PSU to the MLD. This NCT bus is duplex, having a source in each of the duplicated portions of the space switch. Within the MLD, the bus is fanned out (via backplane) to the SS7, SM, and inter-PSU IWUs.

The outputs of the MLD on the ATM side are serial shift registers that are essentially in parallel with the shift registers of the CWB. This can be seen in FIG. 18 which shows a block diagram for an IWU. The CLP services requests from the MLD and interleaves the ATM based message cells with composite voice cells. The algorithm for interleaving is that composite cells are transmitted first (every 125 μs and then ATM based message cells. The 125 μs interval should not be overlapped with the next 125 μs interval for composite cells. The ATM based messages can be assumed to always have bandwidth on the facilities; facility usage is allocated in a way that guarantees that messaging bandwidth is always available. Simulations and/or field experience are required to determine a minimum adequate margin for sending messages on facilities for which composite cells are also transported.

In the incoming direction from the ATM network, the CLP translates ATM virtual path headers, determines whether the cell is a SS7, a SM, or an inter-PSU message based virtual path, and directs the cells to the correct one of the IWUs within the MLD. The IWUs receive cells and commence message re-assembly. Subsequently, the re-assembled messages are transmitted in DS0s on the NCT bus to the space switch of the ATMU. The IWUs must be able to associate a cell from a given virtual path with a given DS0, or set of DS0s for N*DS0 pipes.

An alternative to the above would be to have the SM, SS7, and inter-PSU IWU connect to the ATM-CM directly via SDH/SONET facilities. However, this would use up limited facilities on the ATM-CM for traffic loads that are a tiny fraction of the facility's throughput. For this reason the slight overhead of having the CLP route the cells internally is preferred. In addition, the DS0s must be multiplexed back into the 5ESS switch SM, and the NCT buses and links are the most economical arrangement for so doing.

An assumption is that at least one SM IWU is always equipped, since that is the only mechanism an SMP has to communicate with the AM or other SMPs. The SS7 IWUs are optionally equipped, so that they may or may not be present, depending on the application. For example, in international 5ESS switches, the SS7 links are often clustered in only one SM, and this SM may direct all of its SS7 traffic to one ATMU. In addition, the MLD design allows for a variable number of SS7 Signaling Data Links (SDL). This may imply variable number of SS7 IWUs, depending on the number of SDLs that one SS7 IWU can handle. This flexibility help specialized applications such as the 5ESS switch's International's Global SM (GSM), (the SM which has all the SS7 links). The GSM which has a centralized SS7 PSU that can generate a large number of individual SS7 SDLs, so that an ATMU that is able to terminate a significant number of SDLs may minimize the software impact on existing 5ESS switches.

ATM and Protocols

The interaction of ATM and intra-switch and SS7 protocols is first discussed and compared. A basic concept of ATM is that ATM provides transport level services only. To adhere to this concept, the SM IWU only relays intra-switch frames. It does not perform protocol processing in the usual packet switching sense. For example, retransmissions are not supported by the SM IWU. Protocol processors (i.e., PSU Protocol Handlers and/or Message Handlers) process Link Access Procedures (type) D (LAPD) protocol end-end over the ATM network. In essence, the SM IWU identifies the SM destination in an High-level Data Link Controller (HDLC) frame, assembles cells with the correct virtual path that corresponds to the destination SM, and then transmits the cells into the ATM-CM.

The same arrangement is used for SS7. The ATM network relays SS7 MTP packets between SS7 Signal Processors which are in the various switches of the network. An SS7 implementation features a single point to point link (see CCITT standard Q.703) that usually connects to an STP, not used herein. However, the SS7 network is point to multi-point, at the MTP layer. To rationalize the point to point ATM layer with the point to many point nature of MTP, the ATMU terminates the signaling link layer, and associates MTP packets with a virtual path to a destination that corresponds with the "MTP Point Code". The messages are assembled into cells, and then relayed over the ATM network. At the destination, the MTP packet is re-assembled, and a local signaling data link layer entity is used to send the SS7 packet back to the Message Handler or PSU Protocol Handler via DS0s on an NCT bus that connects to the space switch (as was the case in the SM IWU). This approach helps minimize the impact of the removal of STPs on a 5ESS switch or other switches since the ATMU essentially emulates the behavior of an STP (as viewed from the perspective of the PSU/PH) at the SDL level.

SM IWU

The function of the SM IWU is to associate LAPD frames with provisioned virtual paths, and then convert the frames to cells. As stated above, the SM IWU does not execute procedural LAPD on the intra-switch messages. However, the bit oriented LAPD protocol of the intra-switch messages must be processed to verify message integrity via Cyclic Redundancy Check (CRC), and more importantly, to remove bit stuffing from the message so as to be able to read the SM destination address. Only after the bit oriented protocol (BOP) is processed and the "bit stuffing" is removed can the SM destination address be read.

To accomplish the above, the SM IWU receives inter-SM LAPD messages on a provisioned number of time slots (e.g., 12 DS0s or 768 kilobit/second) on the NCT bus from the ATMU space switch into an HDLC device 1120, (FIG. 18) on the SM IWU. The HDLC device stores the inter-SM frame in a buffer from which the address (and CRC check result) can be read by the SM IWU internal controller. The controller associates the destination SM address with the correct virtual path. Then the frame with LAPD header is assembled into ATM cells using the Connection Oriented Network Services (CONS) procedures in accordance with the ATM Adaptation Layer specified in CCITT Standard I.363. As a brief summary, these procedures involve the use of:

- A bit field that indicates first segment (i.e., cell), middle segment, and last segment of the message
- A CRC that also indicates the integrity of the overall message
- A length field that indicates the number of bytes in the message
- An index that binds all the cells of a given message together.

In the above list, the term "message" is used synonymously with LAPD frame. The assembly to cells is accomplished by a modified direct memory access processor, the ATM Adaptation Layer Processor (AALP) that generates the cells, bit fields etc. The output of the AALP is connected to an LPU (FSR) that connects to the CLP. Currently only one FSR (connected to duplex LPUs) is supported by each IWU since the bandwidth from one facility is far beyond that which is necessary. When a cell is ready for transfer, hardware in the CLP will transfer from the IWU FSR to the LPU. No cell wide buffer is needed in the outgoing direction, due to the relatively low bandwidth requirements (as compared to the composite voice case).

In the reverse direction from the ATM network, the CLP reads the ATM header in the FSR that connects to the LPU. That FSR receives cells for both the composite memory (CWB) and MLD. At cell arrival, the CLP does not know if the cells are message based or composite. The CLP uses its ATM Address Mapper (AAM) (just as it would for composite voice) to determine if the cell should be sent to an IWU, or to the CWB (composite voice). For purposes of the immediately following discussion, the cells are assumed to be message based, and destined for an IWU. Otherwise the cells would have been loaded into the (composite cell) CWB. The CLP moves the cells to the SM IWU, or the SS7 IWU cell buffer 1170, (discussed below) or to the inter-PSU IWU. (This cell buffer 1170 is not the CWB 620 used for the composite voice.)

The flow of signaling, control and other narrow band messages are an example of data flowing from the ATM-CM to the SM (the opposite of the direction illustrated in FIG. 29). The SM (intra-switch) IWU AALP copies frames from the its cell buffer into queues that exist on a per message basis. Multiple message segments (cells) may be received concurrently, so that the identifiers in the cells are used to separate the cells into complete messages. After assembly, the messages are shipped back on DS0s on the NCT bus through the space switch in the ATMU.

The SM IWU has a cell buffer because there must be sufficient buffering to be able to receive a burst of cells if "cell bunching" occurs. This means the "ATM front end" of the IWU must be able to receive cell bursts at facility rates for short periods of time. The cell buffer 1170 is circularly organized (FIFO), and holds the entire ATM header plus 48 bytes of data, unlike the CWB for composite cells which does not store the ATM header. (In the composite cell case, the CLP processes and discards the ATM header for composite cells since the header serves no logical function once the frame is in the CWB. In the message case, the ATM header is further processed to assemble a complete message from the ATM cells.)

Simulation studies and/or field experience can be used to determine the optimum minimum depth of local cell wide buffering. Normally, the traffic intensity is minimal compared to the throughput of the SM IWU, since the SM IWU only processes frames for one SM, and does not have to perform the processing to actually terminate the LAPD protocol as do its sources, the PSU Protocol Handlers or Message Handler.

The SM IWUs are spared on a simple duplication basis, since only one (plus its duplicate) are needed in an ATMU. This is because there are only two inter-SM channels from the MH to the other SMs and AM.

Because the bandwidth required for inter-SM signaling channels is small, an NCT link carrying such signaling channels can be served by a single IWU. The ATMU CC determines which SM IWU is active. The MLD NCT bus fanout mechanism creates a cross coupling between the NCT buses from the space switch, so that either SM IWU can be active regardless of which space switch side is active.

Faults are detected by parity checks on the NCT buses from the space switch, as well as the internal error checking means normally used with processors and controllers, such as parity checks on memories and sanity timers.

A separate type of fault tolerancy function regards message transport impairment. Two types exist, ATM impairment, and Message Handler DS0 channel impairment. Impairment means excessive cell or message error rates. The SM IWU indicates message error conditions to the ATMU CC, such as corrupted frames from the MH/PSU, or corrupted messages from the ATM network, if they exceed a certain threshold. This is detected in either the ATM header, CRC-4, the CRC check in the LAPD frame from the PSU PH or MH, or the CRC within the message as it is transported within ATM Connection Oriented Network Service (CONS). In the event of high ATM error rate, the ATMU CC can switch the SM IWU to the spare LPU (i.e., a facility protection switch) or take actions to diagnose the hardware between the SM IWU and the LPU (including the SM IWU). In the latter case, an ATMU side switch or SM IWU may be in order, depending on the coupling between the MLD and the space switch.

SM IWU Control

The ATMU CC communicates with the SM IWU via a control output bus connected from the ATMU CC to many of the units of the ATMU. In operation, the ATMU CC provisions virtual path destination addresses via this bus, and provisions DS0s through the space switch into the IWU. The ATMU CC does this as directed by the SMP. Provisioning is also performed in the CLP to load the AAM with the virtual paths that carry the messages. After this is provisioned, inter-SM/AM intra-switch messages can be sent at will by the SMP/MH, without any ATMU CC intervention, to any inter-SM/AM intra-switch destination.

SS7 IWU

The SS7 IWU is similar to the SM IWU, and occupies a position in the MLD that is parallel to the SM IWU. Therefore this section will primarily highlight the differences between the SM IWU and the SS7 IWU. The major difference between the SM IWU and the SS7 IWU are:

SS7 IWU terminates SS7 link protocol, but SM IWU only processes bit level LAPD to be able to read SM destination address SS7 IWU is variably equipped, so that, as discussed above, it may or may not be present. Furthermore, the SS7 IWU allows a variable number of Signaling Data Links to be supported, in order to allow a 5ESS switch Global SM to be supported on one ATMU.

As stated in the section on ATM and Protocols, the SS7 IWU terminates the SS7 link (SDL, level 2) protocol as received from the PSU Protocol Handlers or Message Handlers on the NCT bus between the space switch and the MLD. The SS7 IWU then associates a virtual path with the MTP point code, assembles the packets into cells, and transfers them out to the ATM network. At the destination switch, the CLP routes the cells to the SS7 IWU which then assembles them back to packets, inserts them into a SS7 signaling data link frame, and sends them back on the NCT bus to the space switch towards the PSU Protocol Handlers or Message Handler. The ATM network is used only as a transport mechanism for MTP packets as was the case for the intra-switch messages processed by the SM IWU.

The design of a SS7 IWU and a SM IWU is very nearly identical. The NCT bus side of the IWUs are both HDLC based, and controllers that process Bit Oriented Protocol (BOP) can also process the SS7 SDL protocol. AT&T manufactures a controller set (2 devices, the ATT 7115 and ATT 7130) that perform this function for 32 channels with all channels at full utilization for SS7 SDL. The ATM front end and interaction with the CLP is likewise identical, and will not be repeated here. Primarily, the MTP Point Code is used in place of the SM destination for purposes of virtual address association.

In one alternative architecture, the SS7 and SM IWU are located on the same IWU. Throughput is not an issue, only the number of DS0s to be supported on one hardware card. Given the NCT bus size of 512 time slots, and the use of double size cards, more than 32 time slots may be supportable in one card, making the use of a single IWU attractive in cost.

The SS7 IWU has a fault tolerancy design different from the SM IWU. Because a variable number of SS7 IWUs are used in one ATMU, the SS7 IWU redundancy in the MLD is N+1, versus 1+1 as in the SM IWU. In an alternative arrangement, the redundancy is N+2.

Control

The SS7 IWU has similar control issues as does the SM IWU. The SMP provisions:

Time slots from the Message Handler or PSU Protocol Handlers through the space switch to the SS7 IWU Maps in the SS7 IWU that associate Point Codes with virtual paths Virtual paths in the CLP.

Inter-PSU IWU

The Inter-PSU IWU works in essentially the same way as the inter-SM IWU, except that it switches packets supplied by PSU 519, packets which, in general, originate from and terminate to users. The IWU is transparent to the user level protocol being used.

ATMU Control

The NCT links connect the ATMU to the SM. Therefore, the same type of controller that is used in a digital trunk unit (DTU) or SONET Interface Unit (SIU) is used in the ATMU.

The ATMU CC operates and maintains the ATMU hardware as discussed in all the above sections, and therefore will not be repeated here.

The ATMU CC is 1+1 spared, and is in a separate failure group from the rest of the ATMU. Since the ATMU CC is a modified version of the SIU/DTU controller, no further discussion of the fault tolerancy aspects of the controller is required.

In the 5ESS switch, a protocol handler (message handler (MH)) is used to interface between the SMP and the TSI; control and signaling messages can then be transmitted between the TSI and the ATMU's MLD. This Message Handler in the 5ESS switch is used to communicate with the ATMU CC. This communication is via time slots that arrive on the links, and that carry LAPD based messages which ultimately originate from the SMP. The ATMU CC processes the LAPD, and executes the commands. Certain special functions such as processor reset are put into the special NCT link time slot used to transmit control messages to the ATMU CC if ATMU CC sanity is lost altogether for either side. Special bits in a predesignated control channel are reserved on the the NCT link to implement these functions.

As previously discussed, the ATMU can be located within the ATM-CM, in which case the ATMU CC is controlled by a controller of the ATM-CM.

CBR Processor Intervention (CPI)

The SMP Intervention capability that the AM uses to reset an insane SMP will now be discussed. In the current 5ESS switch, the AM controls message switch hardware to source bits in the Control Time Slot (CTS) of the NCT link. Since a goal of this design is to eliminate the Message Switch, the capability must be emulated by some combination of the ATM-CM and the ATMU. This capability is implemented as follows:

Special virtual paths from the AM to the ATMU carry cells with multi-byte patterned data. These are repeatedly sent to the ATMU by the AM via the APH 1240 to perform CPI. ATMU hardware (the Facility Shift Registers) is able to detect the condition, and is hard wired to the space switch, which then generates the CTS CPI bit pattern to reset the SM. This multi-byte pattern data can be a long pseudo random sequence that has essentially zero probability of ever being generated, within cells that should never be sent except to reset a specific SM. The ATM-CM is provisioned with these virtual paths between the AM and individual SMs.

AM and ATM-CM Operations, Administration, Maintenance, and Provisioning (OAMP) Platform The AM serves to support the entire 5ESS switch and ATM-CM (including ATMUs) OAMP needs. These include download and control of the ATM-CM, craft graphical display, and communication via ATM with SMs. FIG. 19 shows the AM/ATM-CM system architecture as comprising the following components:

ATM Management Module (AMM) including directly connected terminal. This is an adjunct fault tolerant processor that is an extension of the existing 5ESS switch AM, and serves to provided added processing throughput for new ATM-CM and ATMU capabilities.

Ethernet Bus to interconnect AM/AMM with Graphic Unit Interface (GUI), ATM Packet Handler (APH), and ATM-CM.

Small Computer System Interface (SCSI, an industry standard) peripherals for disk, tape, and CD ROM on-line documentation: These augment the existing AM non-volatile peripherals.

GUI workstation terminals that supports existing 5ESS switch equipment, ATM-CM, and ATMUs.

ATM Packet Handler provides the AM/AMM with the ability to communicate via ATM over SONET to the SMs. The SMs terminate the APH's ATM in their ATMU MLD's. To communicate with SMs, the AM/AMM sends messages via Ethernet to the APH which performs the message to cell conversion and transmittal to ATM-CM over SONET.

The GUI and non-volatile memory are commercial components whose control resides in AMM software. The design of the AMM and APH components are expanded in the following sections.

ATM Management Module

The AMM is a high capacity processing element of the AM:

Processors: AMM The processors are N+K redundant connected by a Future Bus(+) technology, IEEE 896 Standard. Automatic hardware and software fault detection, and restart capabilities are built into the processor modules. The AMM itself is supported by the Administrative Module (AM) which is used to create a high reliability environment for the AMM processors.

Memory Modules: The N+K processors share common memory modules that are used to store static and check-pointed data. Automatic hardware error detection capabilities are built into the memory modules. The memory modules are redundant, with data being stored in two memory modules; only the active module responds to read accesses.

The memory modules connect to the processors via Future Bus(+).

SCSI Peripheral Interface: There are two SCSI controllers in the AM/ATM-CM Platform. In addition to mirrored disks, there is a cartridge tape drive for loading the AMM and a CD ROM is optionally equipped to store on-line documentation.

Ethernet Transceivers: The ATM-CM and GUI workstations are connected through duplicated Ethernet interlaces to the AMM.

Dedicated AMM Terminal: A terminal directly to the processor complex, in order to access the core in the event both terminal controllers or Ethernet transceivers fail. This terminal does not have a GUI, and is intended for Man Machine Language (MML) commands only.

APH

The APH is a modified IWU from the ATMU MLD. It is shown in FIG. 30. The Rate Adapt and BOP controller are removed and are replaced by an Ethernet Controller and Transceiver. The Ethernet controller places message into the buffer. The processor determines the proper ATM header (Virtual Circuit). The AALP performs the functions of converting the message to cells. Unlike the MLD IWU, the Cell Buffer connects directly to an LPU that transforms bits to SONET media as soon as the segments are available. There is no CLP to gate the transmission of the cell to the LPU.

CCR

FIGS. 42–45 are four configurations of the CCR. While the preferred embodiment relates to ATM signals, a more general version of a CCR is a composite packet remap (CPR) unit, which remaps contents of composite packets in any packet system.

Figure 42:
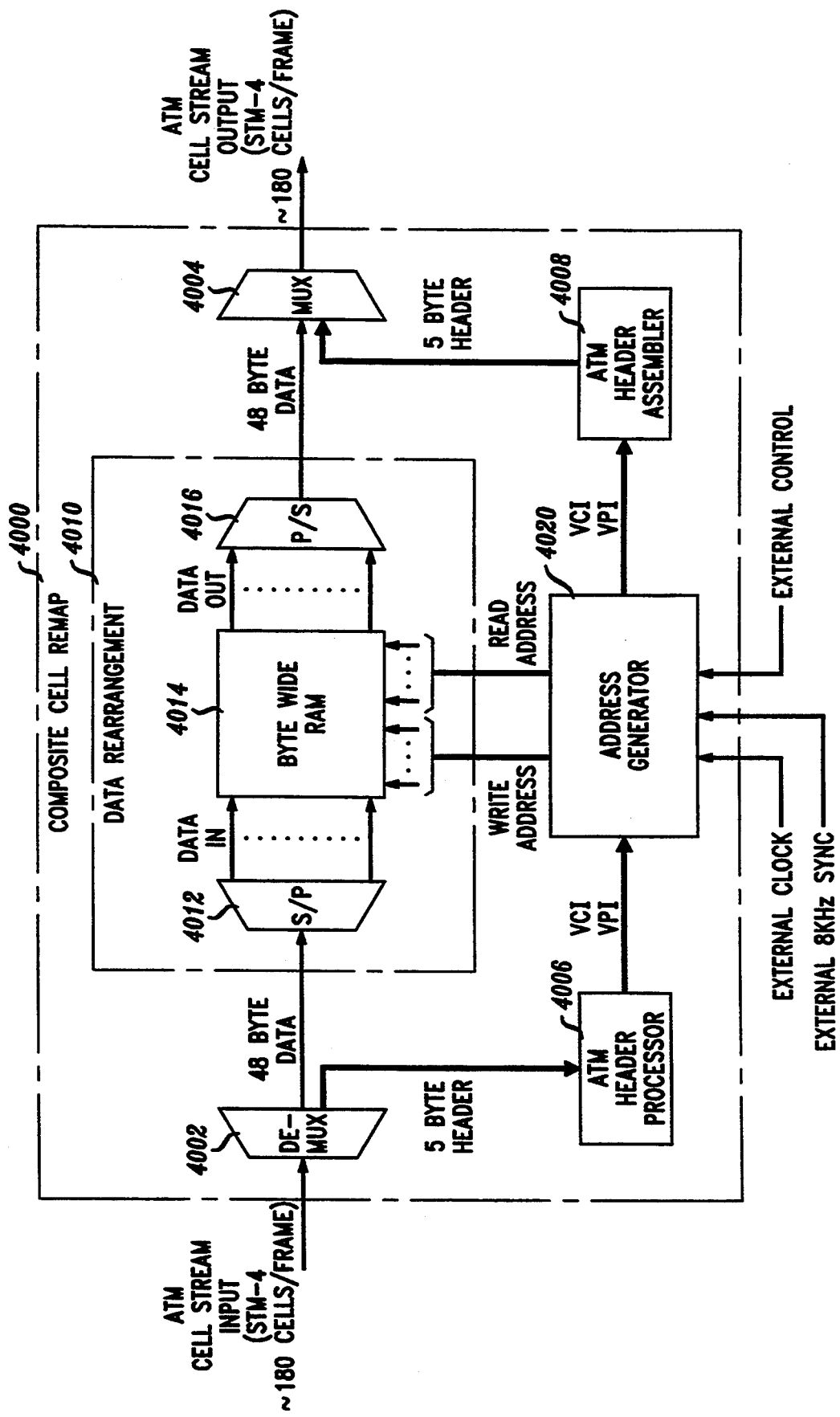
FIGS. 42–45 are block diagrams of four versions of a CCR.

FIG. 42 is for a CCR handling cells with 48 single byte DS0s per cell, both in and out. E-bits are simply not involved here. An example of the 48-byte to 48-byte mode is in the use of the CCR as shown on FIG. 11, where the CCR connects two transit ATM crossconnects, and in the central CCR of the example of FIG. 4. The input as previously noted, comprises 53 byte cells, each cell containing 48 single byte segments and a 5-byte header. A demultiplexor (demux 4002) receives the input and transmits the 48 bytes to the data rearrangement block 4010 and the 5-byte header to the ATM header processor 4006. The ATM header processor 4006 delivers the virtual circuit identifier (VCI) and virtual path identifier (VPI) to address generator 4020, shown in detail on FIG. 46. The address generator 4020 generates addresses for the RAM 4014 which receives the 8-bit bytes from the input stream and delivers 8-bit bytes at its output. Between the demux 4002 and the RAM 4014 is a serial-to-parallel converter 4012 for generating sequentially the 48 byte wide inputs to RAM 4014. Between the RAM 4014 and the multiplexor (mux) 4004 is a parallel-to-serial converter 4016 to take the single byte output of the RAM and generate a serial bit stream. Mux 4004 also receives input from the ATM header assembler 4008 which represents the 5-byte header of the outgoing cell.

Figure 43:
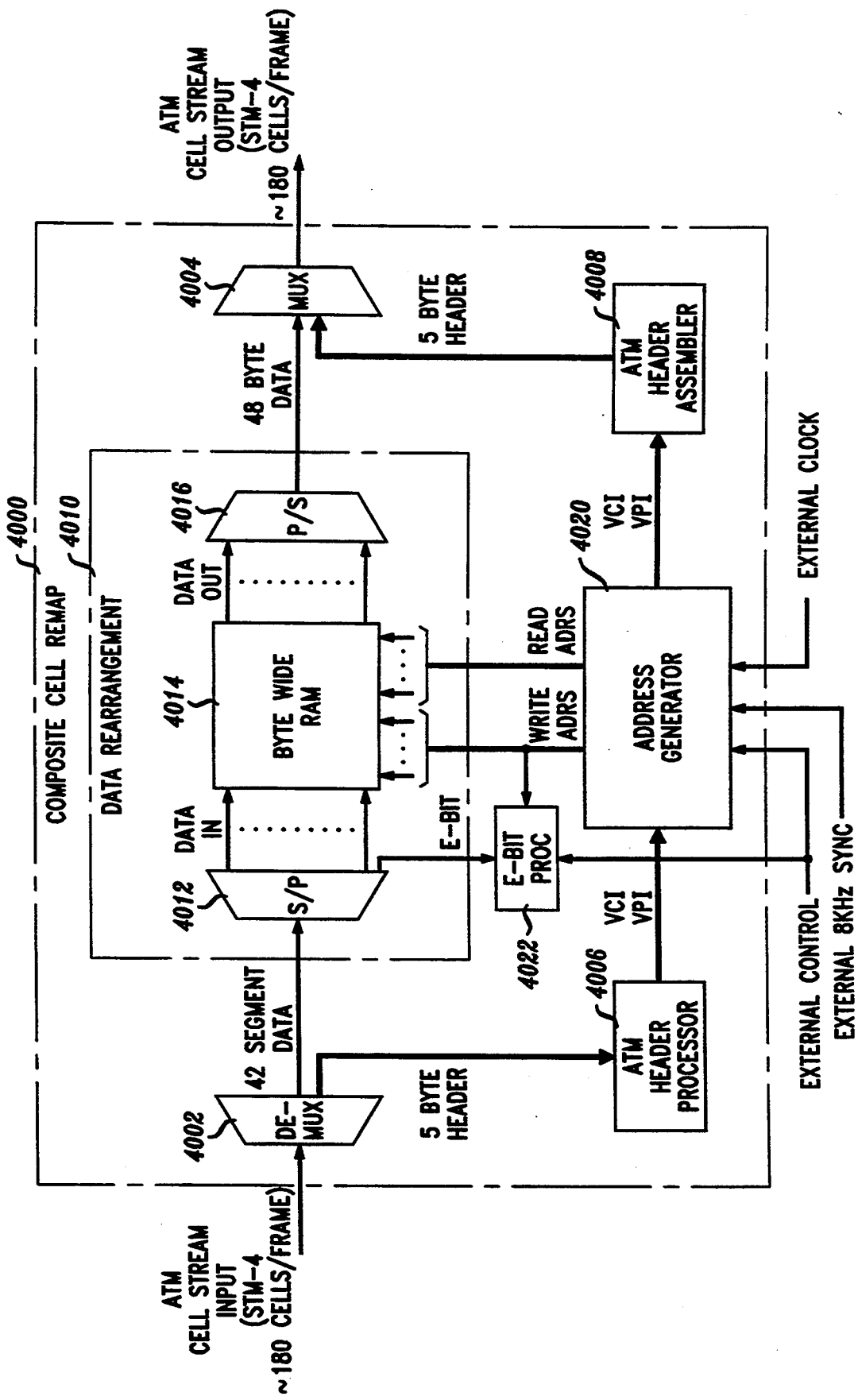

FIG. 43 represents a CCR for receiving 42 segments of data in each cell (the 42 segments representing each one PCM sample byte and one E-bit) and delivering 48 bytes of data per cell. An example of the use of the configuration of FIG. 43 is for a CCR which is receiving inputs from an ATMU (switched through an ATM-CM without affecting the contents of any of the payload of the cell) and which is transmitting cells to an ATM crossconnect. The left CCR of FIG. 3 performs this function. The differences between FIGS. 42 and 43 are that the serial-to-parallel converter 4012 delivers every ninth bit of the input stream to E-bit processor 4022. The E-bit processor records the E-bit associated with each write address in its own internal RAM (not shown) and is able to detect a change in the received E-bit for that address. When the change is detected, the external control is notified of a change in supervision.

Figure 44:
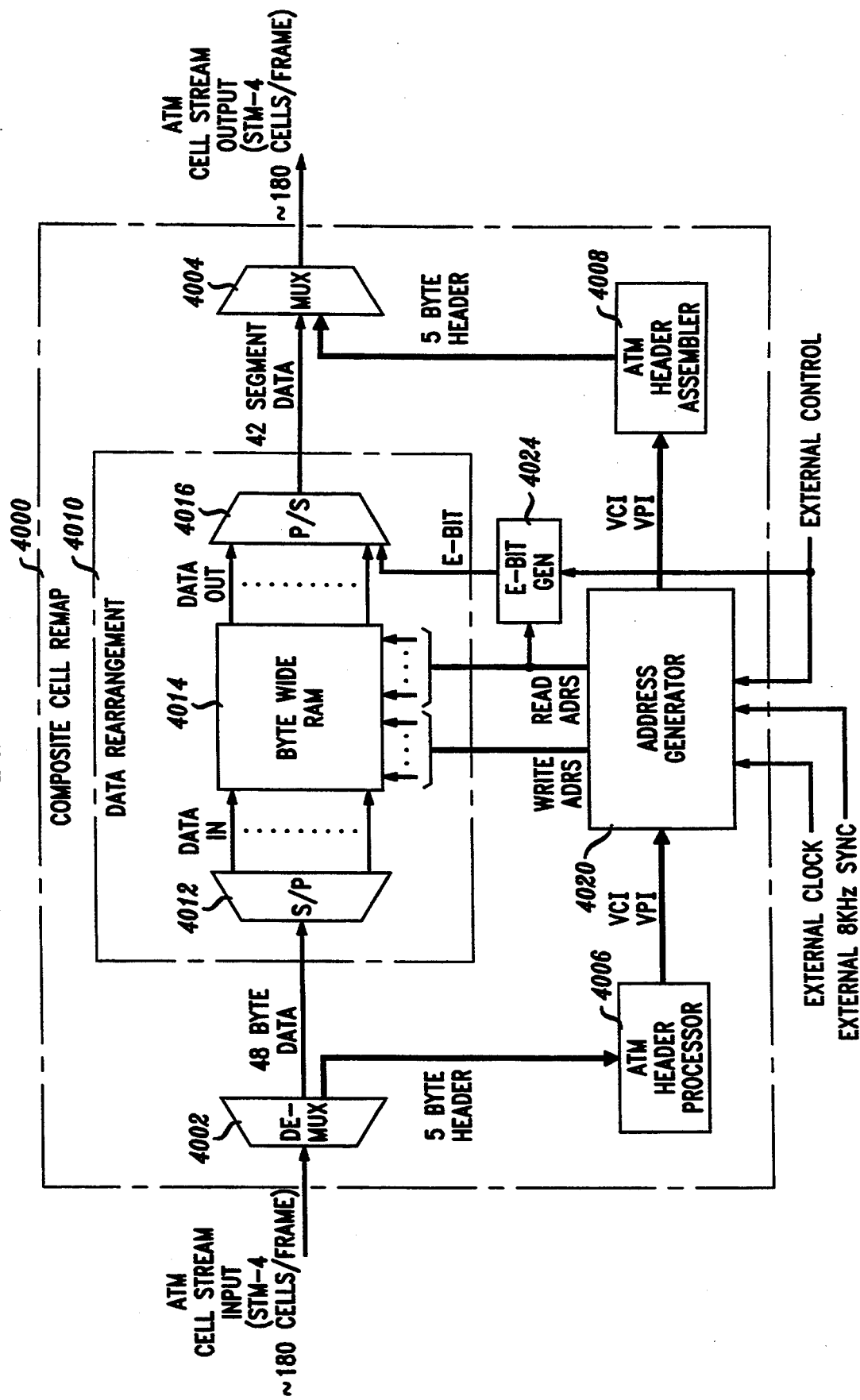

FIG. 44 is for a CCR whose input comprises cells having 48 bytes of data per cell, each byte representing one PCM sample and whose output comprises cells having 42 segments of data (each segment including a one-byte PCM sample and an E-bit). The fight CCR of FIG. 3 performs this function. The E-bit is inserted in every ninth position of the payload that is generated for the output by parallel-to-serial converter 4016. The configuration of FIG. 44 includes an E-bit generator 4024 which contains a RAM (not shown) with E-bit values to be applied for each read address. The contents of the E-bit RAM are updated from the external control.

Figure 45:
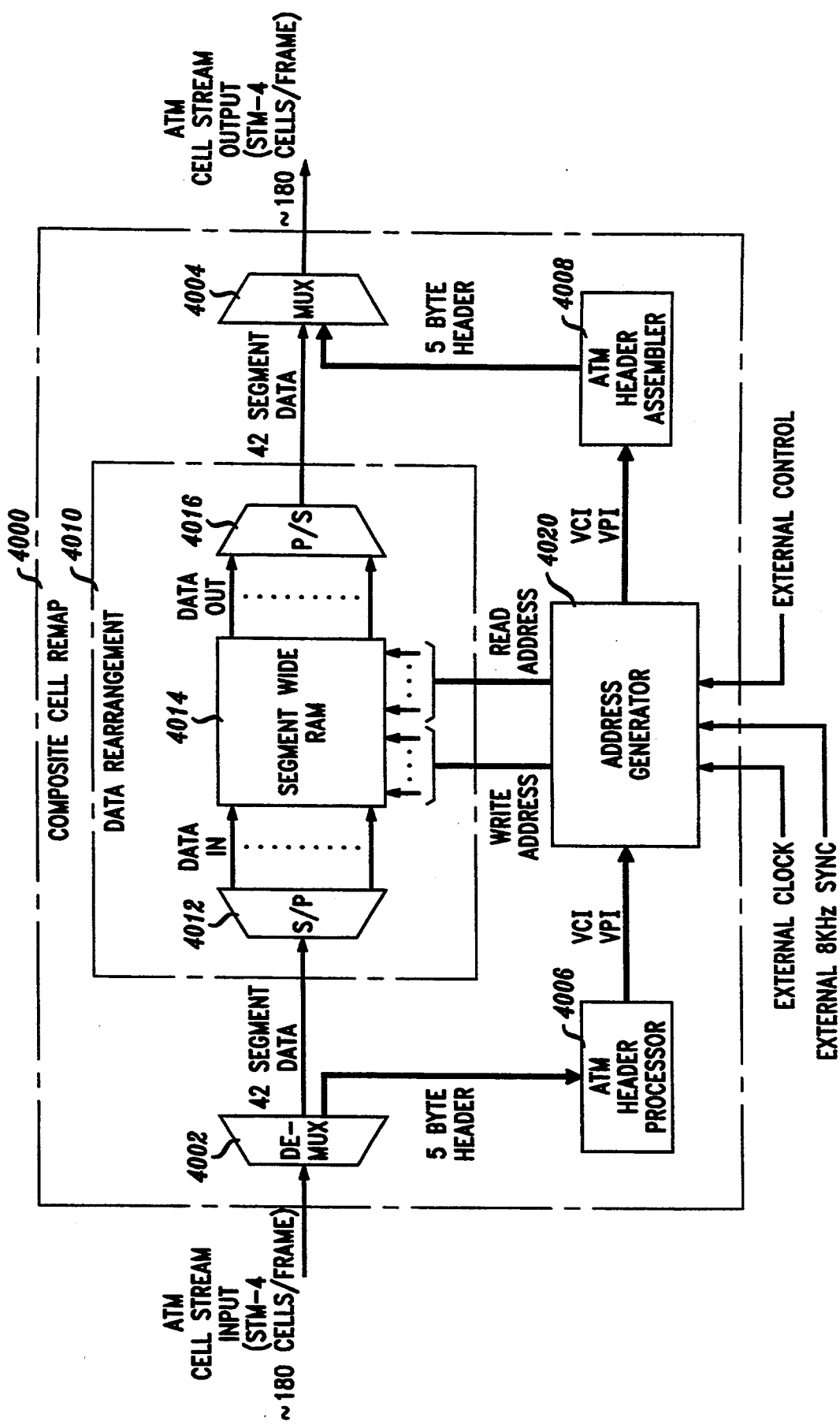

Finally, FIG. 45 shows a CCR for accepting a signal stream comprising cells carrying 42 segments of input data per cell and delivering 42 segments of output data per cell, each segment including an 8-bit PCM sample and a single E-bit. The CCR of FIG. 2 performs this function. The only difference between the configuration of FIG. 45 and that of FIG. 42 is that the RAM is one segment wide (9 bits) instead of being one byte wide (8 bits). Alternatively, it is possible to provide a 42-bit to 42-bit CCR which terminates the input E-bit on an E-bit processor and generates a new E-bit using an E-bit generator. This has the advantage of terminating the section of a call at the CCR. The configuration of FIG. 45 would be used for any cases in which it was found desirable to switch ATMU to ATMU connections within a common access switch through a CCR; the E-bit (and probably other comparable bits) are not normally transmitted out of an access switch.

Figure 46:
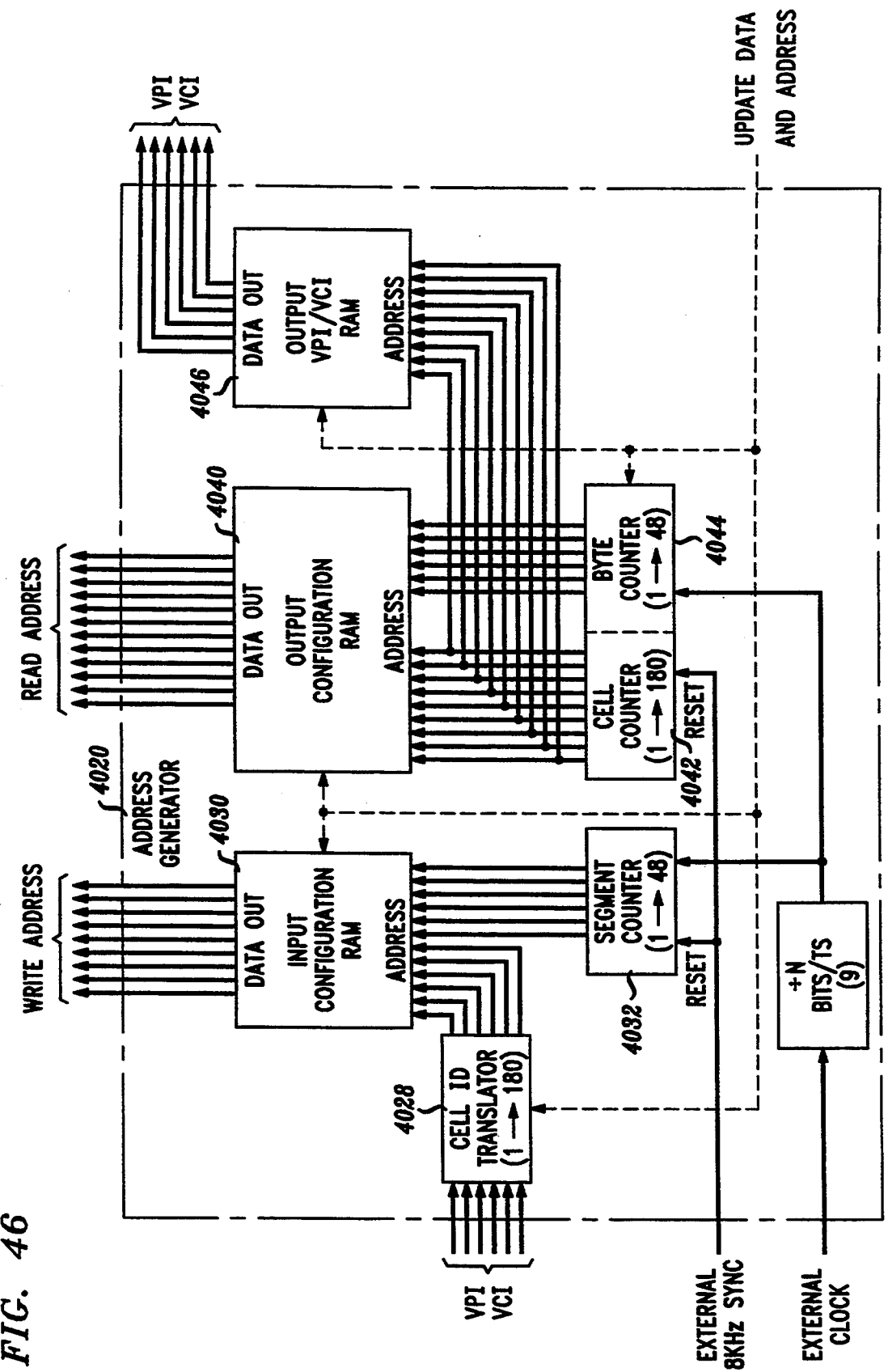
FIG. 46 is a block diagram of an address generator for a CCR.

FIG. 46 shows details of the address generator 4020. Input configuration RAM 4030 is used to address RAM 4014 for writing new inputs into that RAM the new inputs being the data from 8-bit bytes or 9-bit segments from the ATM input cell stream. In this preferred configuration, the input is stored in RAM locations arranged arbitrarily, and the output is read sequentially one byte or segment (FIG. 45) at a time. The input VPI/VCI (from the header) is examined by the cell address translator 4028 to determine an internal cell address in the range of 1–180 for the cell. The VPI and/or VCI can be directly coded to indicate this cell address or an arbitrary VPI/VCI value can be used if a translation content addressable memory (CAM) is incorporated into the cell address translator. (Note that the VPI and VCI together are 28 bits long so that the use of an indexed memory is out of the question.) The input configuration RAM 4030 is addressed by the cell ID and by a segment counter 4032 which counts from 1 to 48 and is reset at the beginning of each cell after the cell header has been received.

The output configuration RAM 4040 is driven by the cell counter 4042 and byte counter 4044. In addition, the cell counter drives the output header store 4046 which contains the output virtual path identifier and virtual circuit identifier and which serves as one of the inputs of Mux 4004 (FIG. 45). The output configuration RAM 4040 then drives RAM 4014 whose output is delivered to a parallel-to-serial converter 4016 which delivers 8 byte data into Mux 4004. The cell and byte counter are reset at an 8 KHz rate.

Alternatively, a 48 byte wide output could be delivered from the RAM 4014, driven only by the cell counter 4042; this would halve the operating speed of the RAM, but would require 48×8 output circuits in the RAM 4014 (instead of 8). While the preferred embodiment shows two addressing memories, alternatively, either one could be replaced by a counter so that the CCR could work by having sequential load, random (i.e., control memory directed) unload, or random load sequential unload.

For the case of FIG. 43, the CCR receives from the ATM-CM composite CBR cells containing 42 9-bit segments each comprising an 8-bit PCM sample and a single E bit, and transmits composite CBR cell outputs and which either goes directly to another CCR or to a transit ATM crossconnect contain 48 8-bit PCM samples in each cell. At first glance this may appear to be wasteful. However, it is important to remember that the input cells and the output cells are frequently not fully packed. Since the CCR performs rearrangement of data within the cells, it will frequently happen that there is an imperfect mapping between the number of cells required at the output and the number of input cells. This situation is greatly alleviated if the output cells can transmit more samples than are received in each input cell. If the maximum number of samples in each input cell were to equal the maximum number of samples in each output cell, blockage would be likely to occur during periods of peak traffic. With this arrangement, blockage is sharply reduced.

As mentioned earlier, the cell layout of FIG. 17 is the present standard for communicating voice signals using ATM. While this arrangement does have the disadvantage of introducing a 6-millisecond delay required to accumulate the samples for each packet, it may be necessary at least initially to communicate with units which observe this standard. When it is necessary to create such cells, the CCR is ideally equipped to do so. All that is required is to expand the size of the counter by a factor of 48:1 and to expand the size of the memory by the same factor, so that 48 times as many different cell addresses may be accommodated (for the case in which all of the output traffic is of the FIG. 17 format). The cell ID translator 4028 similarly must be expanded from one to 180, to one to 48 times 180 and the CAM of that identifier must be similarly increased in size. For generating the standard format composite cell, 48 frames of inputs must be stored, requiring 48*180 cells of storage whereas for the composite cell described elsewhere herein, only one, two or three (in order to handle jitter) frames of data need to be stored. Once the counter, memory and cell ID translator have been expanded, the CCR performs its remapping function in the same way as previously described.

The CCR can also be used to transmit wideband data transparently since, while it is capable of performing the remap function, it is also capable of executing the remap function by simply taking the contents of incoming cells and generating them as outgoing cells without changing the payload contents. Thus, a CCR can be used in conjunction with performing a transit switching function on the standard format composite cells and importantly, can handle a mix of standard and proposed format cells.

Call Scenarios

This section describes the use of broadband switching of composite cells between and originating and terminating ATM-CM offices. To facilitate the examples, it is assumed the two 5ESS offices provide a tandem call connection between two LEC offices whose access is T1 and N-ISUP, as shown in FIG. 21. Also, for the sake of simplicity, the scenarios in this section assume that the ATMU is part of the ATM-CM.

Below is a high-level scenario for an incoming narrowband ISUP to outgoing broadband ISUP call in an originating switch. It is followed by the corresponding incoming broadband ISUP to outgoing narrow band ISUP scenario in the terminating switch. Both a message diagram and a description of the tasks for each message is included. Other scenarios with various combinations of broadband and narrowband accesses and trunk have been derived, but are not included here.

The call flows are based on the current 5ESS International trunk-trunk call model. A similar model can be derived for US 5ESS.

The following conventions are use in the line diagrams:
- solid lines with upper case font represent external messages,
- solid lines with lower case font represent internal messages,
- solid lines with italic font represent hardware register read/writes,
- dashed lines represent composite cells,
- dotted lines represent NCT information (i.e., E-bits).

NISUP-BISUP Call Scenario—Originating ATM-CM Switch (FIGS. 34–37) of an Originating Call This section describes the implementation for one preferred embodiment.

1. The originating narrowband call control processing in the SM receives the incoming Initial Address Message (IAM) and performs digit analysis. The IAM is sent to the terminating switch. If there are intermediate crossconnects, the IAM is passed through without processing. If there are intermediate tandem switches, the tandem switch processes the IAM and forwards an IAM toward the terminating switch. The originating SM is one such intermediate tandem switch for a call originating in a local switch 2 (FIG. 6). The IAM arrives at the originating SM via the normal narrowband signaling processor, a packet switch unit, or, for the AT&T network, a CNI ring. Digit analysis results indicate that the call does not terminate on another narrowband trunk served by this switch, but instead, must be routed to another node in the toll network. The digit analysis results would identify the node in the network the call should be routed to.

2. N-ISUP call control in the SM sends a routing request to the AM over the NCT link as normal.

3. Based on the results of initial routing in the SM, the AM recognizes the call as an inter-switch call to be transported via ATM. The AM selects a timeslot on the originating NCT link, and requests path hunting and setup from Connection Control in the ATM-CM. Connection Control in the ATM-CM maintains all the status information regarding VPs/VCs between local SMs, CCRs, and other nodes in the network. Connection Control is also responsible for maintaining the composite cell mapping information for all ATMUs and CCRs in the office. Data is kept which associates SDCC/MDCC bytes with DS0 timeslots (a copy of which is kept in the ATMU), and of MDCC-to-TDCC (Tandem Destination Composite Cell) remapping (copied into the CCR). In addition, Connection Control maintains data which associates destinations in the network with active and inactive VPs to those nodes, and also the CCRs associated with those VPs.

Connection Control determines an outgoing VP based on the destination node. Connection Control may have several VPs to chose from to reach the destination node, and would select an active VP with a TDCC with available slots. If an active composite cell VP is available, Connection Control reserves a slot in the composite cell. If no active composite cell VP exists, Connection Control activates a new VP if bandwidth (i.e., space for an additional CBR cell per frame) is available. If no bandwidth is available, Connection Control determines an alternate VP. The alternate VP may not be a direct VP to the destination node, but may be a VP which is routed via a switch at another node. Connection Control also determines the signaling VP associated with the composite cell VP to be used for the call.

Connection Control then allocates a slot in the MDCC between the originating ATMU and the CCR. If no active MDCC exists, a new one is activated.

4. Connection Control updates the timeslot-to-MDCC mapping information in the ATMU.

5. Connection Control updates the MDCC-to-TDCC remapping information in the CCR. The CCR takes MDCCs from many ATMUs with calls destined for the same destination to be remapped (multiplexed) into one (or as many as needed) TDCCs to the destination node.

6. Connection Control sends a termination request message to B-ISUP call control in the BB-CP. Broadband call control is involved because the call is going out of the office on a broadband facility (broadband ISUP) to another node in the network. Broadband call control acts as the outgoing half call. The message contains the VPI/VCI (Virtual Path Identifier/Virtual Circuit Identifier) and NCT timeslot to be used for the call. It also identifies the outgoing signaling VP/VC and DS0 byte to be used.

7. The BB-CP performs Broadband ISUP (B-ISUP) call control. B-ISUP call control formats and sends the IAM to the terminating office via BB-SP. BB-CP performs all ATM Adaptation Layer (AAL), MTP layer 3 signaling, and Global Title Translation (GTT) for broadband signaling. All SS7 signaling VCs to other switches terminate on the BB-SP.

The IAM contains the VPI/VCI and DS0 cell byte position. The BB-CP serves as the "terminating half-call" for the call.

8. B-ISUP in the BB-CP sends a "path_close" message to the ATM-CM.

9. For a 5ESS switch, the ATM-CM updates the CCR in order to turn on the E-bit for the call in the MDCC between the CCR and the ATMU.

10. At the ATMU, the E-bit in the MDCC is mapped to the appropriate timeslot.

11. B-ISUP in the BB-CP sends a "setup complete" message to the originating SM. The message identifies the timeslot selected by Connection Control in the ATM-CM to be used for the call.

12. In a 5ESS switch, when N-ISUP call control in the SM detects E-bit, and receives the "setup complete" message, it sends E-bit on the selected timeslot.

13. In a 5ESS switch, the ATMU takes the received E-bit and maps it into the MDCC to the CCR.

14. In a 5ESS switch, the ATM-CM detects a change in the E-bit for the call from the CCR, and sends a "path_set" message to the BB-CP. B-ISUP call control in the BB-CP completes setup of the call.

15. The ACM is received from the far end switch.

16. B-ISUP call control in the BB-CP sends a "buildup complete" message to N-ISUP call in the originating SM.

17. N-ISUP call control in the SM sends an ACM message to the narrowband LEC switch.

18. The Answer Message (ANM) is received from the far end switch.

19. B-ISUP call control in the BB-CP sends a "answer charge" message to N-ISUP call control in the SM.

20. N-ISUP call control in the SM sends an ANM message to the narrowband LEC switch. The call is now in the talking state.

Assuming originating party disconnect, the call clearing scenario is as follows:

1. A narrowband ISUP RELEASE message is received by N-ISUP call control in the SM. N-ISUP call control begins clearing the call by sending a "release" message to the far half-call (i.e., the BB-CP), in a 5ESS switch, turning off E-bit on the timeslot, and sends a RLC message to the narrowband switch to complete the ISUP disconnect sequence.

2. In a 5ESS switch, the ATMU maps the timeslot E-bit into the appropriate MDCC to the CCR.

3. In a 5ESS switch, the ATM-CM detects E-bit discontinuity in the CCR, and sends a "path release" message to the BB-CP.

4. B-ISUP call control in the BB-CP clears its end of the call by sending a clearing message to the ATM-CM in order to release the SM timeslot and the virtual resources (VCs and/or composite cells) in the ATMU and CCR, and also begins the REL/RLC (Release/Release Complete (SS7 signals)) sequence with the far end.

5. The ATM-CM updates the composite cell mapping tables in both the ATMU and CCR.

BISUP-NISUP Call Scenario—Terminating ATM-CM Switch (FIGS. 38-41)

1. The incoming broadband IAM is routed via the BB-SP to broadband call control in the BB-CP. All SS7 signaling VCs to other switches terminate on the BB-SP.

The incoming BISUP call control processing in the BB-CP performs digit analysis. Digit analysis results indicate that the terminating trunk group is served by this switch, and that it is a narrowband trunk group. Contained in the IAM is the identity of the virtual path used for the composite cell, as well as the identity of the byte used in the composite cell. This identifies the CCR which will be used for the call.

2. Based on the results of initial routing in the BB-CP, BISUP call control sends a routing request to the AM. Included in the routing message is the composite cell information received in the IAM.

3. The AM performs a trunk hunt, determines the destination SM, and selects a timeslot. The AM requests network path setup from the ATM-CM. Included in the request is the composite cell information received in the IAM.

4. As described in the previous scenario, Connection Control in the ATM-CM maintains all the status information regarding VPs between local SMs, CCRs, and other nodes in the network.

Based on the terminating SM and the composite cell information, Connection Control determines if a MDCC virtual path is currently active between the ATMU serving the terminating SM and the incoming CCR. If no active virtual path exists (or if all cells on existing paths are full) Connection Control activates a new MDCC virtual path. Connection Control allocates a byte in the MDCC to be used for the incoming call.

5. Connection Control updates the timeslot-to-MDCC mapping information in the ATMU.

6. Connection Control then updates the TDCC-to-MDCC remapping information in the CCR.

7. Connection Control sends a path acknowledgement message back to the AM.

8. The AM sends a termination request to the destination SM. The message contains the identity of the selected trunk, and the timeslot selected by the IAM.

9. N-ISUP call control in the SM formats and sends the IAM to the terminating LEC switch and sends E-bit on the NCT.

10. In a 5ESS switch, the ATMU in the ATM-CM takes the received E-bit and maps it into the composite cell to the CCR.

11. In a 5ESS switch, the CCR in the ATM-CM detects a change in the E-bit for the call, and sends a "path_set" message to the BB-CP.

12. N-ISUP call control in the SM sends a "setup complete" message to the BB-CP. The message identifies the timeslot selected by Connection Control in the ASU-CP to be used for the call.

13. When B-ISUP call control in the BB-CP receives the "setup complete" and "path_set" messages in a 5ESS switch, it requests the ATM-CM to set the E-bit in the composite cell to the ATMU.

14. In a 5ESS switch, the ATM-CM updates the CCR in order to turn on the E-bit for the call in the MDCC between the CCR and the ATMU.

15. In a 5ESS switch, at the ATMU, the E-bit in the MDCC is mapped to the appropriate NCT timeslot.

16. In a 5ESS switch, N-ISUP call control in the SM detects the E-bit and completes the path setup.

17. The ACM is received from the LEC switch.

18. N-ISUP call control in the SM sends a "buildup complete" message to B-ISUP call control in the BB-CP.

19. B-ISUP call control in the BB-CP sends an ACM message to the far end ATM-CM switch.

20. The ANM is received from the LEC switch.

21. N-ISUP call control in the SM sends a "answer charge" message to B-ISUP call control in the BB-CP.

22. B-ISUP call control in the BB-CP sends an ANM message to the far end ATM-CM switch. The call is now in the talking state.

Assuming A-part disconnect, the call clearing scenario is as follows:

1. A broadband ISUP RELEASE message is received by B-ISUP call control in the BB-CP. B-ISUP call control begins clearing the call by sending a RLC message to the far end ATM-CM switch to complete the broadband ISUP disconnect sequence, and by sending a "release" message to the SM.

2. B-ISUP call control in the BB-CP sends a reset E-bit message to the ATM-CM in order to turn off the E-bit in the composite cell to the ATMU.

3. The terminating ATMU maps the E-bit change in the MDCC to the terminating NCT link.

4. N-ISUP call control in the SM detects E-bit discontinuity, and begins the N-ISUP REL/RLC sequence with the terminating LEC switch.

5. N-ISUP call control in the SM also sends a timeslot release message to the ATM-CM in order to release all network path resources.

6. The ATM-CM updates the mapping table in the ATMU and CCR involved in the call, and also releases the timeslot.

As previously stated, where two units communicating using ATM cells are in close physical proximity, it should not be necessary to use a SONET or SDH facility to communicate these signals.

While this description has used voice as the primary narrowband signal example, narrowband data (64 KB or less), facsimile and other narrowband signals can be switched in the same way.

It is to be understood that the above description is only of one preferred embodiment of the invention. Numerous other arrangements may be devised by one skilled in the art without departing from the scope of the invention. The invention is thus limited only as defined in the accompanying claims.

APPENDIX A

ACRONYMS AND ABBREVIATIONS

AAL ATM Adaptation Layer
AALP ATM Adaptation Layer Processor
AAM ATM Address Mapper
AM Administrative Module
AMD Advanced Memory Devices
AMM ATM Management Module
ANM Answer Message
AP Administrative Processor
APH ATM Packet Handler
ASU ATM Switching Unit
ATM Asynchronous Transfer Mode
ATMU ATM Interface Unit
ATMU CC ATMU Central Controller
BB Broad B and
B-ISUP Broadband ISUP
BOP Bit Oriented Protocol
CAM Content Addressable Memory
CBP Common Broadband Platform
CBR Constant Bit Rate (traffic)
CCB Composite Cell Byte
CCITT Consultative Committee on International Telephone and Telegraph Standards
CCR Composite Cell Remap
CD ROM Compact Disk Read Only Memory
CLP Cell List Processor
CM Communication Module
CNI Common Network Interface
CONS Connection Oriented Network Services
CPI CBP Processor Intervention
CPR Composite Packet Remap
CRC Cyclic Redundancy Check
CTS Control Time Slot
CWB Cell Wide Buffer
DACS Digital Access Crossconnect System
DCC Digital Communications Channel
DS0 A 64 kilobit/second PCM single channel signal
DS1 A signal composed of 24 DS0 signals
DTU Digital Trunk Unit
EOC Embedded Operations Channel
FAX Facsimile
FSR Facility Shift Register
GSM Global SM
GTT Global Title Translation
GUI Graphical User Interface
HDLC High-level Data Link Controller
HDTV High Definition Television
IAM Initial Address Message
ISDN Integrated Services Digital Network
ISUP ISDN User Port
IWU Inter-Working Unit
LAPB Link Access Procedures (type) B
LAPD Link Access Procedures (type) D
LEC Local Exchange Carrier
LPU Line Processing Unit
MCTSI Module Controller Time Slot Interchange
MDCC Multiple Destination Composite Cell
MHZ Megahertz
MLD Message Layer Device
MML Man Machine Language
MTP Message Transfer Part
N-ISUP Narrow Band ISUP
NCT Network Control and Timing (link)
NLI NCT Link Interface
NNI Network Node Interface
OAMP Operations Administration Maintenance and Provisioning
OSS Operation Support System
PCT Peripheral Control and Timing (link)
PH Protocol Handler
PSU Packet Switching Unit
PVC Permanent Virtual Circuit
RASU Remote ATM Switching Unit
REL/RLC Release/Release Complete (SS7 signals)
SCCP Signaling Control and Connection Part
SCSI Small Computer System Interface (an Industry standard)
SDCC Single Destination Composite Cells
SDH Synchronous Digital Hierarchy
SDL Signaling Data Link (SS7)
SIU SONET Interface Unit or SM Interface Unit
SM Switch Module
SMDS Switched Megabit Data S witch
SMP Switch Module Processor
SONET Synchronous Optical NETwork
SP Signaling Processor
SR Shift Register
SS7 Signaling System (Number) 7
STM Synchronous Time Multiplex
STP Signal Transfer Point
STS Synchronous Time Signal
TDC Tandem Destination Cell
TDCC Tandem Destination Composite Cell
TSA Time Slot Assign
TSI Time Slot Interchange
TSIU Time Slot Interchange Unit
UNI User Network Interface
VBR Variable Bit Rate (traffic)
VC Virtual Circuit or Virtual Channel
VCI Virtual Circuit Identifier or Virtual Channel Identifier
VP Virtual Path
VPI Virtual Path Identifier

We claim:

1. In a telecommunications switching system or cluster comprising a plurality of switching modules or switching systems, apparatus comprising:
a plurality of means for convening between a plurality of multiplexed synchronous signal streams, each carrying periodic communication input signals for a plurality of channels, each signal stream comprising periodic communication input signals and associated auxiliary signals for each channel of a plurality of communications from said plurality of switching modules or systems, and one or more first packetized output signals, each first packetized output signal comprising a plurality of first packets transmitted periodically, each first packet comprising segments derived from periodic communication input signals and associated signals of said signal streams and each of said first packets comprising signals for channels destined for a single one of said plurality of means for converting; and means for switching first packets of said first packetized output signals each to one of a plurality of second packetized output signals, said second packetized output signals for transmission to converting means for converting said second packetized output signals into periodic communication output signals and associated signals for transmission to said plurality of switching modules or systems.

2. The apparatus of claim 1 wherein said first and said second packetized output signals comprise ATM (Asynchronous Transfer Mode) signals and said plurality of periodically transmitted first packets are a plurality of ATM cells.

3. The apparatus of claim 2 wherein said plurality of ATM cells each carries a plurality of segments, each segment representing one PCM (pulse code modulation) signal of a single channel and an associated auxiliary signal of said single channel, and wherein each of said plurality of ATM cells carries only a single segment of any channel.

4. The apparatus of claim 3 wherein said associated auxiliary signal of said single channel is a single bit representing a supervisory state of said single channel.

5. The apparatus of claim 1 wherein each of said plurality of means for converting further comprises means for converting between said periodic communication input signals and a plurality of second packets transmitted periodically on said first packetized output signals, each second packet comprising segments derived from periodic communication signals and associated signals of said signal streams and each second packet comprising signals for channels destined for a switching system outside said telecommunication switching system or cluster;

wherein said means for switching further comprises means for switching said second packets to a third packetized output signal for transmission to one or more telecommunications switching systems outside said telecommunications switching system or cluster.

* * * * *

UNITED STATES PATENT AND TRADEMARK OFFICE
CERTIFICATE OF CORRECTION

PATENT NO. : 5,428,607
DATED : June 27, 1995
INVENTOR(S) : Thomas L. Hiller, et al It is certified that error appears in the above-indentified patent and that said Letters Patent is hereby corrected as shown below:

Column 12, line 40, change "carded" to --carried--.

Column 12, line 48, change "(PVPs) permanent virtual paths" to --permanent virtual paths (PVPs)--.

Column 45, line 20, change "48/46" to --48--.

Signed and Sealed this

Twenty-eighth Day of November 1995

BRUCE LEHMAN

Attest:

Attesting Officer                Commissioner of Patents and Trademarks